United States Patent
Iwai et al.

(10) Patent No.: US 10,448,297 B2
(45) Date of Patent: Oct. 15, 2019

(54) NETWORK NODE, MOBILE TERMINAL, BASE STATION AND METHODS PERFORMED THEREIN

(71) Applicant: NEC Corporation, Tokyo (JP)

(72) Inventors: Takanori Iwai, Tokyo (JP); Hajime Zembutsu, Tokyo (JP); Hisashi Futaki, Tokyo (JP)

(73) Assignee: NEC Corporation, Tokyo (JP)

(*) Notice: Subject to any disclaimer, the term of this patent is extended or adjusted under 35 U.S.C. 154(b) by 136 days.

(21) Appl. No.: 15/321,929

(22) PCT Filed: Mar. 5, 2015

(86) PCT No.: PCT/JP2015/001197
§ 371 (c)(1),
(2) Date: Dec. 23, 2016

(87) PCT Pub. No.: WO2015/198509
PCT Pub. Date: Dec. 30, 2015

(65) Prior Publication Data
US 2017/0135010 A1 May 11, 2017

(30) Foreign Application Priority Data
Jun. 24, 2014 (JP) .................. 2014-128823

(51) Int. Cl.
*H04W 36/12* (2009.01)
*H04W 88/14* (2009.01)
(Continued)

(52) U.S. Cl.
CPC ............. *H04W 36/12* (2013.01); *H04W 8/02* (2013.01); *H04W 24/02* (2013.01);
(Continued)

(58) Field of Classification Search
None
See application file for complete search history.

(56) References Cited

U.S. PATENT DOCUMENTS 9,516,561 B2 12/2016 Xu et al.
9,532,278 B2 12/2016 Park et al.
(Continued)

FOREIGN PATENT DOCUMENTS

EP 2053871 A1 4/2009
EP 2265054 A1 12/2010
(Continued)

OTHER PUBLICATIONS

Extended European Search Report issued by the European Patent Office for European Application No. 15811393.6 dated Nov. 24, 2017 (10 pages).
(Continued)

*Primary Examiner* — Lonnie V Sweet
(74) *Attorney, Agent, or Firm* — Wilmer Cutler Pickering Hale and Dorr LLP

(57) ABSTRACT

A first network node (121S) is configured to perform mobility management and bearer management of a plurality of mobile terminals (111) having attached to the core network (120). Further, the first network node (121S) is configured to perform a relocation procedure for relocating the mobility management and the bearer management of the plurality of mobile terminals (111) to a second network node (121T) in the core network (120) in accordance with a relocation command from a control node (142) coupled to the core network (120). This contributes, for example, to relocation of mobility management and bearer management of a plurality of mobile terminals between network nodes regardless of the movement of those mobile terminals.

10 Claims, 32 Drawing Sheets

(51) Int. Cl.
*H04W 8/02* (2009.01)
*H04W 60/06* (2009.01)
*H04W 68/02* (2009.01)
*H04W 24/02* (2009.01)
*H04W 36/00* (2009.01)

(52) U.S. Cl.
CPC ....... *H04W 36/0072* (2013.01); *H04W 60/06* (2013.01); *H04W 68/02* (2013.01); *H04W 88/14* (2013.01)

(56) References Cited

U.S. PATENT DOCUMENTS

| | | | |
|---|---|---|---|
| 9,572,134 | B2 | 2/2017 | Zembutsu et al. |
| 9,668,176 | B2 | 5/2017 | Bi et al. |
| 9,713,148 | B2 | 7/2017 | Mochizuki et al. |
| 10,033,547 | B2 | 7/2018 | Yin et al. |
| 2009/0176496 | A1 | 7/2009 | Li et al. |
| 2010/0184432 | A1 | 7/2010 | Yano et al. |
| 2010/0226314 | A1 | 9/2010 | Xu |
| 2010/0323700 | A1 | 12/2010 | Bachmann et al. |
| 2011/0075632 | A1 | 3/2011 | Lim et al. |
| 2011/0122779 | A1 | 5/2011 | Meirosu et al. |
| 2011/0122845 | A1* | 5/2011 | Meirosu ............ H04W 36/0055 370/332 |
| 2011/0235505 | A1 | 9/2011 | Eswara et al. |
| 2012/0033659 | A1* | 2/2012 | Zhang ............... H04W 36/0033 370/338 |
| 2012/0063300 | A1 | 3/2012 | Sahin et al. |
| 2012/0076099 | A1 | 3/2012 | Yin et al. |
| 2012/0110197 | A1 | 5/2012 | Miklos et al. |
| 2012/0214492 | A1* | 8/2012 | Mihaly ............... H04W 76/041 455/437 |
| 2013/0010756 | A1 | 1/2013 | Liang et al. |
| 2013/0029708 | A1 | 1/2013 | Fox et al. |
| 2013/0051338 | A1 | 2/2013 | Ryu et al. |
| 2013/0053041 | A1 | 2/2013 | Li et al. |
| 2013/0083650 | A1 | 4/2013 | Taleb et al. |
| 2014/0133464 | A1 | 5/2014 | Li et al. |
| 2014/0160938 | A1 | 6/2014 | Qu |
| 2014/0286314 | A1 | 9/2014 | Xu et al. |
| 2014/0308961 | A1 | 10/2014 | Xu et al. |
| 2015/0195326 | A1* | 7/2015 | Suryavanshi ......... H04L 65/608 709/231 |
| 2015/0223196 | A1 | 8/2015 | Kim et al. |
| 2016/0066230 | A1 | 3/2016 | Li et al. |
| 2016/0234872 | A1* | 8/2016 | Liu ....................... H04W 76/11 |
| 2017/0135010 | A1 | 5/2017 | Iwai et al. |

FOREIGN PATENT DOCUMENTS

| | | |
|---|---|---|
| EP | 2416606 A1 | 2/2012 |
| GB | 2497073 A | 6/2013 |
| GB | 2497074 A | 6/2013 |
| JP | 2004-080433 A | 3/2004 |
| JP | 2010-171714 A | 8/2010 |
| JP | 2011-211710 A | 10/2011 |
| JP | 2012-522437 A | 9/2012 |
| JP | 2013-530581 A | 7/2013 |
| JP | 2013-534372 A | 9/2013 |
| JP | 2015-502103 A | 1/2015 |
| JP | 2015-505429 A | 2/2015 |
| WO | WO-2009-115041 A1 | 9/2009 |
| WO | WO-2010-111814 A1 | 10/2010 |
| WO | WO-2010-112037 A1 | 10/2010 |
| WO | WO-2011-141154 A1 | 11/2011 |
| WO | WO-2012/136812 A1 | 10/2012 |
| WO | WO-2013-076455 A1 | 5/2013 |
| WO | WO-2013-076456 A1 | 5/2013 |

OTHER PUBLICATIONS

NSN, "MME triggered S1 handover," SA WG2 Meeting #100, S2-134179, Agenda Item 6.16.1, Work Item/Release TEI 12, San Francisco, USA, Nov. 11-15, 2013 (4 pages).
Qualcomm Europe, "Inter CN Node Mobility," 3GPP TSG RAN WG3 Meeting #55, R3-070159, Agenda Item 13.7.12, St. Louis, USA, Feb. 12-16, 2007 (5 pages).
U.S. Office Action issued by the U.S. Patent and Trademark Office for U.S. Appl. No. 15/321,686 dated May 11, 2018 (23 pages).
3GPP TS 23.401 V9.15.0 "3rd Generation Partnership Project; Technical Specification Group Services and System Aspects; General Packet Radio Service (GRPS) enhancements for Evolved Universal Terrestrial Radio Access Network (E-UTRAN) access (Release 9)," Mar. 2013 (256 pages).
International Search Report corresponding to PCT/JP2015/001192, dated May 26, 2015 (5 total pages).
International Search Report corresponding to PCT/JP2015/001197, dated May 26, 2015 (5 total pages).
Extended European Search Report issued by the European Patent Office for European Application No. 15812504.7 dated Feb. 14, 2018 (11 pages).
U.S. Office Action issued by the U.S. Patent and Trademark Office for U.S. Appl. No. 15/321,686 dated Nov. 13, 2018 (13 pages).
Ericsson, "Load re-balancing solution," 3GPP TSG SA WG2 Meeting #65, S2-083228, Change Request, Prague, Czech Republic, May 12-16, 2008, (6 pages).
Notification of Reasons for Refusal issued by the Japan Patent Office for Japanese Application No. 2016-528982 dated Oct. 30, 2018 (7 pages).
Japanese Notification of Reasons for Refusal issued in Japanese Patent Application No. 2016-528981, dated Oct. 16, 2018, 4 pages.
USPTO Non-Final Office Action issued in U.S. Appl. No. 15/321,686, dated May 8, 2019, 12 pages.
USPTO Notice of Allowance and Fee(s) Due issued in U.S. Appl. No. 15/321,686, dated Aug. 21, 2019, 13 pages.

* cited by examiner

*Paging* message

-- ASN1START

```
Paging ::= SEQUENCE {
    pagingRecordList         PagingRecordList         OPTIONAL,    -- Need ON
    systemInfoModification   ENUMERATED {true}        OPTIONAL,    -- Need ON
    etws-Indication          ENUMERATED {true}        OPTIONAL,    -- Need ON
    nonCriticalExtension     Paging-v890-IEs          OPTIONAL
}

Paging-v890-IEs ::= SEQUENCE {
    lateNonCriticalExtension OCTET STRING             OPTIONAL,
    nonCriticalExtension     Paging-v920-IEs          OPTIONAL
}

Paging-v920-IEs ::= SEQUENCE {
    cmas-Indication-r9       ENUMERATED {true}        OPTIONAL,    -- Need ON
    nonCriticalExtension     Paging-v1130-IEs         OPTIONAL
}

Paging-v1130-IEs ::= SEQUENCE {
    eab-ParamModification-r11    ENUMERATED {true}    OPTIONAL,    -- Need ON
    nonCriticalExtension         SEQUENCE {}          OPTIONAL
}

PagingRecordList ::= SEQUENCE (SIZE (1..maxPageRec)) OF PagingRecord

PagingRecord ::= SEQUENCE {
    ue-Identity              PagingUE-Identity,
    cn-Domain                ENUMERATED {ps, cs},
    ...,
    [[  relocationIndication-rXYZ   ENUMERATED {true}    OPTIONAL
    ]]
}

PagingUE-Identity ::= CHOICE {
    s-TMSI   S-TMSI,
    imsi     IMSI,
    ...
}

IMSI ::= SEQUENCE (SIZE (6..21)) OF IMSI-Digit
IMSI-Digit ::= INTEGER (0..9)
```

-- ASN1STOP

Fig. 21

*Paging* message

-- ASN1START

```
Paging ::= SEQUENCE {
    pagingRecordList         PagingRecordList          OPTIONAL,    -- Need ON
    systemInfoModification   ENUMERATED {true}         OPTIONAL,    -- Need ON
    etws-Indication          ENUMERATED {true}         OPTIONAL,    -- Need ON
    nonCriticalExtension     Paging-v890-IEs           OPTIONAL
}

Paging-v890-IEs ::= SEQUENCE {
    lateNonCriticalExtension OCTET STRING              OPTIONAL,
    nonCriticalExtension     Paging-v920-IEs           OPTIONAL
}

Paging-v920-IEs ::= SEQUENCE {
    cmas-Indication-r9       ENUMERATED {true}         OPTIONAL,    -- Need ON
    nonCriticalExtension     Paging-v1130-IEs          OPTIONAL
}

Paging-v1130-IEs ::= SEQUENCE {
    eab-ParamModification-r11    ENUMERATED {true}     OPTIONAL,    -- Need ON
    nonCriticalExtension         Paging-vXYZ-IEs       OPTIONAL
}

Paging-vXYZ-IEs ::= SEQUENCE {
    relocationIndication-rXYZ    ENUMERATED {true}     OPTIONAL,    -- Need ON
    nonCriticalExtension         SEQUENCE {}           OPTIONAL
}

PagingRecordList ::= SEQUENCE (SIZE (1..maxPageRec)) OF PagingRecord

PagingRecord ::= SEQUENCE {
    ue-Identity              PagingUE-Identity,
    cn-Domain                ENUMERATED {ps, cs},
    ...
}

PagingUE-Identity ::= CHOICE {
    s-TMSI    S-TMSI,
    imsi      IMSI,
    ...
}

IMSI ::= SEQUENCE (SIZE (6..21)) OF IMSI-Digit
IMSI-Digit ::= INTEGER (0..9)
```

-- ASN1STOP

Fig. 22

RRCConnectionRelease message

```
-- ASN1START

RRCConnectionRelease ::=    SEQUENCE {
    rrc-TransactionIdentifier    RRC-TransactionIdentifier,
    criticalExtensions           CHOICE {
        c1                           CHOICE {
            rrcConnectionRelease-r8    RRCConnectionRelease-r8-IEs,
            spare3 NULL, spare2 NULL, spare1 NULL
        },
        criticalExtensionsFuture     SEQUENCE {}
    }
}

RRCConnectionRelease-r8-IEs ::= SEQUENCE {
    releaseCause              ReleaseCause,
    redirectedCarrierInfo     RedirectedCarrierInfo        OPTIONAL,  -- Need ON
    idleModeMobilityControlInfo  IdleModeMobilityControlInfo  OPTIONAL,  -- Need OP
    nonCriticalExtension      RRCConnectionRelease-v890-IEs OPTIONAL
}

:
:

ReleaseCause ::=   ENUMERATED {loadBalancingTAUrequired,
                               other, cs-FallbackHighPriority-v1020, relocationMME}

:
-- ASN1STOP
```

Fig. 23

NETWORK NODE, MOBILE TERMINAL, BASE STATION AND METHODS PERFORMED THEREIN

CROSS REFERENCE TO RELATED APPLICATIONS

This application is a national stage application of International Application No. PCT/JP2015/001197 entitled "NETWORK NODE, MOBILE TERMINAL, BASE STATION, AND METHODS PERFORMED THEREIN", filed on Mar. 5, 2015, which claims the benefit of the priority Japanese Patent Application No. 2014-128823, filed on Jun. 24, 2014, the disclosures of each of which are hereby incorporated by reference in their entirety.

TECHNICAL FIELD

The present disclosure relates to a mobile communication network, and more particularly to mobility management and bearer management of mobile terminals in a core network.

BACKGROUND ART

Non-Patent Literature 1 specifies the functional architecture of a packet switching domain of the Third Generation Partnership Project (3GPP), which is an Evolved Packet System (EPS). To be specific, Non-Patent Literature 1 specifies various procedures for mobility management, session management and handover of mobile terminals in the EPS, including Attach procedure, Tracking Area Update (TAU) procedure, Service Request procedure, S1 Release procedure, Globally Unique Temporary Identity (GUTI) Reallocation procedure, Detach procedure, Dedicated bearer activation procedure, Bearer modification procedure, X2-based handover procedure and S1-based handover procedure.

CITATION LIST

Non-Patent Literature

NPL1: 3GPP TS 23.401 V9.15.0 (2013-03) "3rd Generation Partnership Project; Technical Specification Group Services and System Aspects; General Packet Radio Service (GPRS) enhancements for Evolved Universal Terrestrial Radio Access Network (E-UTRAN) access (Release 9)", March 2013

SUMMARY OF INVENTION

Technical Problem

The inventors have studied relocation of processing of a Mobility Management Entity (MME) to another MME in accordance with a command from an external control node (e.g., Software-Defined Network (SDN) controller, Network Function Virtualization (NFV) controller, Operations Support System (OSS), or Element Management System (EMS)). MMEs are located in a core network, which is an Evolved Packet Core (EPC), and performs mobility management and bearer management of mobile terminals (User Equipments (UEs)) that have attached to the core network (i.e., in EMM-REGISTERED state). Mobility management is used to keep track of the current location of a UE and includes maintaining a mobility management context (MM context) related to the UE. Bearer management includes controlling an establishment of an EPS bearer for a UE to communicate with an external network (Packet Data Network (PDN)) via an Evolved Universal Terrestrial Radio Access Network (E-UTRAN) and an EPC and maintaining an EPS bearer context related to the UE.

The inventors expect that the demand for the relocation of mobility management and bearer management in an MME based on a command from an external control node will grow with the increasing use of core network virtualization technology. A virtualized core network (which is called Virtualized EPC etc.) abstracts one or both of the control plane and data plane of a core network through the use of server virtualization technology and network virtualization technology. Specifically, in a virtualized core network, core network nodes (e.g., MME, Serving Gateway (S-GW)/PDN Gateway (P-GW) control plane, and S/P-GW data plane) are implemented as a virtual machine configured in a server pool or as a virtual router configured in physical switches.

The current 3GPP specifications define a procedure to relocate mobility management and bearer management of an UE from an old MME (or source MME) to a new MME (or target MME) when the UE moves across a boundary between tracking areas or between eNodeBs. To be specific, when a UE in an idle state (i.e., EPS Connection Management (ECM)-IDLE state) moves from a tracking area under control of an old MME to a tracking area under control of a new MME, mobility management and bearer management of this UE is relocated from the old MME to the new MME in the TAU procedure. Further, when a UE in a connected state (i.e., ECM-CONNECTED state) moves from a source eNodeB (eNodeB) controlled by a source MME to a target eNodeB controlled by a target MME, mobility management and bearer management of this UE is relocated from the source MME to the target MME in the S1-based Handover procedure.

However, the current 3GPP specifications define nothing about relocating mobility management and bearer management of a UE between MMEs regardless of the movement of the UE, on the initiative of the EPC or a control node (e.g., SDN controller, NFV controller, OSS or EMS) coupled to the EPC. Thus, an object to be attained by an illustrative embodiments disclosed herein is to provide a device, a method, and a program that contribute to relocation of mobility management and bearer management of a plurality of mobile terminals (e.g., UEs), which have attached to a core network, between network nodes (e.g., MMEs) regardless of the movement of those mobile terminals. Note that this object is only one of the objects to be attained by an illustrative embodiments disclosed herein. The other objects or problems and novel features will be made apparent from the following description and the accompanying drawings.

Solution to Problem

In a first example aspect, a method performed by a first network node located in a core network includes (a) performing mobility management and bearer management of a plurality of mobile terminals having attached to the core network; and (b) performing a relocation procedure for relocating the mobility management and the bearer management of the plurality of mobile terminals to a second network node in the core network in accordance with a relocation command from a control node coupled to the core network.

In a second example aspect, a method performed by a mobile terminal includes (a) attaching to a core network by signaling with a first mobility management node and storing, in the mobile terminal, a first identifier indicating the first mobility management node as an identifier of a registered mobility management node to be used for transmitting a Non-Access Stratum (NAS) message, (b) receiving a second identifier indicating a second mobility management node from the first mobility management node when the mobile terminal has attached to the core network, and (c) updating the identifier of the registered mobility management node with the second identifier.

In a third example aspect, a method includes (a) receiving, from a first network node or a second network node, an instruction to redirect, to the second network node, a Non-Access Stratum (NAS) message addressed to the first network node, and (b) redirecting, to the second network node, a Non-Access Stratum (NAS) message received from a mobile terminal together with a Radio Resource Control (RRC) message containing a parameter indicating the first network node.

In a fourth example aspect, a network node includes a memory, and a processor coupled to the memory and configured to perform the method according to the above-described first example aspect.

In a fifth example aspect, a mobile terminal includes a memory, and a processor coupled to the memory and configured to perform the method according to the above-described second example aspect.

In a sixth example aspect, a base station includes a memory, and a processor coupled to the memory and configured to perform the method according to the above-described third example aspect.

In a seventh example aspect, a program includes a set of instructions (software codes) that, when loaded into a computer, causes the computer to perform the method according to the above-described first example aspect.

In an eighth example aspect, a program includes a set of instructions (software codes) that, when loaded into a computer, causes the computer to perform the method according to the above-described second example aspect.

In a ninth example aspect, a program includes a set of instructions (software codes) that, when loaded into a computer, causes the computer to perform the method according to the above-described third example aspect.

Advantageous Effects of Invention

According to the above-described example aspects, it is possible to provide a device, a method, and a program that contribute to relocation of mobility management and bearer management of a plurality of mobile terminals (e.g., UEs) having attached to a core network between network nodes (e.g., MMEs) regardless of the movement of those mobile terminals.

BRIEF DESCRIPTION OF DRAWINGS

FIG. 21 is a view showing an example of a Paging message.

FIG. 22 is a view showing an example of a Paging message.

FIG. 23 is a view showing an example of a RRC Connection Release message.

DESCRIPTION OF EMBODIMENTS

Specific illustrative embodiments will be described hereinafter in detail with reference to the drawings. The same or corresponding elements are denoted by the same symbols throughout the drawings, and repetitive explanations will be omitted as necessary for the sake of clarity.

First Illustrative Embodiment

Figure 1:
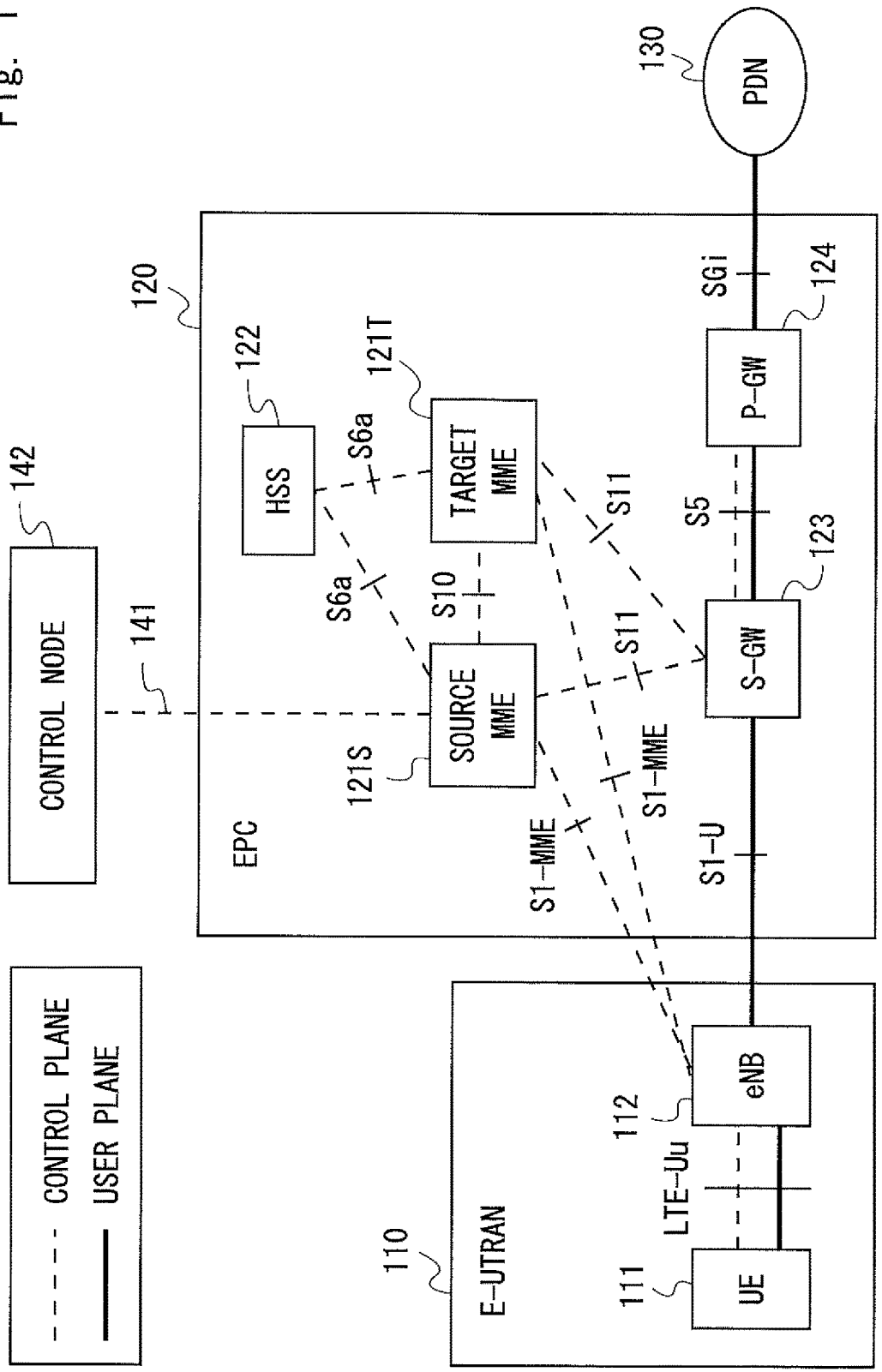
FIG. 1 is a view showing a configuration example of a mobile communication network according to an illustrative embodiment of the invention.

FIG. 1 shows a configuration example of a mobile communication network according to an illustrative embodiment. The mobile communication network provides communication services, such as voice communication or packet data communication or both, for example. In this illustrative embodiment, it is assumed that the mobile communication network is an EPS (i.e., Long Term Evolution (LTE) system or LTE-Advanced system).

The network shown in FIG. 1 includes an E-UTRAN 110 and an EPC 120. The E-UTRAN 110 includes a mobile terminal (User Equipment (UE)) 111 and an eNodeB 112. The EPC 120 includes a source MME 121S, a target MME 121T, a Home Subscriber Server (HSS) 122, an S-GW 123, and a P-GW 124.

The source MME 121S, the target MME 121T and the HSS 122 are nodes or entities in the control plane. The source MME 121S and the target MME 121T can perform mobility management and bearer management of a plurality of UEs including the UE 111. As described earlier, mobility management is used to keep track of the current location of a UE and includes maintaining a mobility management context (MM context) related to the UE. Bearer management includes controlling an establishment of an EPS bearer and maintaining an EPS bearer context related to the UE. The HSS 122 manages subscriber information of UEs including the UE 111.

The S-GW 123 and the P-GW 124 are packet transfer nodes in the user plane and operate to transfer user data (i.e., Internet Protocol (IP) packet). The S-GW 123 is a gateway with an E-UTRAN 110 and is connected to an eNodeB 112 via an S1-U interface. The P-GW 124 is a gateway with a Packet Data Network (PDN) 130 and is connected to the PDN 130 via an SGi interface. The PDN 130 may be an external network such as the Internet or may be a network for an IP service (e.g., IP Multimedia Subsystem (IMS) service) provided by an operator that manages the EPC 120.

Further, the source MME 121S is connected to a control node 142 located outside the EPC 120 via a control interface 141. The control node 142 is, for example, an SDN controller, an NFV controller, an OSS, an EMS, or any combination thereof. The source MME 121S is configured to relocate, to the target MME 121T, mobility management and bearer management of UEs having attached to the EPC 120 (i.e., UEs in EMM-REGISTERED state) in accordance with a command from the control node 142. In other words, the source MME 121S can relocate mobility management and bearer management of the UE 111 to the target MME 121T regardless of whether the UE 111 moves between cells or between tracking areas. The relocation of mobility management and bearer management means that the target MME 121T, instead of the source MME 121S, maintains the MM context and the EPS Bearer context.

Figure 2:
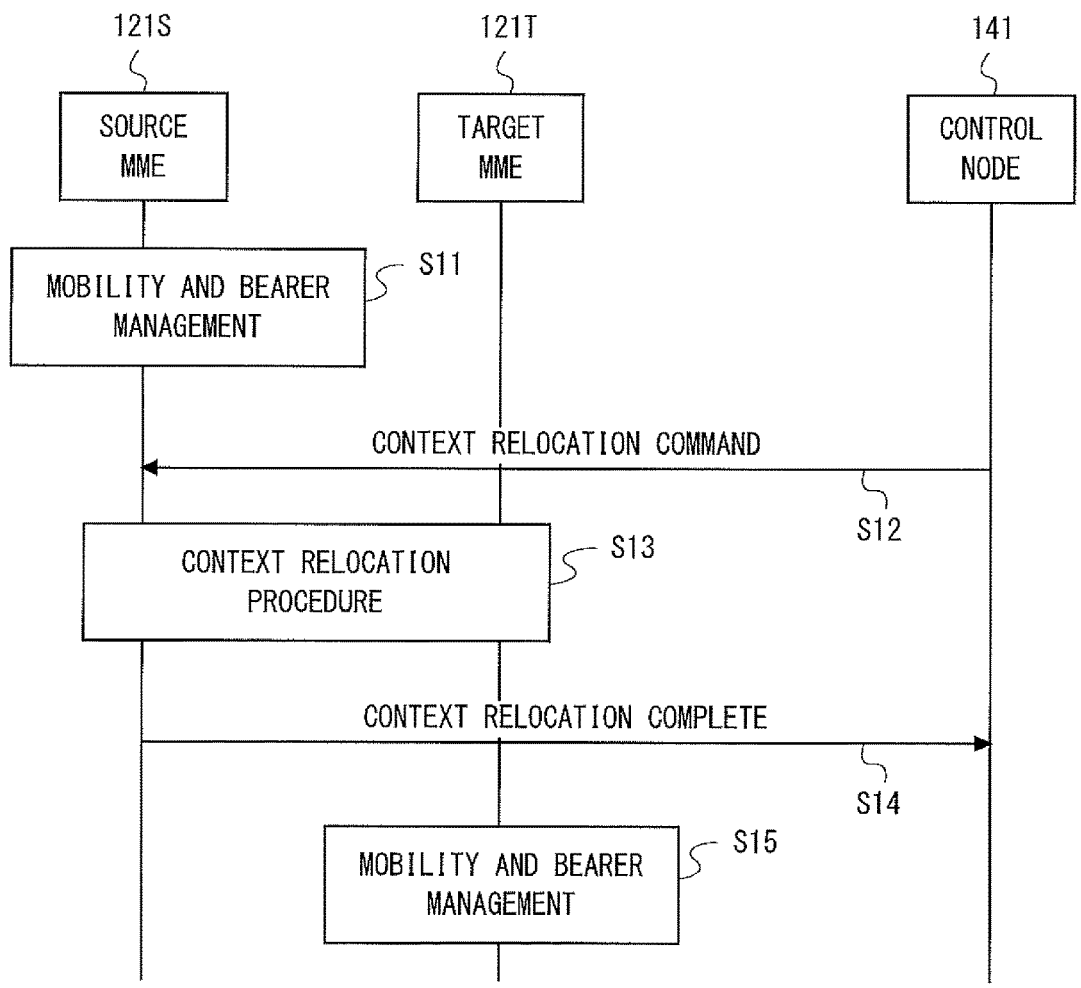
FIG. 2 is a sequence chart showing a specific example of a relocation procedure of a mobility management context and a bearer context according to an illustrative embodiment of the invention.

FIG. 2 is a sequence chart showing a specific example of a relocation procedure of a mobility management context and a bearer context according to this illustrative embodiment. In Step S11, the source MME 121S performs mobility management and bearer management of UEs that have attached to the EPC 120 (i.e., UEs in EMM-REGISTERED state).

In Step S12, the control node 142 transmits a Context Relocation Command message to the source MME 121S. The Relocation Command message causes the relocation of mobility management and bearer management of UEs from the source MME 121S to at least one target MME 121T. The Relocation Command message contains a relocation policy indicating an identifier of at least one target MME 121T. The identifier of the target MME 121T may be, for example, a Globally Unique MME Identity (GUMMEI), an MME Identifier (MMEI) or an MME Code (MMEC). The GUMMEI is used to globally uniquely identify an MME and is composed of a Public Land Mobile Network Identifier (PLMN ID) and an MMEI. The MMEI is used to uniquely identify an MME within a PLMN and is composed of an MME Group Identifier (MMEGI) and an MMEC. The MMEC is an 8-bit code that is used to uniquely identify an MME within a MME group.

The relocation policy may indicate the amount of processing of mobility management and bearer management to be relocated from the source MME 121S to at least one target MME 121T. The amount of processing of mobility management and bearer management may be indicated as the number of UEs, the amount of use of processor resources, the amount of use of memory resources, the number of occurrences of signaling, the amount of traffic, or any combination thereof.

The relocation policy may indicate temporal constraints on the relocation. To be specific, the relocation policy may indicate the start time of the relocation, the end time of the relocation, or the period during which execution of the relocation is allowed.

When a plurality of signaling procedures are available for the relocation from the source MME 121S to the target MME 121T, the relocation policy may indicate which of the plurality of signaling procedures is to be used. The plurality of signaling procedures may include, for example, a procedure with a reduced signaling load, a procedure with a larger signaling load which can complete the relocation in a shorter time, a procedure to perform relocation only for UEs in the idle state (i.e., ECM-IDLE State), a procedure to perform relocation for UEs in the connected state (i.e., ECM-CONNECTED state). Specific examples of the signaling procedure to relocate mobility management and bearer management to the target MME 121T are described later.

For example, the control node 142 may acquire the load of the source MME 121S, determine the necessity of the relocation based on the load of the source MME 121S, and determine the relocation policy based on the load of the source MME 121S.

Referring back to FIG. 2, in Step S13, the source MME 121S initiates the signaling procedure for relocating mobility management and bearer management to the target MME 121T in accordance with the relocation policy indicated by the Relocation Command message. Specific examples of this signaling procedure are described later.

In Step S14, the source MME 121S transmits to the control node 142 a Context Relocation Complete message indicating the completion of relocation.

In Step S15, the target MME 121T performs the mobility management and bearer management, which have been taken over from the source MME 121S, and maintains the MM context and EPS bearer context of UEs.

In the above-described example, the relocation of mobility management and bearer management according to the command from the control node 142 is performed for a plurality of UEs. However, the relocation according to the command from the control node 142 may be performed for one UE.

As is understood from the above description, in this illustrative embodiment, the control node 142 is configured to transmit the Relocation Command message to the source MME 121S. Further, the source MME 121S is configured to relocate the mobility management and bearer management of the UE 111 to the target MME 121T in accordance with the Relocation Command message received from the control node 142. Thus, according to this illustrative embodiment, it is possible to relocate the mobility management and bearer management of the UE 111 to the target MME 121T regardless of whether the UE 111 has moved between cells or between tracking areas.

Note that, the control node 142 may instruct the source MME 121S or the target MME 121T to perform relocation through another control node (mediation node). In other words, the control node 142 may transmit a Relocation Command message regarding the source MME 121S to another control node (mediation node), and this another control node (mediation node) may instruct the source MME 121S or the target MME 121T to perform relocation based on the received Relocation Command message. For example, according to the Relocation Command message received from the control node 142, this another control node (mediation node) may generate configuration information for the source MME 121S and the target MME 121T or may generate control messages which the source MME 121S and the target MME 121T can decode. In this case, the control node 142 may be, for example, an OSS, an SDN controller or an NFV controller, and the above-described another control node (mediation node) may be an EMS.

The procedure for relocating the mobility management and bearer management from the source MME 121S to the target MME 121T may involve an S-GW relocation (or S-GW change). The S-GW relocation means changing, from the S-GW 123 to another S-GW, the route of the EPS bearer (i.e., termination points of S1 and S5/S8 bearers) for the UE 111 that has been managed by the source MME 121S.

In one example, the target MME 121T may autonomously select an S-GW based on the S-GW selection function implemented therein. Alternatively, the control node 142 may select an S-GW as the destination of the relocation (which is referred to as a target S-GW). Specifically, the control node 142 may add the designation of the target S-GW to the Context Relocation Command message to be transmitted to the source MME 121S. In this case, in the relocation procedure (Step S13 in FIG. 2), the source MME 121S may inform the target MME 121T about the address of the target S-GW.

Figure 3A:
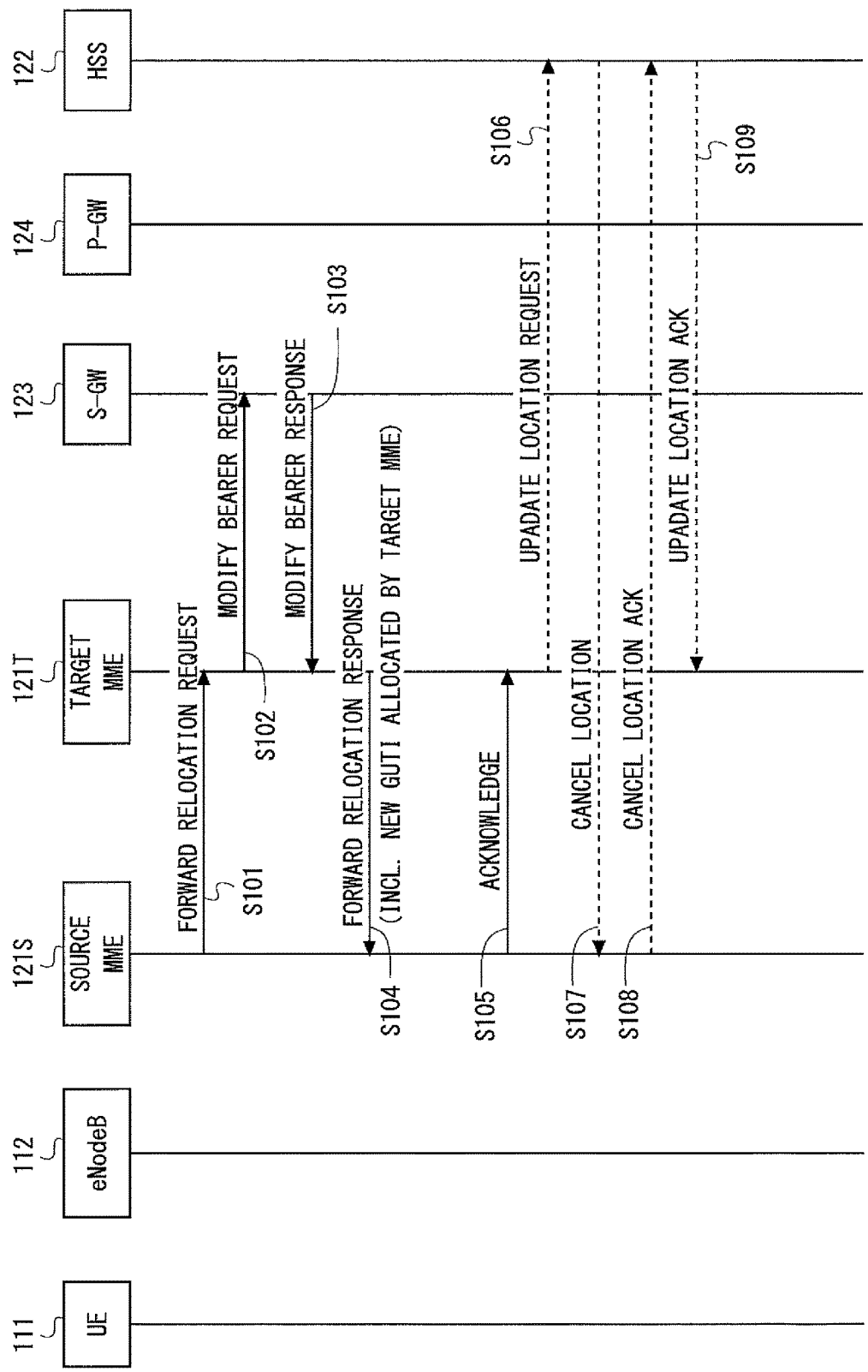
FIG. 3A is a sequence chart showing a specific example of a relocation procedure of a mobility management context and a bearer context according to an illustrative embodiment of the invention.
Figure 3B:
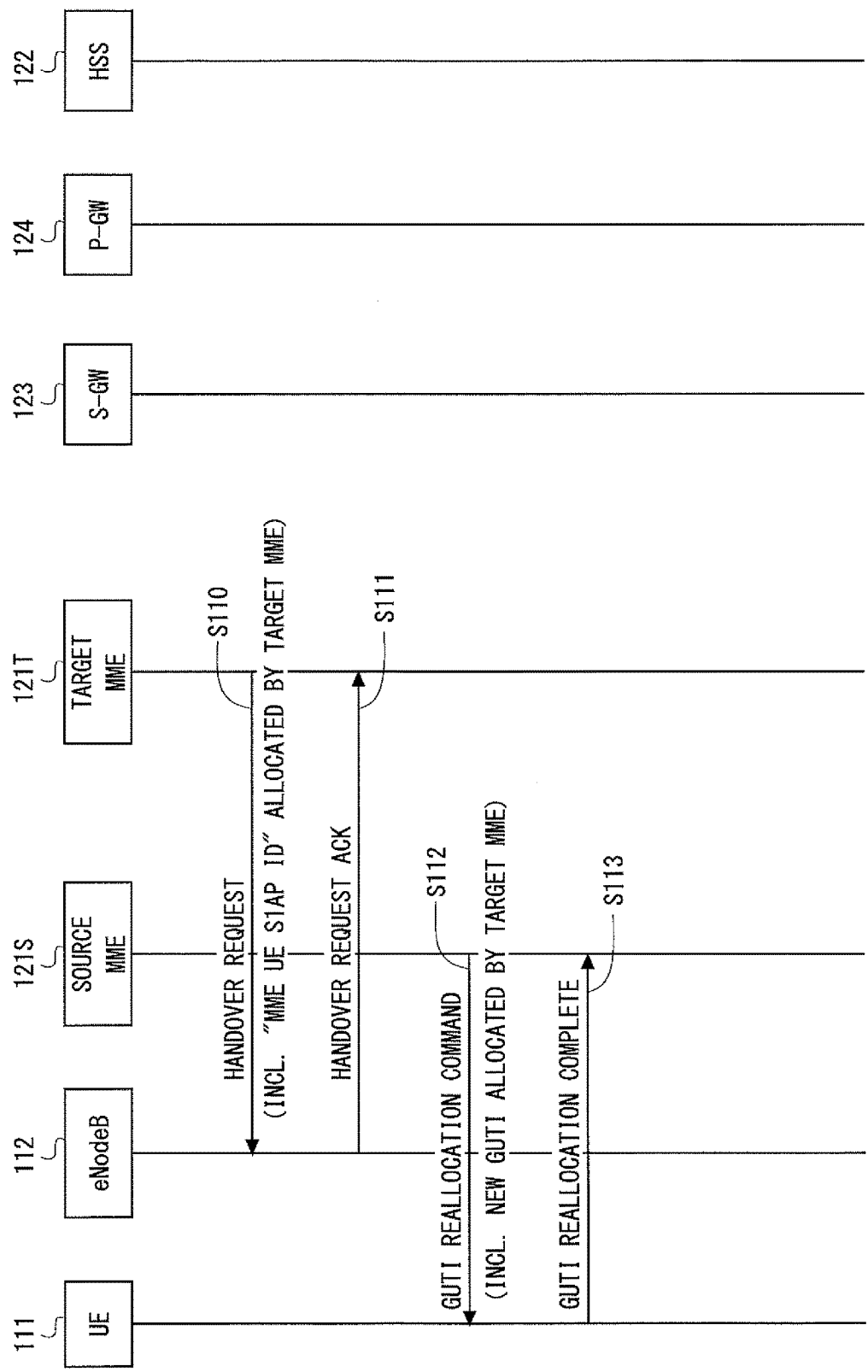
FIG. 3B is a sequence chart showing a specific example of a relocation procedure of a mobility management context and a bearer context according to an illustrative embodiment of the invention.

Hereinafter, one of specific examples of the signaling procedure to relocate the mobility management and bearer management to the target MME 121T is described. The sequence charts of FIGS. 3A and 3B show one example of the signaling procedure for the relocation. The procedure shown in FIGS. 3A and 3B can be performed in Step S13 of FIG. 2. Thus, the source MME 121S may initiate the signaling procedure shown in FIGS. 3A and 3B in response to receiving the Relocation Command message from the control node 142. The signaling procedure shown in FIGS. 3A and 3B is initiated when the UE 111 is in the connected state (i.e., ECM-CONNECTED state).

In Step S101, the source MME 121S transmits an MM context and an EPS bearer context of the UE 111 to the target MME 121T. For this transmission, a GPRS Tunnelling Protocol for the Control Plane (GTP-C) message that is transmitted on the S10 interface between MMEs may be used. For example, as shown in FIG. 3A, a Forward Relocation Request message or a modification thereof may be used. The Forward Relocation Request message is a message that is transmitted from a source MME to a target MME in the S1-based handover procedure. The Forward Relocation Request message in Step S101 may contain an information element indicating that it is a message transmitted for a Context Relocation, not for an S1-based handover.

In Step S102, the target MME 121T stores the MM context and EPS bearer context of the UE 111, which have been received from the source MME 121S, in its memory or storage (not shown). Further, in response to receiving the MM context and EPS bearer context of the UE 111, the target MME 121T requests the S-GW 123 to update the EPS bearer context of the UE 111 stored in the S-GW 123. This request indicates the IP address and MME TEID of the new MME that manages the EPS bearer of the UE 111, i.e., the target MME 121T. For the transmission of this request, a GTP-C message that is transmitted on the S11 interface between the MME 121T and the S-GW 123 may be used.

For example, as shown in FIG. 3A, a Modify Bearer Request message or a modification thereof may be used.

In Step S103, the S-GW 123 updates the MME IP address and the MME TEID associated with the EPS bearer context of the UE 111 and transmits a response message (e.g., Modify Bearer Response message) to the target MME 121T.

In Step S104, the target MME 121T informs the source MME 121S that it has accepted the taking over of the mobility management and bearer management of the UE 111. For the transmission of this notification, a GTP-C message that is transmitted on the S10 interface between MMEs may be used. For example, as shown in FIG. 3A, a Forward Relocation Response message or a modification thereof may be used. Alternatively, a Forward Relocation Complete Notification message or a modification thereof may be used.

The notification message in Step S104 contains a temporary identifier allocated to the UE 111 by the target MME 121T, i.e., an MME Mobile Subscriber Identity (M-TMSI), an SAE Temporary Mobile Subscriber Identity (S-TMSI), or a Globally Unique Temporary UE Identity (GUTI). The M-TMSI is a temporary identifier that is unique within one MME (i.e., target MME 121T). The S-TMSI is a temporary identifier that is unique within one MME group, and it is composed of an MMEC and an M-TMSI. The GUTI is a globally unique temporary identifier and is composed of a GUMMEI and an M-TMSI.

In Step S105, the source MME 121S transmits, to the target MME 121T, an Acknowledge message responsive to the message in Step S104. For the transmission of this Acknowledge message, a GTP-C message that is transmitted on the S10 interface between MMEs may be used. The Acknowledge message may be a Forward Relocation Complete Acknowledge message or a modification thereof.

Steps S106 to S109 are performed to notify the HSS 122 of the MME change. Steps S106 to S109 may be the same as a procedure to notify an HSS of an MME change in a normal TAU procedure. Alternatively, the HSS 122 may be notified of the MME change in a normal TAU procedure that is performed after the completion of the relocation procedure shown in FIGS. 3A and 3B. Thus, Steps S106 to S109 may be omitted.

In Step S106, the target MME 121T transmits a message for informing the HSS 122 about the MME change related to the UE 111. For the transmission of this message, a Diameter message that is transmitted on the S6a interface between the MME 121T and the HSS 122 may be used. As shown in FIG. 3A, an Update Location Request message may be used, like in a normal TAU procedure.

In Step S107, the HSS 122 transmits a Cancel Location message to the source MME 121S to notify it that the MM context and EPS bearer context of the UE 111 can be deleted. The Cancel Location message indicates the International Mobile Subscriber Identity (IMSI) of the UE 111. In Step S108, the source MME 121S deletes the MM context and EPS bearer context of the UE 111 according to need. Then, the source MME 121S transmits a Cancel Location Ack message to the HSS 122. The Cancel Location Ack message indicates the International Mobile Subscriber Identity (IMSI) of the UE 111. In Step S109, the HSS 122 acknowledges the Update Location Request and transmits an Update Location Ack message to the target MME 121T.

In Step S110, the target MME 121T informs the eNodeB 112 about an MME UE S1AP ID allocated by the target MME 121T to start signaling for the UE 111 between the eNodeB 112 and the target MME 121T. This notification may be transmitted using an S1AP message that is transmitted on the S1-MME interface between the target MME 121T and the eNodeB 112. The target MME 121T may use, for example, a modified Handover Request message, a modified E-RAB Modify Request message, or a modified UE Context Modification Request message.

In Step S111, the eNodeB 112 transmits, to the target MME 121T, an
Acknowledge message responsive to the message in Step S110. For the transmission of this Acknowledge message, an S1AP message that is transmitted on the S1-MME interface may be used. The Acknowledge message may be a Handover Request Ack message, an E-RAB Modify Response message, an UE Context Modification Response message, or a modification thereof.

In Step S112, the source MME 121S informs the UE 111 about the ID of the new MME after relocation (i.e., target MME 121T). Further, the source MME 121S informs the UE 111 about the temporary identifier allocated to the UE 111 by the target MME 121T. To be specific, the source MME 121S may notify the UE 111 of the GUTI that is composed of the GUMMEI of the target MME 121T and the M-TMSI allocated to the UE 111 by the target MME 121T.

In Step S112, the source MME 121S may operate as follows. First, after receiving the message in Step S111, the target MME 121T may notify the source MME 121S that the relocation has completed with use of a Handover Command message (or another message between MMEs), for example, and the source MME 121S may receive this notification and then transmit the message in Step S112.

In Step S112, a Non-Access Stratum (NAS) message may be used. The NAS message is not terminated at the E-UTRAN 110 and transparently transmitted between the UE 111 and the MME 121S. For example, as shown in FIG. 3B, a GUTI Reallocation Command message may be used. Alternatively, a new NAS message may be defined and used.

In Step S113, the UE 111 receives, from the source MME 121S, the new GUTI allocated by the target MME 121T. Then, the UE 111 updates the registered MME information, which is managed by the UE 111 itself, with the new GUTI. The UE 111 then transmits, to the source MME 121S, a NAS message (e.g., GUTI Reallocation Complete message) indicating the completion of receipt of the GUTI. The registered MME information that has been updated to indicate the target MME 121T is used for subsequent transmissions of RRC messages and NAS messages (e.g., TAU Request, and Service Request). After receiving the NAS message (e.g., GUTI Reallocation Complete message) in Step S113, the source MME 121S may inform the target MME 121T that the notification of the relocation for the UE 111 has completed.

The example shown in FIGS. 3A and 3B is merely an example. For example, in Step S110, the source MME 121S, instead of the target MME 121T, may notify the eNodeB 112 of the MME UE S1AP ID allocated by the target MME 121T. Further, in Step S112, the target MME 121T, instead of the source MME 121S, may notify the UE 111 of the ID (e.g., GUMMEI) of the target MME 121T or the UE temporary identifier (e.g., GUTI).

Further, in the relocation procedure from the source MME 121S to the target MME 121T shown in FIGS. 3A and 3B, the security key-related information (e.g., KeNB, KeNB*, Next Hop Chaining Count (NHCC), and Next-Hop (NH)) used when the UE 111 has been registered with the source MME 121S may be reused without updating the information. Alternatively, the source MME 121S (or the target MME 121T) may derive new security key-related information, as in the case of handover, and send it to the UE 111 via the eNodeB 112.

In the case of reusing the security key-related information without updating it, the source MME 121S may transmit a NAS: GUTI Reallocation Command message (or new NAS message) to the eNodeB 112 with use of an S1AP message, and the eNodeB 112 may transmit this GUTI Reallocation Command message to the UE 111 in Step S112 with use of an RRC Connection Reconfiguration message. On the other hand, in the case of updating the security key-related information, the source MME 121S may transmit a NAS: GUTI Reallocation Command message (or new NAS message) to the eNodeB 112 with use of an S1AP message, and the eNodeB 112 may transmit this GUTI Reallocation Command message to the UE 111 in Step S112 with use of an RRC Connection Reconfiguration message containing an mobilityControlInfo IE.

In Step S112, the target MME 121T, instead of the source MME 121S, may notify the UE 111 of the new GUTI. For example, the source MME 121S may transmit a GUTI Reallocation Command message indicating the new GUTI to the UE 111. In this case, the UE 111 may transmit a NAS message (e.g., GUTI Reallocation Complete message) indicating the completion of receipt of the GUTI to the target MME 121T in Step S113.

Other examples of the signaling procedure for relocating mobility management and bearer management from the source MME 121S to the target MME 121T are described in the illustrative embodiments described below.

Second Illustrative Embodiment

Figure 4:
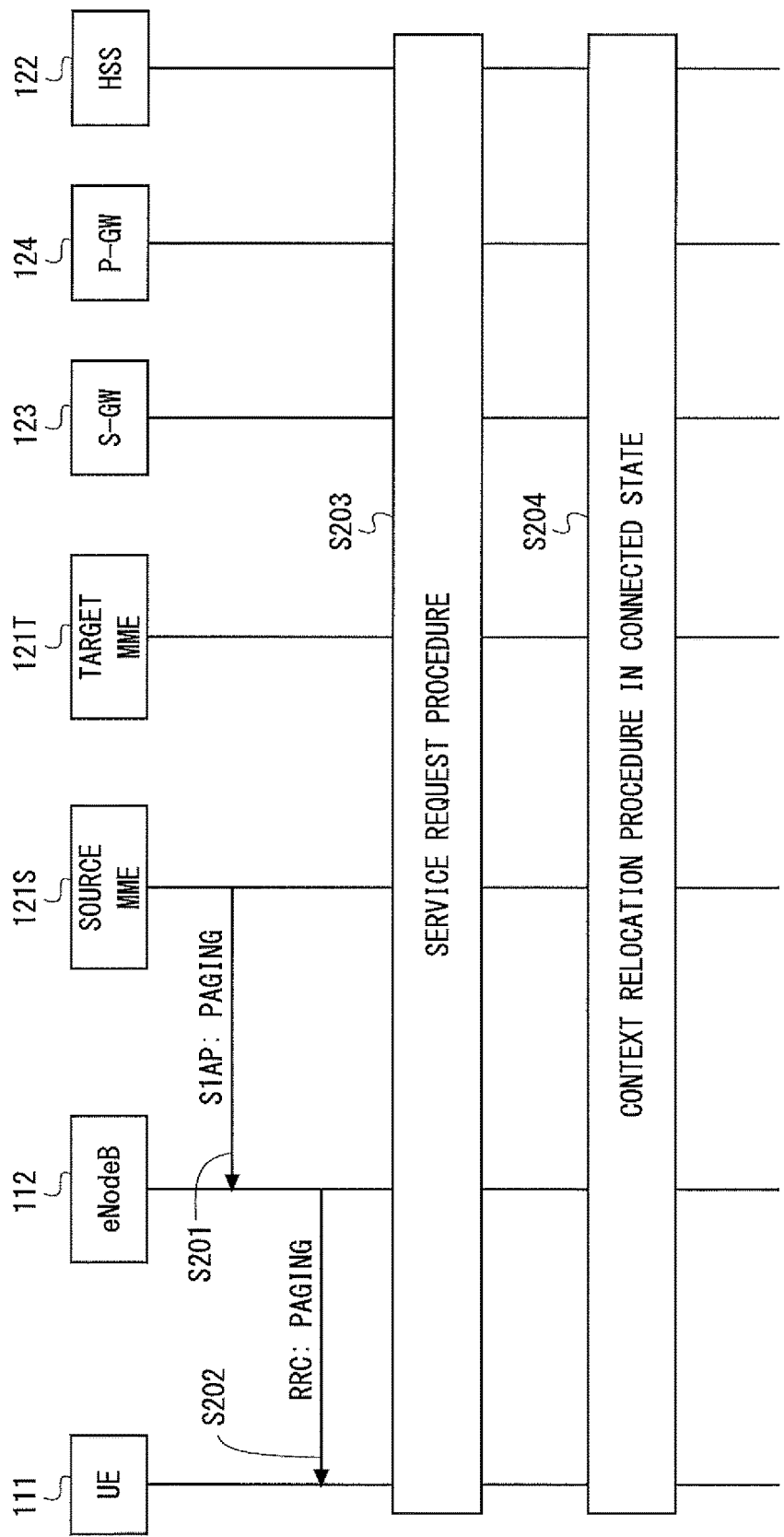
FIG. 4 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 4 shows one example of the signaling procedure for the relocation. The procedure of FIG. 4 can be performed in Step S13 of FIG. 2. Specifically, the source MME 121S may initiate the signaling procedure shown in FIG. 4 in response to receiving the Context Relocation Command message from the control node 142. The signaling procedure shown in FIG. 4 is initiated when the UE 111 is in the idle state (i.e., ECM-IDLE state). In the procedure of FIG. 4, the source MME 121S uses a Network triggered Service Request procedure to notify the UE 111 of the relocation.

Specifically, in Step S201, the source MME 121S transmits a Paging message to the eNodeB 112 and other eNodeBs included in the tracking area of the UE 111 (S1AP: Paging). In Step S202, the eNodeB 112 receives the S1AP: Paging, creates an RRC: Paging message, and transmits the RRC: Paging message through a Paging control channel (PCCH), a Paging channel (PCH), and a Physical downlink shared channel (PDSCH). This RRC: Paging message is addressed to the temporary identifier (i.e., S-TMSI) that the source MME 121S has allocated to the UE.

In Step S203, the UE 111 initiates a UE triggered Service Request procedure in response to receiving the Paging. Upon the completion of Step S203, the UE 111 enters the connected state (i.e., ECM-CONNECTED state). In Step S204, the source MME 121S initiates the relocation procedure where the UE 111 is in the connected state (i.e., ECM-CONNECTED state). In Step S204, the source MME 121S may perform the procedure shown in FIGS. 3A and 3B.

According to the procedure of FIG. 4, it is possible to relocate the mobility management and bearer management of the UE 111 in the idle state (i.e., ECM-IDLE state).

Third Illustrative Embodiment

Figure 5:
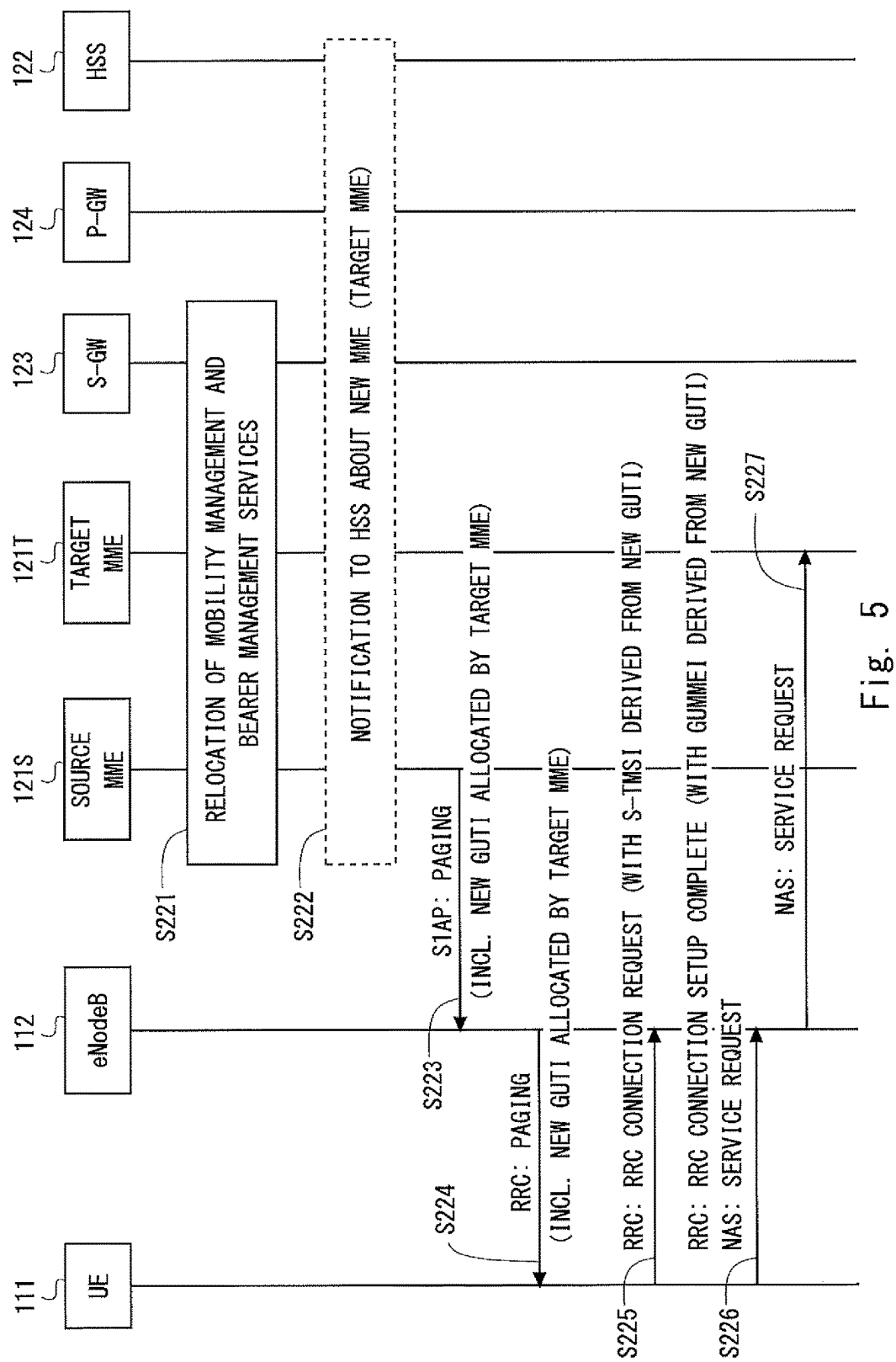
FIG. 5 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 5 shows one example of the signaling procedure for the relocation. The procedure of FIG. 5 can be performed in Step S13 of FIG. 2. Specifically, the source MME 121S may initiate the signaling procedure shown in FIG. 5 in response to receiving the Context Relocation Command message from the control node 142. The signaling procedure shown in FIG. 5 is initiated when the UE 111 is in the idle state (i.e., ECM-IDLE state). In the procedure of FIG. 5, the source MME 121S transmits the UE temporary identifier (i.e., S-TMSI or GUTI) containing the ID of the target MME 121T (i.e., GUMMEI, MMEI or MMEC) to the UE 111 in the idle state.

In Step S221, the source MME 121S relocates, to the target MME 121T, the mobility management service and the bearer management service of the UE 111 that has attached to the EPC 120 (i.e., in EMM-REGISTERED state). The procedure performed in Step S221 may be the same as the procedure performed in Steps S101 to S105 in FIG. 3A. In Step S222, the target MME 121T notifies the HSS 122 of the MME change. The procedure performed in Step S222 may be the same as the procedure to notify an HSS of an MME change in the normal TAU procedure, and therefore it may be the same as the procedure performed in Steps S106 to S109 in FIG. 3A). Step S222 may be omitted, like Steps S106 to S109 in FIG. 3A described above.

In Steps S223 and S224, the source MME 121S informs the UE 111 about the ID of the new MME after relocation (i.e., target MME 121T) and the UE temporary identifier allocated to the UE 111 by the target MME 121T. To be specific, the source MME 121S may notify the UE 111 of the GUTI allocated to the UE 111 by the target MME 121T. In the example of FIG. 5, Paging is used to notify the UE 111 of the new GUTI.

Specifically, in Step S223, the source MME 121S transmits a Paging message to the eNodeB 112 and other eNodeBs included in the tracking area (S1AP: Paging). This Paging message is addressed to the temporary identifier (i.e., S-TMSI) that the source MME 121S has allocated to the UE and indicates the new GUTI that is allocated to the UE 111 by the target MME 121T. In Step S224, the eNodeB 112 receives the S1AP: Paging, creates an RRC: Paging message, and transmits the RRC: Paging message through a Paging control channel (PCCH), a Paging channel (PCH), and a Physical downlink shared channel (PDSCH). This RRC: Paging message is addressed to the temporary identifier (i.e., S-TMSI) that the source MME 121S has allocated to the UE and indicates the new GUTI that is allocated to the UE 111 by the target MME 121T.

The UE 111 receives the Paging message of Step S224 and updates the registered MME information, which is managed by the UE 111 itself, with the new GUTI that is allocated by the target MME 121T. The registered MME information that has been updated to indicate the target MME 121T is used for subsequent transmissions of RRC messages and NAS messages (e.g., TAU Request, and Service Request). For example, as shown in Steps S225 to S227 in FIG. 5, the UE 111 uses the GUTI allocated by the target MME 121T or the S-TMSI or GUMMEI, which is derived from the GUTI, in a Service Request message and in an RRC connection establishment procedure for transmitting a Service Request message.

In order to notify the UE 111 of the relocation using the above-described Paging message (RRC: Paging message), a new information element (e.g., relocationIndication) may be defined in the Paging message, for example, and the eNodeB 112 may send the paging message with the relocationIndication containing valid information. For example, the relocationIndication indicates the GUTI that is newly allocated to the UE 111 by the target MME 121T. FIGS. 21 and 22 show a specific example of the structure of the Paging message extended to include the relocationIndication indicating the GUTI allocated by the target MME 121T.

In FIG. 21, the eNodeB transmits, only to the UE for which the relocation is made, the Paging message containing relocationIndication-rXYZ, i.e., where this IE is set to True. For example, if the PagingUE-Identity (e.g., s-TMSI) contained in the Paging message matches the one allocated to the UE, the UE checks whether the relocationIndication-rXYZ is contained in the Paging message, and performs the above-described relocation procedure if the relocationIndication-rXYZ is contained therein.

On the other hand, FIG. 22 is an example in the case where the relocation command is sent concurrently to one or more UEs for which the relocation is made. For example, the Paging message may be a specific paging message used only for the relocation. The eNodeB inserts, in the Paging message, the PagingUE-Identity(ies) of the UE(s) for which the relocation is made, further inserts the relocationIndication-rXYZ in the Paging message (i.e., sets it to True), and then sends the Paging message. Also in this case, for example, if the PagingUE-Identity (e.g., s-TMSI) contained in the Paging message matches the one allocated to the UE, the UE checks whether the relocationIndication-rXYZ is contained in the Paging message, and performs the above-described relocation procedure if the relocationIndication-rXYZ is contained therein. Note that, the postfix "-rXYZ" of the relocationIndication in FIGS. 21 and 22 indicates the release number of the specification by which the IE is defined, which is shown for the convenience of description. Thus, the relocationIndication-rXYZ is the same as the relocationIndication in the above description.

Referring back to FIG. 5, in Step S225, the UE 111 transmits an RRC Connection Request message to the eNodeB 112 in an RRC connection establishment procedure. The RRC Connection Request message contains the UE Identity that indicates the S-TMSI derived from the new GUTI allocated by the target MME 121T. In Step S226, in the RRC connection establishment procedure, the UE 111 transmits to the eNodeB 112 an RRC Connection Setup Complete message containing the Registered MME information that indicates the GUMMEI derived from the new GUTI. This RRC Connection Setup Complete message encapsulates a NAS message, i.e., a Service Request message in this case. In Step S227, the eNodeB 112 extracts the Service Request message from the RRC Connection Setup Complete message, selects the target MME 121T based on the S-TMSI received in Step S225, and transmits to the target MME 121T an S1AP: Initial UE Message containing the Service Request message and the S-TMSI.

According to the procedure of FIG. 5, it is possible to notify the UE 111 of the occurrence of the relocation of mobility management and bearer management by modifying the format of the existing paging message and using the existing paging mechanism.

Note that the procedure of FIG. 5 may be modified so that the target MME 121T, instead of the source MME 121S, transmits the Paging message in Step S223.

Fourth Illustrative Embodiment

Figure 6:
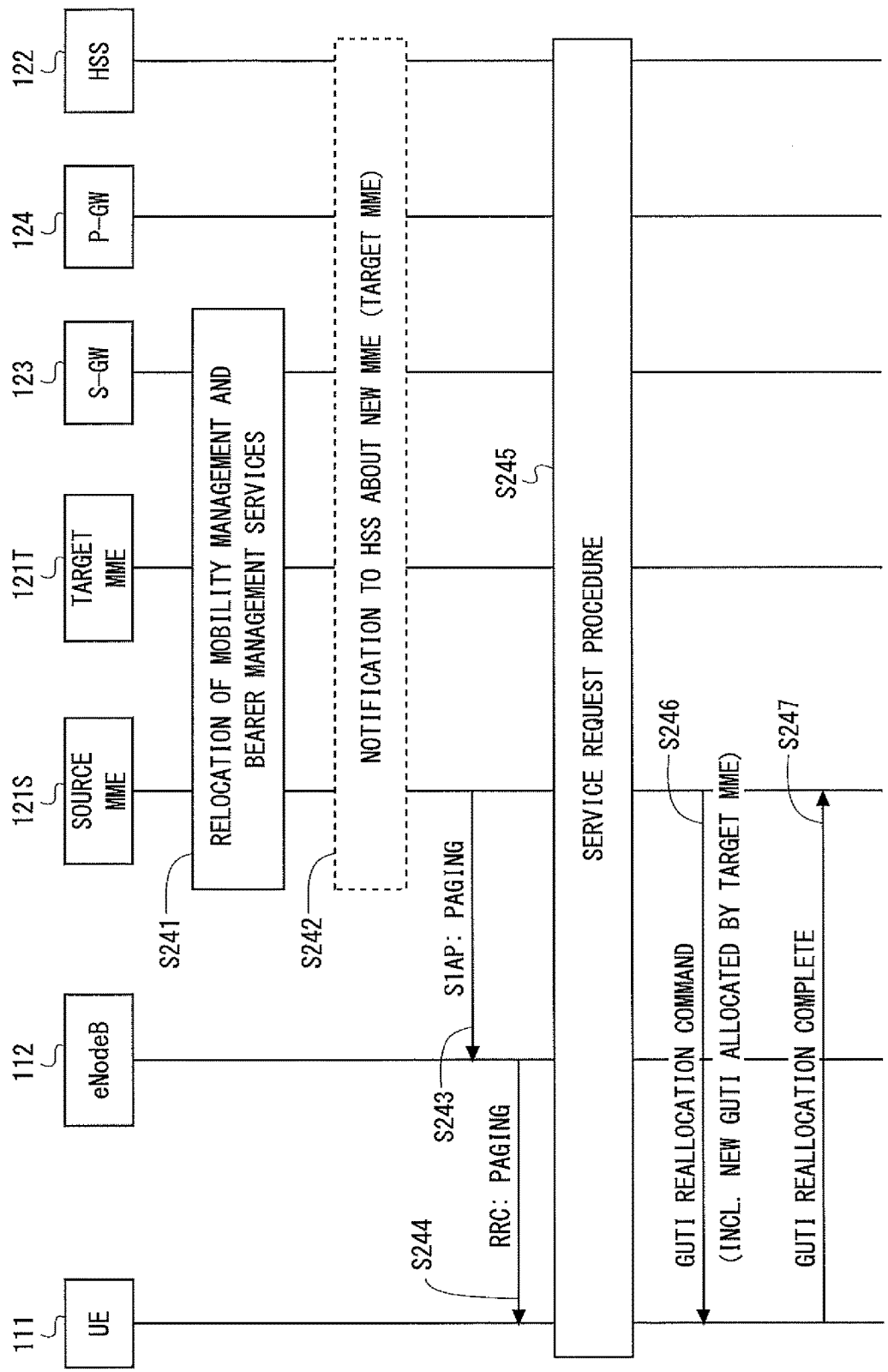
FIG. 6 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 6 shows one example of the signaling procedure for the relocation. The procedure of FIG. 6 can be performed in Step S13 of FIG. 2. Specifically, the source MME 121S may initiate the signaling procedure shown in FIG. 6 in response to receiving the Context Relocation Command message from the control node 142. The signaling procedure shown in FIG. 6 is initiated when the UE 111 is in the idle state (i.e., ECM-IDLE state). In the procedure of FIG. 6, the source MME 121S uses a Network triggered Service Request procedure to notify the UE 111 of the relocation.

The procedures performed in Steps S241 and S242 are the same as those performed in Steps S221 and S222 in FIG. 5. Step S242 may be omitted.

In Step S243, the source MME 121S initiates the Network triggered Service Request procedure for signaling with the UE 111 in the idle state. Specifically, in Step S243, the source MME 121S transmits a Paging message to the eNodeB 112 and other eNodeBs included in the tracking area of the UE 111 (S1AP: Paging). In Step S244, the eNodeB 112 receives the S1AP: Paging and transmits an RRC: Paging message. This RRC: Paging message is addressed to the temporary identifier (i.e., S-TMSI) that has been allocated to the UE by the source MME 121S.

In Step S245, the UE 111 initiates a UE triggered Service Request procedure in response to receiving the Paging. Upon the completion of Step S245, the UE 111 enters the connected state (i.e., ECM-CONNECTED state).

In Step S246, the source MME 121S informs the UE 111 about the ID of the new MME after relocation (i.e., target MME 121T). Further, the source MME 121S informs the UE 111 about the temporary identifier allocated to the UE 111 by the target MME 121T. To be specific, the source MME 121S may notify the UE 111 of the GUTI allocated to the UE 111 by the target MME 121T. In Step S246, a NAS message may be used. For example, a GUTI Reallocation Command message may be used as shown in FIG. 6. Alternatively, a new NAS message may be defined and used.

In Step S247, the UE 111 receives, from the source MME 121S, the new GUTI allocated by the target MME 121T. Then, the UE 111 updates the registered MME information, which is managed by the UE 111 itself, with the new GUTI. The UE 111 then transmits, to the source MME 121S, a NAS message (e.g., GUTI Reallocation Complete message) indicating the completion of receipt of the GUTI. The registered MME information that has been updated to indicate the target MME 121T is used for subsequent transmissions of RRC messages and NAS messages (e.g., TAU Request, and Service Request).

The source MME 121S may delete the context regarding the UE 111 stored in the source MME 121S in response to receiving the NAS message from the UE 111 in Step S247.

According to the procedure of FIG. 6, it is possible to notify the UE 111 of the occurrence of the relocation of mobility management and bearer management by using the Network triggered Service Request procedure.

Note that the procedure of FIG. 6 may be modified so that the target MME 121T, instead of the source MME 121S, transmits the Paging message in Step S243 and notifies the UE of the GUTI in Step S246.

Further, the procedure of FIG. 6 may be modified so that the UE 111 is notified of the relocation when a Service Request message is received from the UE 111 in an UE triggered Service Request procedure, without starting the Paging by the source MME 121S or the target MME 121T. In this case, the source MME 121S maintains the context regarding the UE 111 until the Service Request message is received from the UE 111 and sending of the notification of the relocation (i.e., GUTI allocated by the target MME 121T) to the UE 111 is completed.

Fifth Illustrative Embodiment

Figure 7:
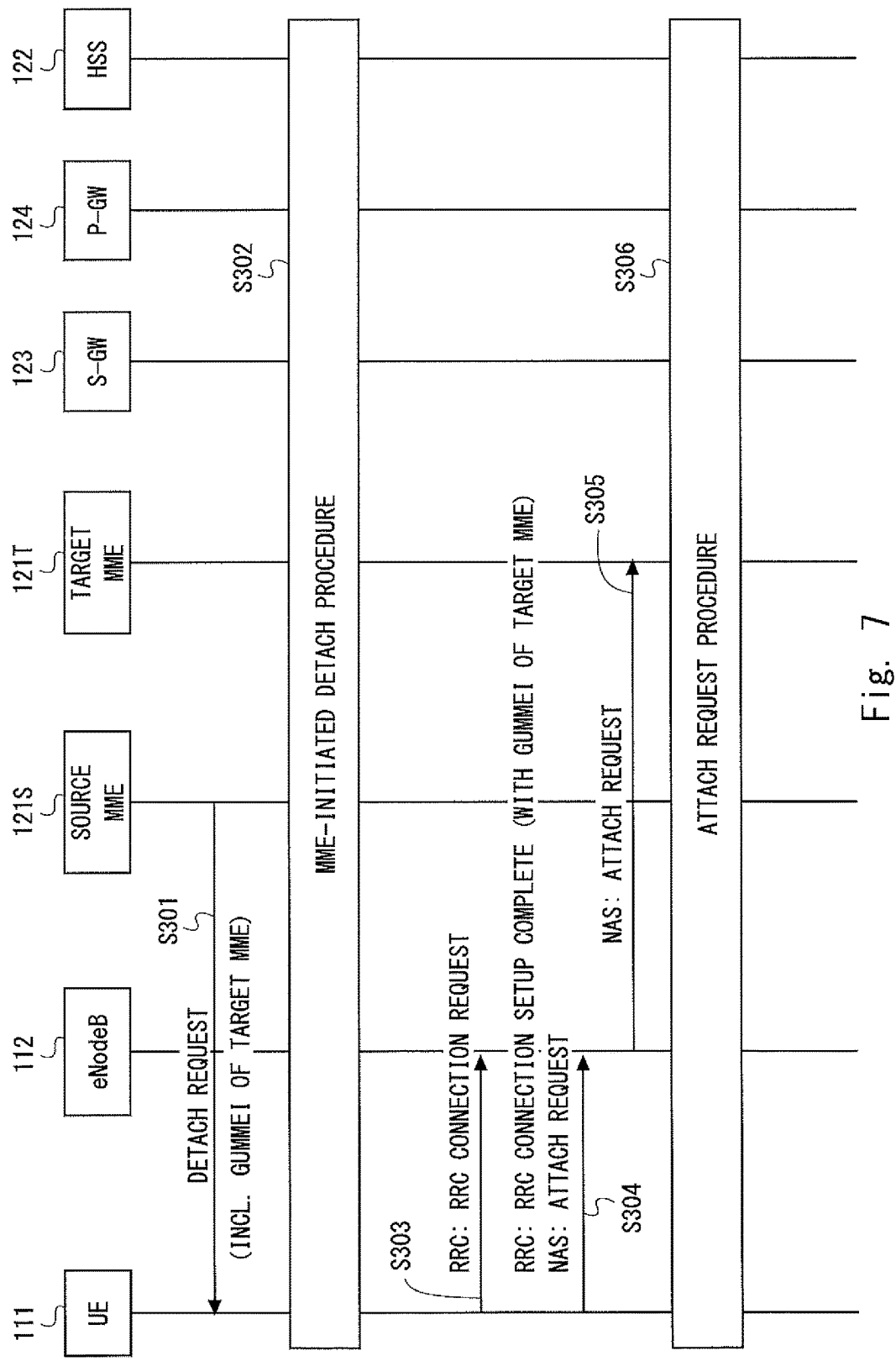
FIG. 7 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of a mobile communication network according to this illustrative embodiment may be the same as that shown in FIG. 1, which is described in relation to the first illustrative embodiment. The sequence chart of FIG. 7 shows one example of the signaling procedure for the relocation. The procedure of FIG. 7 can be performed in Step S13 of FIG. 2. Specifically, the source MME 121S may initiate the signaling procedure shown in FIG. 7 in response to receiving the Context Relocation Command message from the control node 142. In the procedure of FIG. 7, the source MME 121S transmits the ID of the target MME 121T (i.e., GUMMEI, MMEI or MMEC) to the UE 111 during an MME-initiated Detach procedure.

In Step S301, the source MME 121S transmits a Detach Request message to the UE 111. The Detach Request message contains the ID of the target MME 121T. The ID of the target MME 121T may be the GUMMEI, the MMEI or the MMEC. In Step S302, the MME-initiated Detach procedure is performed following the transmission of the Detach Request message in Step S301.

The UE 111 extracts the ID of the target MME 121T or the UE temporary identifier (e.g., GUMMEI, MMEI or MMEC) from the Detach Request message and stores it. The ID of the target MME 121T or the UE temporary identifier extracted from the Detach Request message are used when transmitting an RRC message and a NAS message (Attach Request) in the next Attach procedure.

Steps S303 to S306 are the procedure for the UE 111 to attach to the EPC 120 again. In Step S303, the UE 111 transmits, to the eNodeB 112, an RRC Connection Request message with the UE Identity indicating a random value in the RRC connection establishment procedure. In Step S304, the UE 111 transmits, to the eNodeB 112, an RRC Connection Setup Complete message with the Registered MME information indicating the GUMMEI of the target MME 121T in the RRC connection establishment procedure. The RRC Connection Setup Complete message encapsulates a NAS message, i.e., an Attach Request message in this case. In Step S305, the eNodeB 112 extracts the Attach Request message from the RRC Connection Setup Complete message, selects the target MME 121T based on the GUMMEI contained in the RRC Connection Setup Complete message, and transmits to the target MME 121T an S1AP: Initial UE Message containing the Attach Request message. In Step S306, the Attach procedure is performed following the transmission of the Attach Request message in Step S305.

In order to prevent the eNodeB 112 from performing MME selection by its MME selection function in Step S305, the RRC Connection Setup Complete message in Step S304 may explicitly indicate that MME selection by the MME selection function is not needed.

According to the procedure of FIG. 7, the UE 111 detaches from the EPC 120 and then attaches to it again, and it is thereby possible to take over the mobility management and bearer management of the UE 111 to the target MME 121T.

Sixth Illustrative Embodiment

Figure 8:
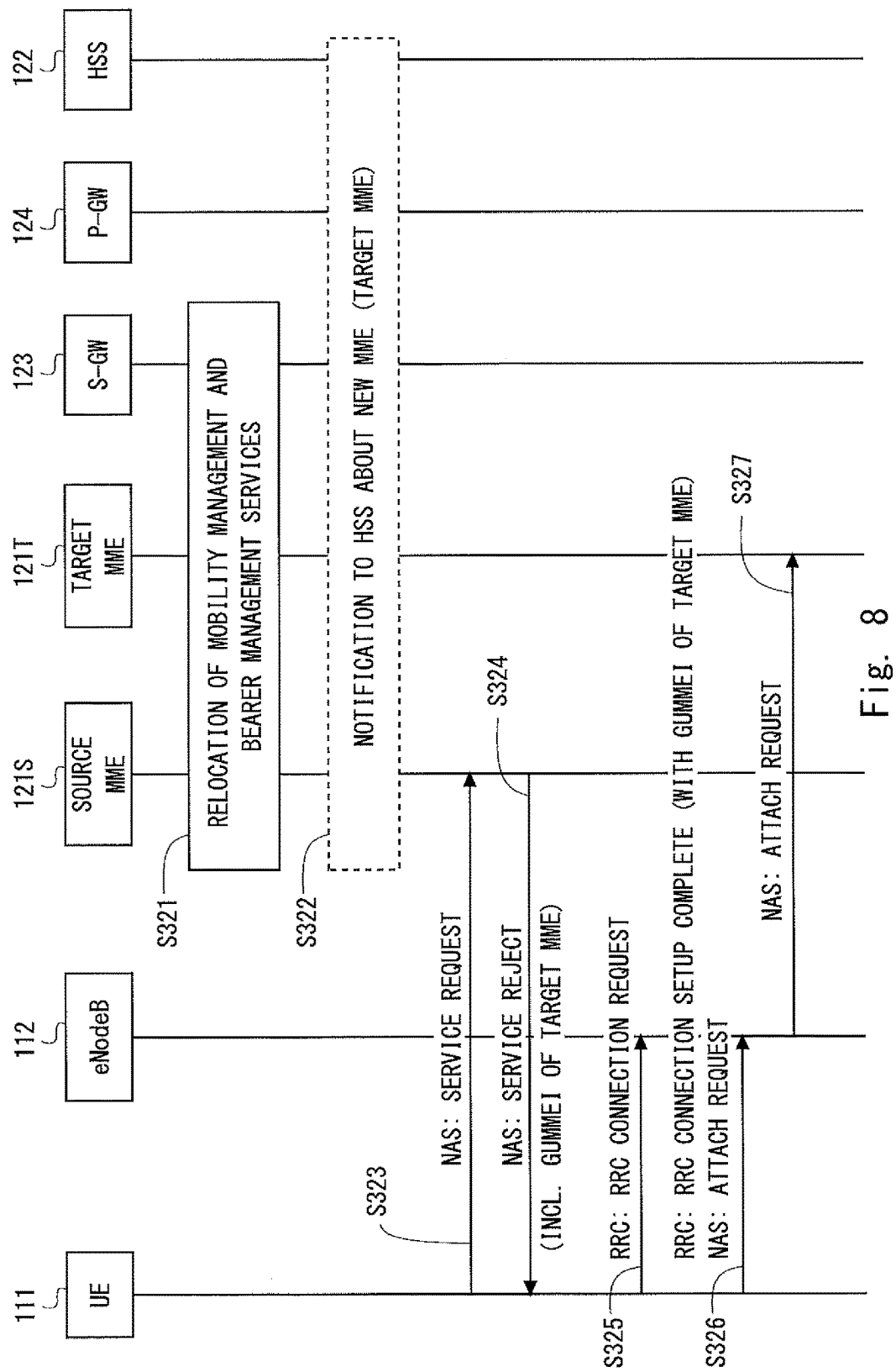
FIG. 8 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 8 shows one example of the signaling procedure for the relocation. The procedure of FIG. 5 can be performed in Step S13 of FIG. 2. Specifically, the source MME 121S may initiate the signaling procedure shown in FIG. 8 in response to receiving the Context Relocation Command message from the control node 142. The signaling procedure shown in FIG. 8 is initiated when the UE 111 is in the idle state (i.e., ECM-IDLE state). In the procedure of FIG. 8, the source MME 121S operates to transmit a Service Reject message in response to a Service Request message from the UE 111, in order to notify the UE 111 of the relocation.

The procedures performed in Steps S321 and S322 are the same as those performed in Steps S221 and S222 in FIG. 5. Step S322 may be omitted.

In Step S323, the source MME 121S receives a Service Request message from the UE 111. In Step S323, the source MME 121S transmits a Service Reject message in response to receiving the Service Request message. The Service Reject message indicates the identifier of the target MME 121T (e.g., GUMEI, MMEI or MMEC) or the new UE temporary identifier (e.g., S-TMSI or GUTI) that is allocated to the UE 111 by the target MME 121T.

The UE 111 receives the Service Reject message. Then, the UE 111 updates the registered MME information, which is managed by the UE 111 itself, with the new GUMEI, GUTI or the like, which has been sent by the Service Reject message. The registered MME information that has been updated to indicate the target MME 121T is used for subsequent transmissions of RRC messages and NAS messages (e.g., Attach Request, TAU Request, and Service Request).

In the procedure of FIG. 8, the UE 111 initiates the Attach procedure after receiving the Service Reject message. The processing performed in Steps S325 to S327 is the same as the processing performed in Steps S303 to S305 in FIG. 7.

According to the procedure of FIG. 8, it is possible to notify the UE 111 of the occurrence of the relocation of mobility management and bearer management by using the Service Reject message. Further, according to the procedure of FIG. 8, it is possible to perform the relocation from the source MME 121S to the target MME 121T at arbitrary timing, and to notify the UE 111 of the occurrence of the relocation when there is an access from the UE 111 to the EPC 120.

Note that the procedure of FIG. 8 may be modified so that the source MME 121S pages the UE 111 in order to prompt the UE 111 to transmit the Service Request message (Step S323).

Further, the procedure of FIG. 8 may be modified so that another NAS message different from the Service Reject message is used to notify the UE 111 of the identifier of the target MME 121T (e.g., GUMEI, MMEI or MMEC) or the new UE temporary identifier (e.g., S-TMSI or GUTI) that is allocated to the UE 111 by the target MME 121T. For example, a GUTI Reallocation Command message may be used. Alternatively, a new NAS message may be defined and used.

Furthermore, the procedure of FIG. 8 may be modified so that the UE 111 starts the Service Request procedure, instead of the Attach procedure, when receiving the Service Reject message or the NAS message.

Seventh Illustrative Embodiment

Figure 9:
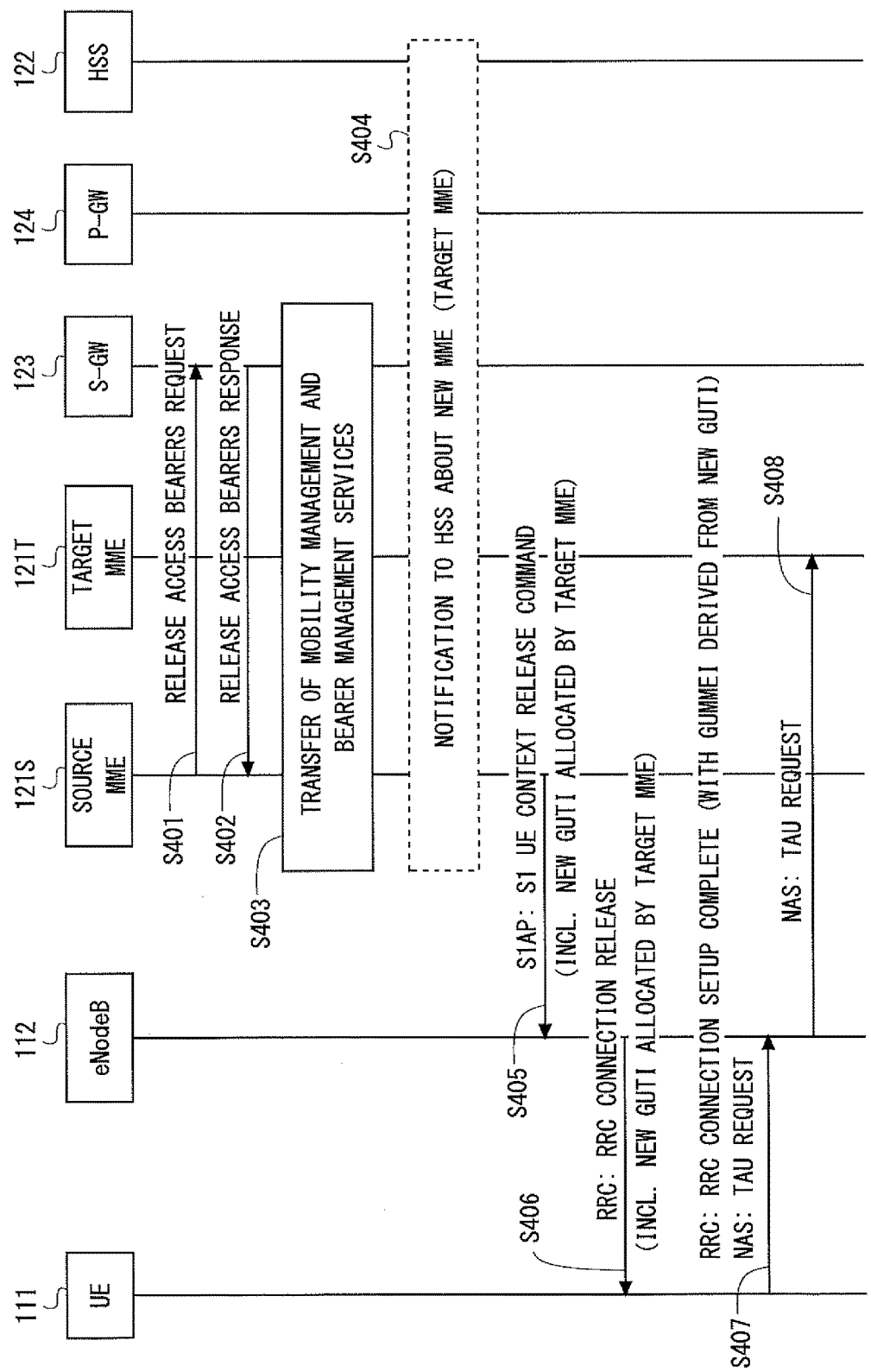
FIG. 9 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 9 shows one example of the signaling procedure for the relocation. The procedure of FIG. 9 can be performed in Step S13 of FIG. 2. Specifically, the source MME 121S may initiate the signaling procedure shown in FIG. 9 in response to receiving the Context Relocation Command message from the control node 142. In the procedure of FIG. 9, the source MME 121S transmits the UE temporary identifier (i.e., S-TMSI or GUTI) that contains the ID of the target MME 121T (i.e., GUMMEI, MMEI or MMEC) to the UE 111 during the S1 Release procedure.

In Step S401, the source MME 121S transmits to the S-GW 123 a Release Access Bearers Request message, which requests the release of all S1-U bearers for the UE 111. In Step S402, the S-GW 123 releases all of information related to the eNodeB for the UE 111 (i.e., information related to the S1-U bearers) and transmits a Release Access Bearers Response message to the source MME 121S.

The procedures performed in Steps S403 and S404 is the same as those performed in Steps S221 and S222 in FIG. 5. Step S402 may be omitted.

In Steps S405 and S406, the source MME 121S informs the UE 111 about the ID of the new MME after relocation (i.e., target MME 121T) and the UE temporary identifier allocated to the UE 111 by the target MME 121T. To be specific, the source MME 121S may notify the UE 111 of the new GUTI allocated to the UE 111 by the target MME 121T. In the example of FIG. 9, an RRC message that is transmitted from the eNodeB 112 for the release of the RRC connection (i.e., RRC: RRC Connection Release message) is used to notify the UE 111 of the new GUTI.

Specifically, in Step S405, the source MME 121S transmits an S1AP: S1 UE Context Release Command message to the eNodeB 112, which the UE 111 in the connected state (i.e., ECM-CONNECTED state) is currently connected to. This S1 UE Context Release Command message indicates the new GUTI allocated to the UE 111 by the target MME 121T. In Step S406, the eNodeB 112 transmits an RRC Connection Release message to the UE 111. This RRC Connection Release indicates the new GUTI allocated by the target MME 121T.

The UE 111 receives the RRC Connection Release message in Step S406 and updates the registered MME information, which is managed by the UE 111 itself, with the new GUTI allocated by the target MME 121T. The registered MME information that has been updated to indicate the target MME 121T is used for subsequent transmissions of RRC messages and NAS messages (e.g., TAU Request, and Service Request). For example, as shown in Step S407 of FIG. 9, the UE 111 uses the GUTI allocated by the target MME 121T or the S-TMSI or GUMMEI, which is derived from the GUTI, in a TAU Request messages and in an RRC connection establishment procedure for transmitting a TAU Request message.

In Step S407, in the RRC connection establishment procedure, the UE 111 transmits to the eNodeB 112 an RRC Connection Setup Complete message containing the Registered MME information indicating the GUMMEI, which is derived from the new GUTI allocated by the target MME 121T. This RRC Connection Setup Complete message encapsulates a NAS message, i.e., a TAU Request message in this case. In Step S408, the eNodeB 112 extracts the TAU Request message from the RRC Connection Setup Complete message, selects the target MME 121T based on the GUMMEI contained in the RRC Connection Setup Complete message, and transmits to the target MME 121T an S1AP: Initial UE Message containing the TAU Request message.

According to the procedure of FIG. 9, it is possible to notify the UE 111 of the occurrence of the relocation of mobility management and bearer management by modifying the existing S1 Release procedure and the message format of the S1 UE Context Release Command message and the RRC Connection Release message.

The format of the RRC Connection Release message may be modified as shown in FIG. 23, for example. Specifically, FIG. 23 shows one example of the modified format of the RRC Connection Release message. In the example of FIG. 23, the cause value "relocationMME" that indicates (means) the MME relocation command is added to the Release cause of the RRC Connection. The UE 111 may perform the above-described operation if the Release cause contained in the RRC Connection Release message is set to "relocationMME". Note that the cause value "relocationMME" is merely an example, and it may be, for example, "MMErelocation", "relocationRequired", "re-registeredRequired", "registrationUpdate", "registrationUpdateRequired", "GUTIupdate", "GUTIupdateRequired" or the like, as long as it indicates MME relocation.

Eighth Illustrative Embodiment

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment.

Figure 10A:
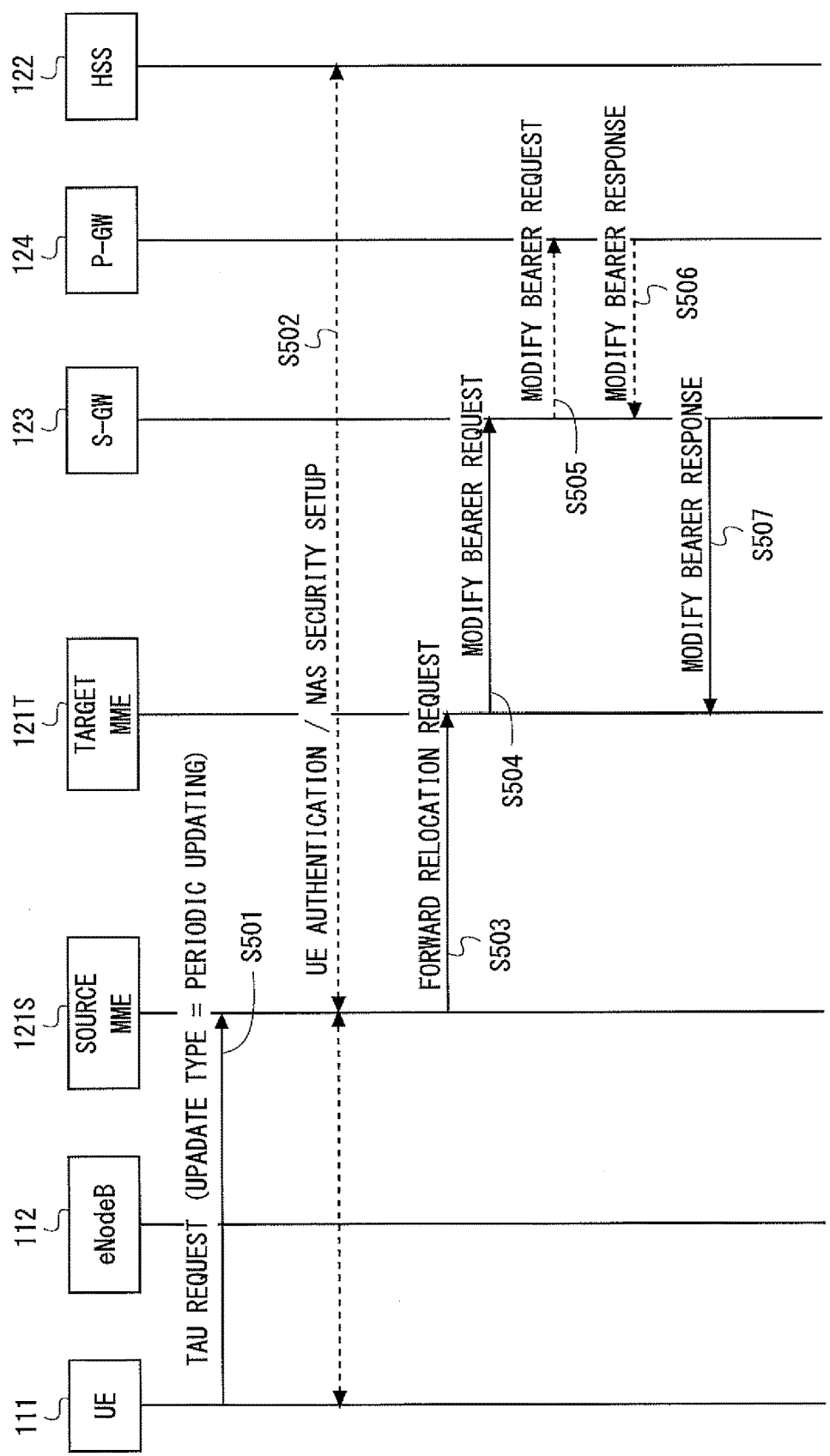
FIG. 10A is a sequence chart showing a specific example of a relocation procedure of a mobility management context and a bearer context according to an illustrative embodiment of the invention.
Figure 10B:
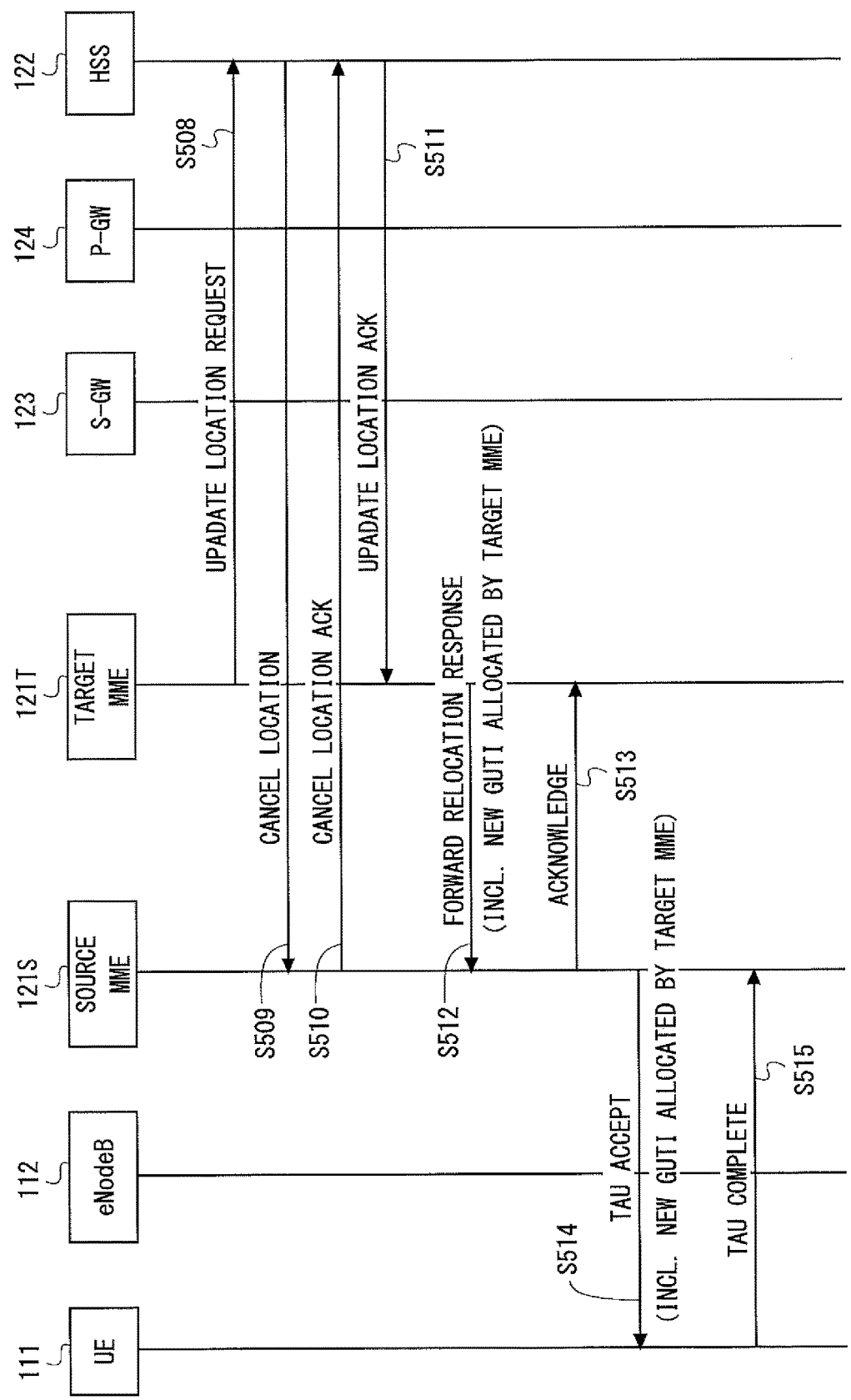
FIG. 10B is a sequence chart showing a specific example of a relocation procedure of a mobility management context and a bearer context according to an illustrative embodiment of the invention.

The sequence chart of FIGS. 10A and 10B shows one example of the signaling procedure for the relocation. The procedure of FIGS. 10A and 10B can be performed in Step S13 of FIG. 2. Specifically, the source MME 121S may initiate the signaling procedure shown in FIGS. 10A and 10B in response to receiving the Context Relocation Command message from the control node 142. In the procedure of FIGS. 10A and 10B, the source MME 121S transmits the UE temporary identifier (i.e., S-TMSI or GUTI) that contains the ID of the target MME 121T (i.e., GUMMEI, MMEI or MMEC) to the UE 111 during the Tracking Area Update (TAU) procedure.

In Step S501, the UE 111 is registered to the source MME 121S and is in the idle state (i.e., ECM-IDLE State). Upon the expiration of a periodic TAU timer, the UE 111 transmits a TAU Request message to the source MME 121S to notify the source MME 121S of the current Tracking Area Identity (TAI). This TAU Request message indicates that it is "Periodic Updating" by its update type.

In Step S502, the source MME 121S performs integrity check of the TAU Request message from the UE 111. When the source MME 121S fails the integrity check, the source MME 121S performs Authentication and NAS Security Setup for the UE 111.

In Step S503, the source MME 121S transmits the MM context and EPS bearer context of the UE 111 to the target MME 121T. For this transmission, a GTP-C message that is transmitted on the S10 interface between MMEs may be used. For example, as shown in FIG. 10A, a Forward Relocation Request message or a modification thereof may be used. The Forward Relocation Request message in Step S503 may contain an information element indicating that it is a message to be transmitted for a TAU with Context Relocation, not for an S1-based handover.

In Step S504, the target MME 121T stores the MM context and EPS bearer context of the UE 111 received from the source MME 121S in its memory or storage (not shown). Further, in response to receiving the MM context and EPS bearer context of the UE 111, the target MME 121T requests the S-GW 123 to update the EPS bearer context of the UE 111 stored in the S-GW 123. For the transmission of this request, a GTP-C message that is transmitted on the S11 interface between the MME 121T and the S-GW 123 may be used. For example, as shown in FIG. 10A, a Modify Bearer Request message or a modification thereof may be used.

The GTP-C message (e.g., Modify Bearer Request message) in Step S504 indicates the IP address and MME TEID of the new MME that manages the EPS bearer of the UE 111, i.e., the target MME 121T. Further, this request indicates current location information (i.e., E-UTRAN Cell Global Identifier (ECGI) and Tracking Area Identity (TAI)) of the UE 111.

The S-GW 123 receives the current location information (i.e., ECGI and TAI) of the UE 111 from the target MME 121T and checks whether the ECGI and TAI of the UE 111 have changed or not. If they have changed, the UE 111 transmits a Modify Bearer Request message to the P-GW 124 (Step S505). The P-GW 124 updates the current location information of the UE 111 contained in the EPS bearer context of the UE 111, and transmits a Modify Bearer Response message to the S-GW 123 (Step S506). In Step S507, the S-GW 123 transmits a response message (e.g., Modify Bearer Response message) to the target MME 121T.

Steps S507 to S511 are performed to notify the HSS 122 of the MME change. The procedure performed in Steps S507 to S511 may be the same as the procedure to notify an HSS of an MME change in a normal TAU procedure, and therefore it may be the same as the procedure performed in Steps S106 to S109 in FIG. 3A.

In Step S512, the target MME 121T notifies the source MME 121S that it has accepted the taking over of the mobility management and bearer management of the UE 111. For the transmission of this notification, a GTP-C message that is transmitted on the S10 interface between MMEs may be used. For example, as shown in FIG. 10B, a Forward Relocation Response message or a modification thereof may be used. Alternatively, a Forward Relocation Complete Notification message or a modification thereof may be used.

The notification message in Step S512 contains the temporary identifier allocated to the UE 111 by the target MME 121T, i.e., M-TMSI, S-TMSI or GUTI.

In Step S513, the source MME 121S transmits, to the target MME 121T, an Acknowledge message responsive to the message in Step S512. For the transmission of this Acknowledge message, a GTP-C message that is transmitted on the S10 interface between MMEs may be used. The Acknowledge message may be a Forward Relocation Complete Acknowledge message or a modification thereof.

In Step S514, the source MME 121S informs the UE 111 about the ID of the new MME after relocation (i.e., target MME 121T) by using a TAU Accept message. Further, the source MME 121S informs the UE 111 about the temporary identifier allocated to the UE 111 by the target MME 121T. To be specific, the source MME 121S may notify the UE 111 of the GUTI that is composed of the GUMMEI of the target MME 121T and the M-TMSI allocated to the UE 111 by the target MME 121T.

The UE 111 receives the TAU Accept message, extracts the new GUTI allocated by the target MME 121T from the TAU Accept message, and updates the registered MME information, which is managed by the UE 111 itself, with the new GUTI. Then, in Step S515, the UE 111 transmits a TAU Complete message to the source MME 121S to notify the receipt of the new GUTI. The registered MME information that has been updated to indicate the target MME 121T is used for transmissions of RRC messages and NAS messages (e.g., TAU Request, and Service Request) after Step S515.

According to the procedure of FIGS. 10A and 10B, it is possible to notify the UE 111 of the occurrence of the relocation of mobility management and bearer management by modifying the existing TAU procedure.

Ninth Illustrative Embodiment

Figure 11:
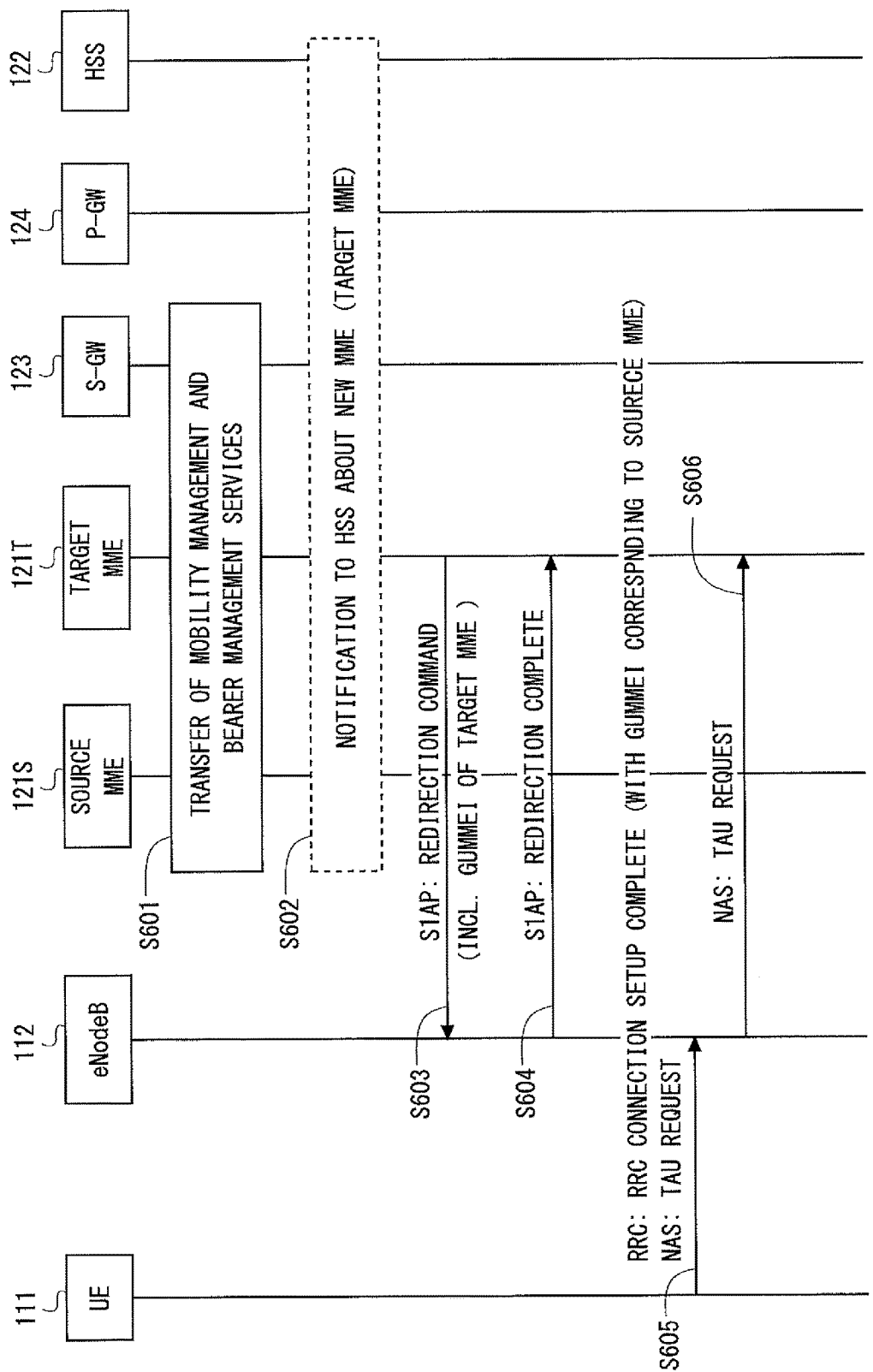
FIG. 11 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 11 shows one example of the signaling procedure for the relocation. The procedure of FIG. 11 can be performed in Step S13 of FIG. 2. Specifically, the source MME 121S may initiate the signaling procedure shown in FIG. 11 in response to receiving the Context Relocation Command message from the control node 142.

In the procedure of FIG. 11, the source MME 121S or the target MME 121T instructs the eNodeB 112 to redirect, to the target MME 121T, NAS messages addressed to the source MME 121S and originated from the UE 111 that has attached to the EPC 120 (i.e., EMM-REGISTERED state) and that is in the idle state (i.e., ECM-IDLE State). According to the instruction from the source MME 121S or the target MME 121T, the eNodeB 112 operates to redirect, to the target MME 121T, a NAS message received from the UE 111 together with the RRC message containing an RRC parameter that designates the source MME 121S.

The procedures performed in Steps S601 and S602 is the same as those performed in Steps S221 and S222 in FIG. 5. Step S602 may be omitted.

In Step S603, the target MME 121T instructs the eNodeB 112 to redirect, NAS messages addressed to the source MME 121S to the target MME 121T. For the transmission of this instruction, an S1AP message that is transmitted on the S1-MME interface between the MME 121T and the eNodeB 112 may be used. For example, as shown in FIG. 11, a new message (i.e., S1AP: Redirection Command message) may be used. The S1AP: Redirection Command message indicates the association between the source MME 121S and the target MME 121T. For example, the S1AP: Redirection Command message may contain the IDs of the source MME 121S and the target MME 121T (i.e., GUMMEIs, MMEIs or MMECs). Alternatively, in Step S603, one of the existing S1AP messages (e.g., MME Configuration Update message) or a modification thereof may be used.

The eNodeB 112 receives the S1AP: Redirection Command message and configures itself to redirect NAS messages addressed to the source MME 121S to the target MME 121T. In Step S604, the eNodeB 112 transmits, to the source MME 121S, an S1AP message (i.e., S1AP: Redirection Complete message) for notifying the receipt of the redirection instruction.

Steps S605 to S606 show the operation when an RRC Connection Setup Complete message that encapsulates a NAS: TAU Request message is received. Specifically, the eNodeB 112 receives an RRC Connection Setup Complete message containing an RRC parameter that indicates the GUMMEI of the source MME 121S (Step S506). Next, the eNodeB 112 extracts the TAU Request message from the RRC Connection Setup Complete message, and determines that the GUMMEI of the source MME 121S contained in the RRC Connection Setup Complete message is associated with the GUMMEI of the target MME 121T for redirection. Accordingly, the eNodeB 112 selects the target MME 121T and transmits to the target MME 121T the S1AP: Initial UE Message containing the TAU Request message (Step S606).

The relocation procedures shown in FIG. 3 (FIGS. 3A and 3B) to FIG. 10 (FIGS. 10A and 10B) described above are performed on a per-UE basis. Thus, although the amount of signaling in each of the relocation procedures shown in FIG. 3 (FIGS. 3A and 3B) to FIG. 10 (FIGS. 10A and 10B) is larger than that of the procedure shown in FIG. 11, these procedures have an advantage that it is possible to adjust the load to be relocated from the source MME 121S to the target MME 121T on a UE-by-UE basis. On the other hand, the relocation procedure shown in FIG. 11 allows the network to relocate the mobility management and bearer management of all UEs that have been managed by the source MME 121S to the target MME 121T at once. The amount of signaling in the relocation procedure shown in FIG. 11 is expected to be smaller than that in each of the relocation procedures shown in FIG. 3 (FIGS. 3A and 3B) to FIG. 10 (FIGS. 10A and 10B). Further, according to the procedure of FIG. 11, it is not necessary to notify the UE 111 of the relocation of mobility management and bearer management, and the relocation can be completed in the EPC 120 and the eNodeB 112. Accordingly, the procedure of FIG. 11 has an advantage that it is possible to relocate mobility management and bearer management without adding new functions to the UE 111.

Note that FIG. 11 shows an example where the target MME 121T instructs the eNodeB 112 to perform redirection. However, the source MME 121S, instead of the target MME 121T, may instruct the eNodeB 112 to perform redirection.

Tenth Illustrative Embodiment

Figure 12:
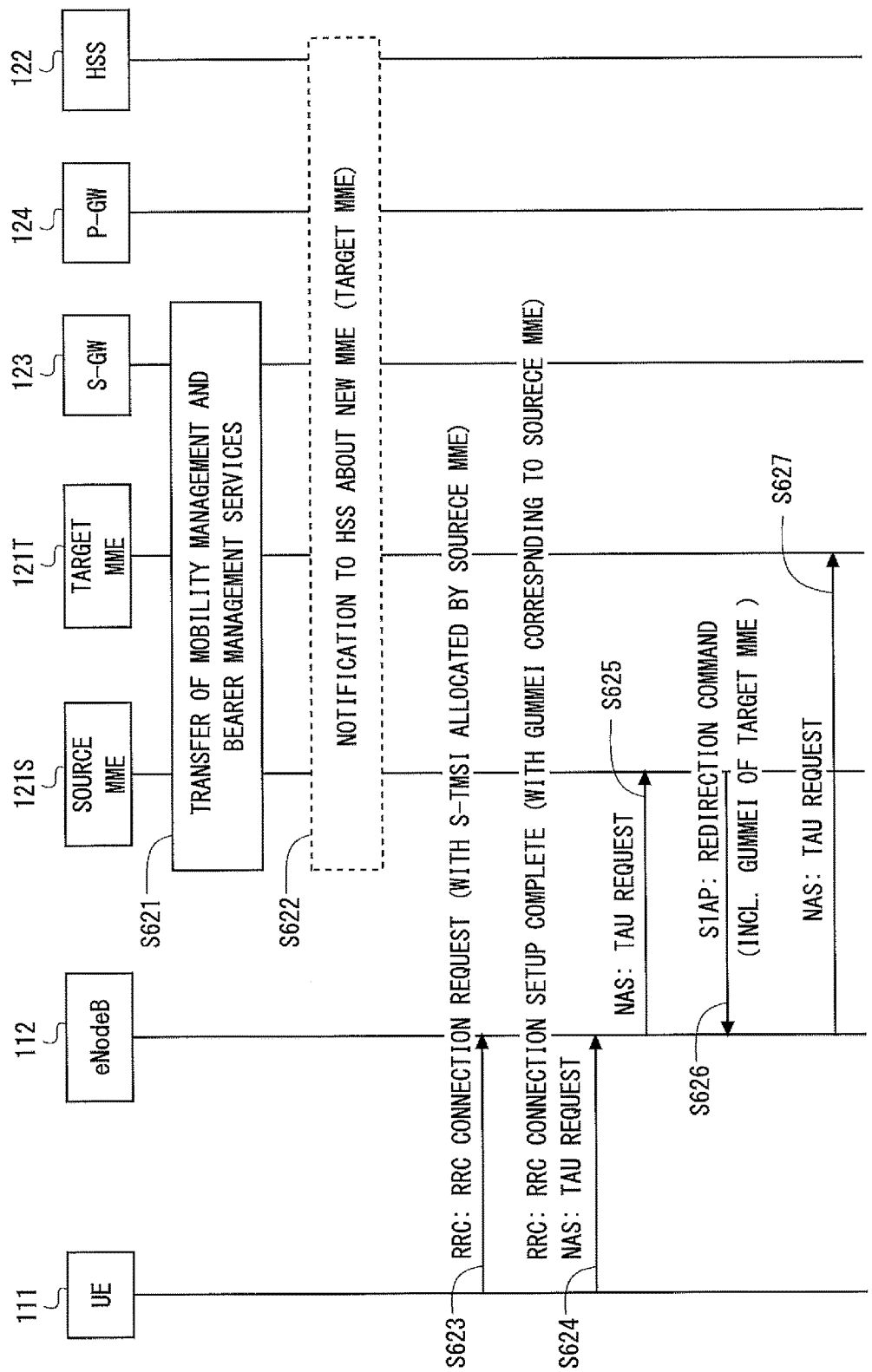
FIG. 12 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 12 shows one example of the signaling procedure for the relocation. The procedure of FIG. 12 can be performed in Step S13 of FIG. 2. Specifically, the source MME 121S may initiate the signaling procedure shown in FIG. 12 in response to receiving the Context Relocation Command message from the control node 142.

In the procedure of FIG. 12, the source MME 121S receives a NAS message addressed to the source MME 121S (e.g., TAU Request message, Service Request message) from the UE 111 that has attached to the EPC 120 (i.e., EMM-REGISTERED state) and that is in the idle state (i.e., ECM-IDLE State). Then, when the UE 111 is one for which the relocation has been made, the source MME 121S instructs the eNodeB 112 to redirect this NAS message to the target MME 121T. According to the instruction from the source MME 121S, the eNodeB 112 operates to redirect the NAS message to the target MME 121T.

The procedures performed in Steps S621 and S622 are the same as those performed in Steps S221 and S222 in FIG. 5. Step S622 may be omitted. After the completion of Steps S621 and S622, the source MME 121S may delete the context of UEs including the UE 111 for which the relocation has been made, in response to expiration of a specific timer, for example. Note that, however, the source MME 121S remembers that it has performed the relocation. The source MME 121S may store the IDs (M-TMSIs or S-TMSIs) of the UEs for which the relocation has been made.

In Step S624, the UE 111 transmits a NAS message (e.g., TAU Request message, Service Request message). Note that the UE 111 is unaware of the occurrence of the relocation. Thus, the RRC Connection Setup Complete message that encapsulates the NAS message indicates the GUMMEI of the source MME 121S as the Registered MME information. Further, the RRC Connection Request message, which is transmitted prior to the RRC Connection Setup Complete message, indicates the S-TMSI allocated by the source MME 121S as the UE Identity (Step S623). Accordingly, in Step S625, the eNodeB 112 transmits the NAS message received from the UE 111 to the source MME 121S.

In Step S626, the source MME 121S determines that the relocation to the target MME 121T has been performed or that the UE 111 is one for which the relocation has been made, and instructs the eNodeB 112 to redirect this NAS message to the target MME 121T. For the transmission of this instruction, an S1AP message that is transmitted on the S1-MME interface between the MME 121S and the eNodeB 112 may be used. For example, as shown in FIG. 12, a new message (i.e., S1AP: Redirection Command message) may be used. The S1AP: Redirection Command message indicates that the NAS message from the UE 111 is to be redirected to the target MME 121T. Alternatively, in Step S626, one of the existing S1AP messages (e.g., MME Configuration Update message) or a modification thereof may be used.

In Step S627, the eNodeB 112 receives the S1AP: Redirection Command message and redirects the NAS message addressed to the source MME 121S and received in Step S624 to the target MME 121T.

After Step S627, the target MME 121T performs the procedure (e.g., TAU procedure, Service Request procedure) according to the NAS message from the UE 111. It is preferred that, during this procedure, the target MME 121T notifies the UE 111 of the new UE temporary identifier (i.e., GUTI) allocated by the target MME 121T. For the transmission of the new UE temporary identifier (i.e., GUTI), a NAS message such as a TAU Accept message or a GUTI Reallocation Command message may be used. Thus, the UE 111 can use the temporary identifier (GUTI) allocated by the target MME 121T for subsequent transmissions of RRC messages and NAS messages (e.g., TAU Request, Service Request).

According to the procedure of FIG. 12, the relocation of mobility management and bearer management can be completed in the EPC 120. Further, the procedure of FIG. 12 allows the network to perform the relocation of mobility management and bearer management without adding new functions to the UE 111. Further, compared with the procedure of FIG. 11, the procedure of FIG. 12 has an advantage that it is possible to perform the relocation on a UE-by-UE basis. In other words, the procedure of FIG. 12 allows the network to relocate mobility management and bearer management of only a subset of all UEs that have been managed by the source MME 121S to the target MME 121T.

Eleventh Illustrative Embodiment

Figure 13:
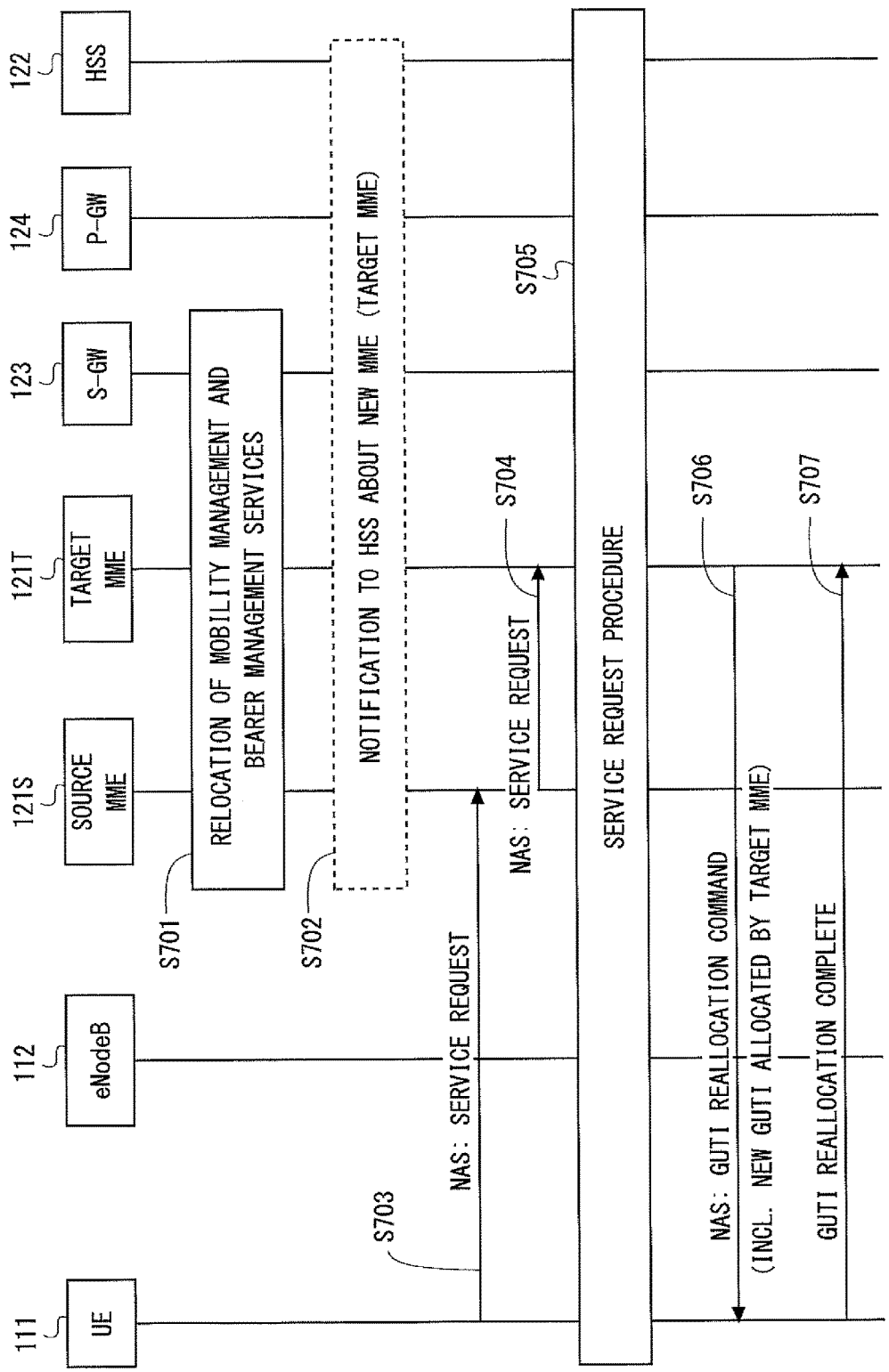
FIG. 13 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 13 shows one example of the signaling procedure for the relocation. The procedure of FIG. 13 can be performed in Step S13 of FIG. 2. Specifically, the source MME 121S may initiate the signaling procedure shown in FIG. 13 in response to receiving the Context Relocation Command message from the control node 142.

In the procedure of FIG. 13, the source MME 121S receives a NAS message addressed to the source MME 121S (e.g., TAU Request message, Service Request message) from the UE 111 that has attached to the EPC 120 (i.e., EMM-REGISTERED state) and that is in the idle state (i.e., ECM-IDLE State). Then, when the UE 111 is one for which the relocation has been made, the source MME 121S operates to transfer this NAS message to the target MME 121T.

The procedures performed in Steps S701 and S702 are the same as those performed in Steps S221 and S222 in FIG. 5. Step S702 may be omitted. After the completion of Steps S701 and S702, the source MME 121S may delete the context of UEs including the UE 111 for which the relocation has been made, in response to expiration of a specific timer, for example. Note that, however, the source MME 121S remembers that it has performed the relocation. The source MME 121S may store the IDs (M-TMSIs or S-TMSIs) of the UEs for which the relocation has been made.

In Step S703, the UE 111 transmits a NAS message (e.g., TAU Request message, Service Request message). Note that the UE 111 is unaware of the occurrence of the relocation. Thus, the RRC Connection Setup Complete message that encapsulates the NAS message indicates the GUMMEI of the source MME 121S as the Registered MME information. Further, the RRC Connection Request message, which is transmitted prior to the RRC Connection Setup Complete message, indicates the S-TMSI allocated by the source MME 121S as the UE Identity. Accordingly, the NAS message in Step S703 is transmitted to the source MME 121S by the eNodeB 112.

In Step S704, the source MME 121S determines that the relocation to the target MME 121T has been performed or that the UE 111 is one for which the relocation has been made, and transfers the NAS message to the target MME 121T. For this transfer, a GTP-C message that is transmitted on the S10 interface between MMEs may be used.

In Step S705, the target MME 121T performs the procedure (e.g., TAU procedure, Service Request procedure) according to the NAS message from the UE 111.

In Step S706, the target MME 121T notifies the UE 111 of the new GUTI allocated by the target MME 121T. For the transmission of the new GUTI, a NAS message such as a TAU Accept message or a GUTI Reallocation Command message may be used. Thus, the UE 111 can use the new GUTI allocated by the target MME 121T for subsequent transmissions of RRC messages and NAS messages (e.g., TAU Request, and Service Request). Note that the notification of the new GUTI in Step S706 may be performed before Step S706.

In Step S707, the UE 111 transmits a response message (e.g., TAU Accept message, GUTI Reallocation Complete message) indicating the receipt of the GUTI.

According to the procedure of FIG. 13, it is possible to perform the relocation from the source MME 121S to the target MME 121T at arbitrary timing, and to notify the UE 111 of the occurrence of the relocation when there is an access from the UE 111 to the EPC 120.

Twelfth Illustrative Embodiment

Figure 14A:
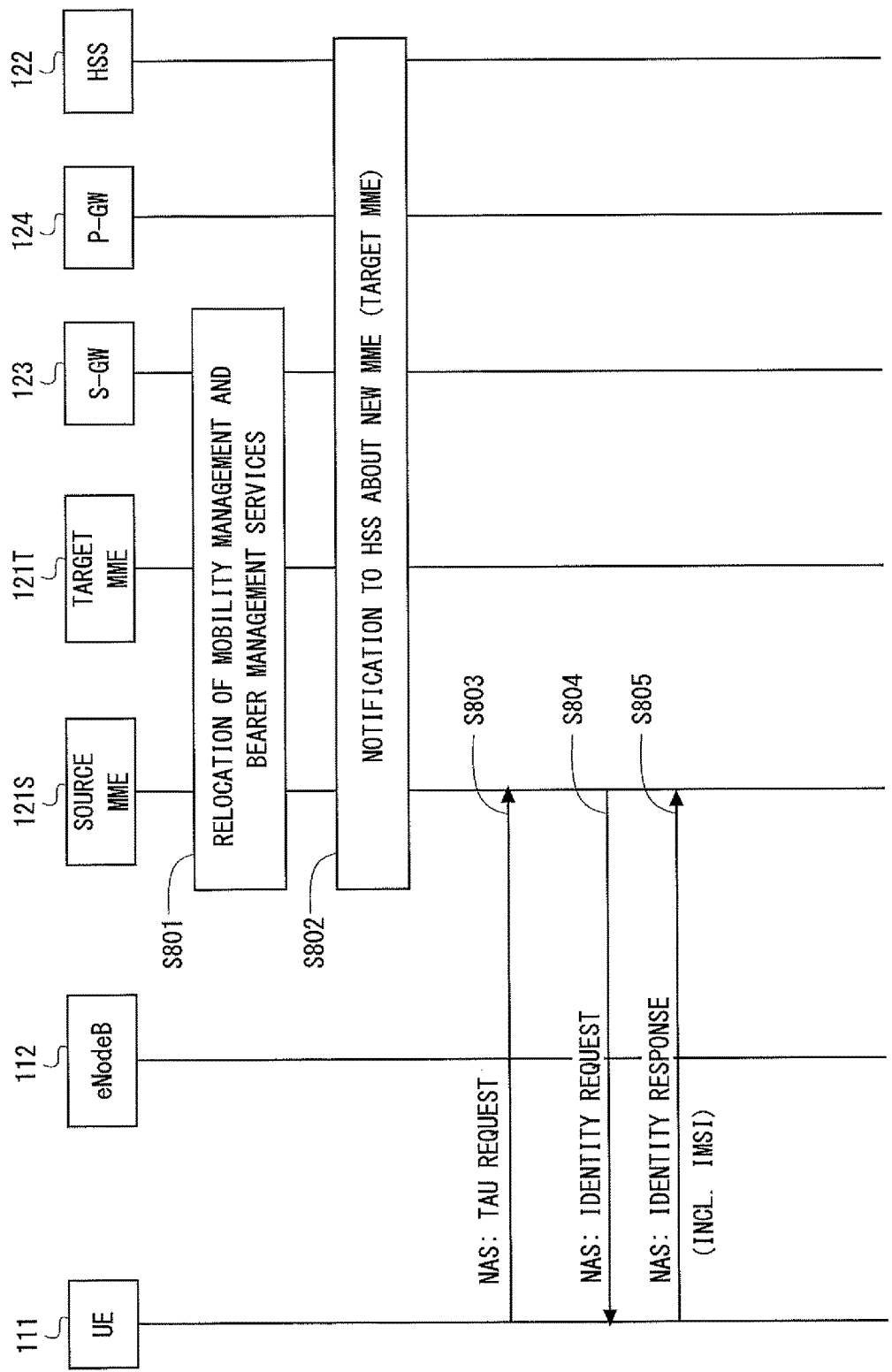
FIG. 14A is a sequence chart showing a specific example of a relocation procedure of a mobility management context and a bearer context according to an illustrative embodiment of the invention.
Figure 14B:
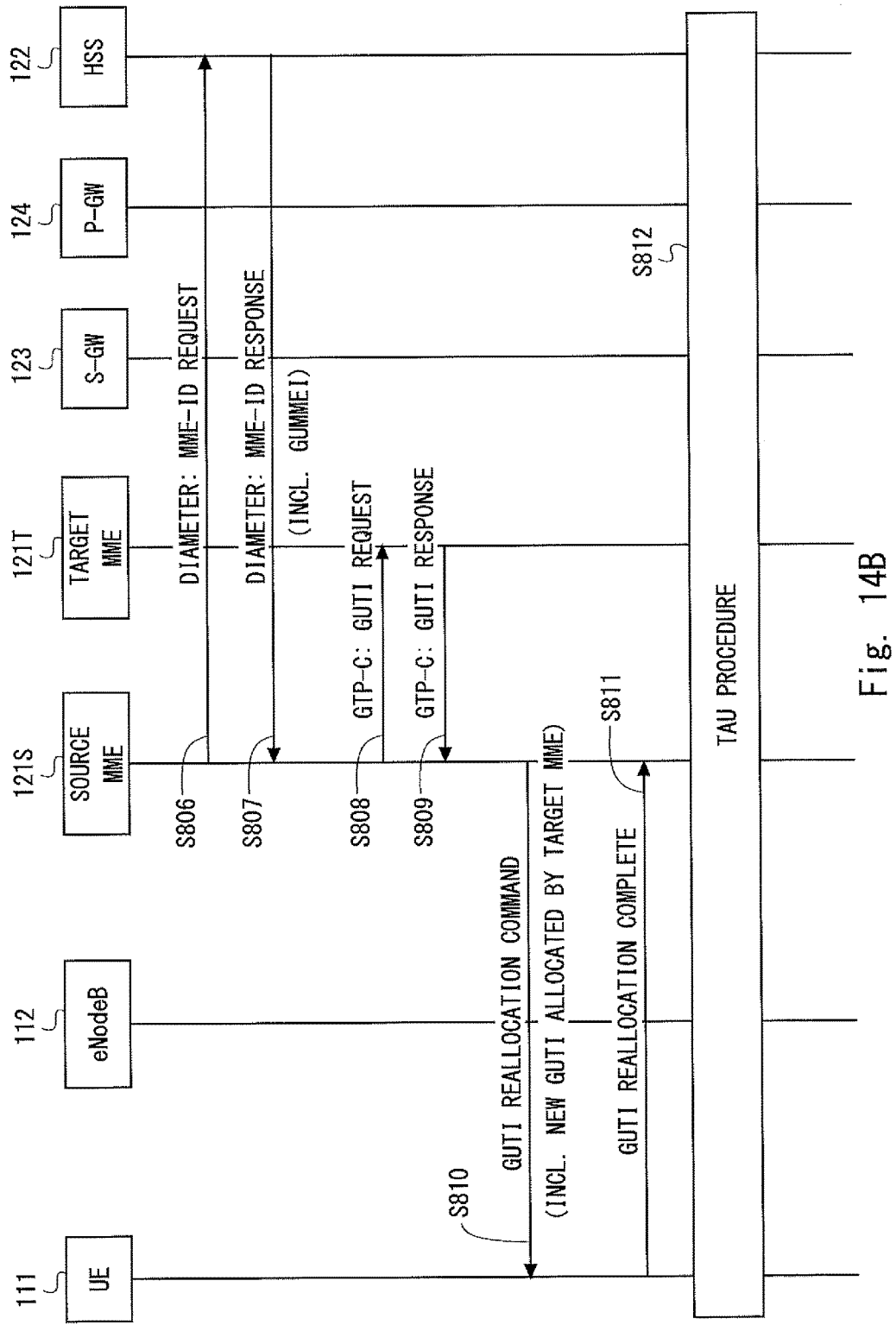
FIG. 14B is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIGS. 14A and 14B shows one example of the signaling procedure for the relocation. The procedure of FIGS. 14A and 14B can be performed in Step S13 of FIG. 2. Specifically, the source MME 121S may initiate the signaling procedure shown in FIGS. 14A and 14B in response to receiving the Context Relocation Command message from the control node 142.

In the procedure of FIGS. 14A and 14B, the source MME 121S receives a NAS message addressed to the source MME 121S (e.g., TAU Request message, Service Request message) from the UE 111 that has attached to the EPC 120 (i.e., EMM-REGISTERED state) and that is in the idle state (i.e., ECM-IDLE State). Then, when the context of the UE 111 has been deleted because the UE 111 is one for which the relocation has been made, the source MME 121S sends an inquiry to the HSS 122 about the MME that currently manages the UE 111.

The procedures performed in Steps S801 and S802 are the same as those performed in Steps S221 and S222 in FIG. 5. Note that, however, Step S802 is performed without omission in order to notify the HSS 122 of the MME change.

In Step S803, the UE 111 transmits a NAS message (e.g., TAU Request message, Service Request message). Note that the UE 111 is unaware of the occurrence of the relocation. Thus, the RRC Connection Setup Complete message that encapsulates the NAS message indicates the GUMMEI of the source MME 121S as the Registered MME information. Further, the RRC Connection Request message, which is transmitted prior to the RRC Connection Setup Complete message, indicates the S-TMSI allocated by the source MME 121S as the UE Identity. Accordingly, the NAS message in Step S803 is transmitted to the source MME 121S by the eNodeB 112.

In Step S804, the source MME 121S receives the NAS message from the UE 111 and detects that it does not store the context regarding the UE 111 (MM context, EPS Bearer context). In response to this detection, the source MME 121S makes an inquiry to the UE 111 about the IMSI of the UE 111. For this inquiry, a NAS: Identity Request message may be used. In Step S805, the UE 111 transmits the NAS message (e.g., Identity Response message) indicating its IMSI.

In Step S806, the source MME 121S transmits the IMSI received from the UE 111 to the HSS 122 to send an inquiry to the HSS 122 about the MME that manages the UE 111. For this inquiry, a Diameter message that is transmitted on the 66a interface between the MME 121S and the HSS 122 may be used. As shown in FIG. 14B, a new Diameter message (i.e., DIAMETER: MME-ID Request message) may be used. In Step S807, the HSS 122 transmits, to the source MME 121S, a response message indicating the ID (e.g., GUMMEI, MMEI or MMEC) of the target MME 121T that manages the UE 111.

In Step S808, the source MME 121S sends an inquiry to the target MME 121T about the temporary identifier (e.g., GUTI, S-TMSI or M-TMSI) allocated to the UE 111. For this inquiry, a GTP-C message that is transmitted on the S10 interface between MMEs may be used. In Step S809, the target MME 121T transmits, to the source MME 121S, a response message indicating the temporary identifier (e.g., GUTI, S-TMSI or M-TMSI) allocated to the UE 111 by the target MME 121T.

In Step S810, the source MME 121S informs the UE 111 about the ID of the new MME after relocation (i.e., target MME 121T). Further, the source MME 121S informs the UE 111 about the temporary identifier allocated to the UE 111 by the target MME 121T. To be specific, the source MME 121S may notify the UE 111 of the GUTI allocated to the UE 111 by the target MME 121T. In Step S810, a NAS message may be used. For example, as shown in FIG. 14B, a GUTI Reallocation Command message may be used. Alternatively, a new NAS message may be defined and used.

In Step S811, the UE 111 receives from the source MME 121S the new GUTI allocated by the target MME 121T. Then, the UE 111 updates the registered MME information, which is managed by the UE 111 itself, with the new GUTI. The UE 111 then transmits a NAS message (e.g., GUTI Reallocation Complete message) indicating the completion of receipt of the GUTI to the source MME 121S. The registered MME information that has been updated to indicate the target MME 121T is used for subsequent transmissions of RRC messages and NAS messages (e.g., TAU Request, and Service Request). For example, the UE 111 may perform new TAU procedure or Service Request procedure with the target MME 121T (Step S812).

According to the procedure of FIGS. 14A and 14B, it is possible to perform the relocation from the source MME 121S to the target MME 121T at arbitrary timing, and notify the UE 111 of the occurrence of the relocation when there is an access from the UE 111 to the EPC 120. Further, the source MME 121S does not need to store the ID of the new MME after relocation.

The procedure of FIGS. 14A and 14B may be modified as appropriate. For example, the procedure where the source MME 121S makes an inquiry to the HSS 122 about the ID of the target MME 121T shown in FIGS. 14A and 14B may be used for sending, from the source MME 121S, the instruction for redirection of the NAS message shown in FIG. 12 (Step S626). Further, the procedure where the source MME 121S makes an inquiry to the HSS 122 shown in FIGS. 14A and 14B may be used for transferring the NAS message by the source MME 121S shown in FIG. 13 (Step S704).

Thirteenth Illustrative Embodiment

Figure 15A:
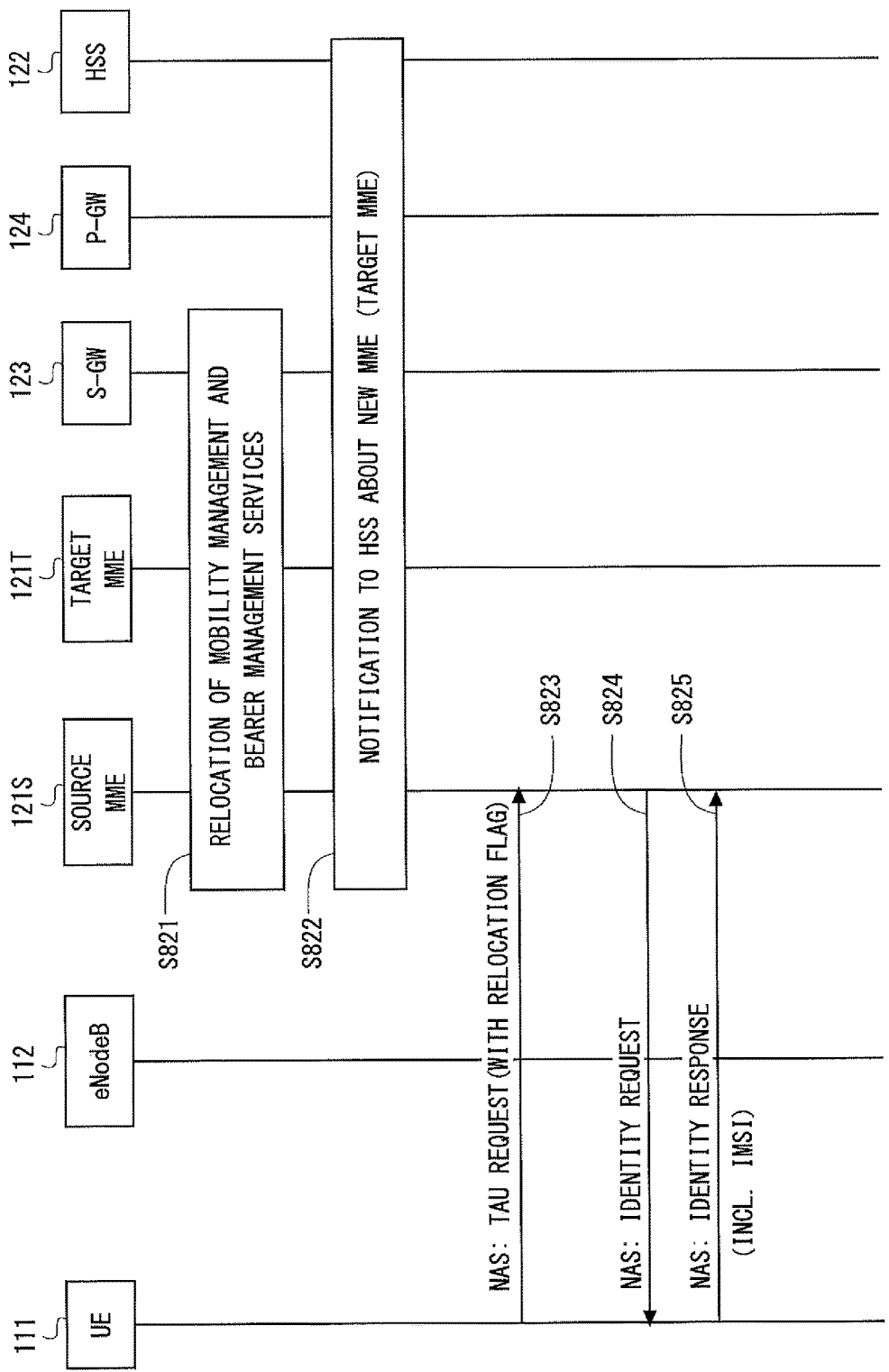
FIG. 15A is a sequence chart showing a specific example of a relocation procedure of a mobility management context and a bearer context according to an illustrative embodiment of the invention.

In this illustrative embodiment, a modified example of the relocation procedure described in the fourteenth illustrative embodiment is described. FIG. 15A shows a modification of FIG. 14A. Steps S821 and S822 are the same as Steps S801 and S802 in FIG. 14A.

Step S823 differs from Step S803 in FIG. 14A in that the NAS message transmitted from the UE 111 indicates a relocation flag. The relocation flag indicates that there is a possibility that the UE 111 is one for which the relocation has been made. Prior to performing the relocation (Step S821), the source MME 121S notifies the UE 111 that there is a possibility that the relocation will be made. Upon having received this notification from the source MME 121S, the UE 111 transmits the NAS message in which the relocation flag is set.

When the source MME 121S does not store the context regarding the UE 111 and the relocation flag is set in the NAS message from the UE 111, the source MME 121S makes an inquiry to the UE 111 about the IMSI of the UE 111 (Step S824). Steps S824 and S825 are the same as Steps S804 and S805 of FIG. 14A. Following Step S825, the procedure shown in FIG. 14B is performed. On the other hand, when the source MME 121S does not store the context regarding the UE 111 and the relocation flag is not set, the source MME 121S transmits a reject message (e.g., TAU Reject message, Service Reject message) to the UE 111.

According to the procedure of FIG. 15A, the source MME 121S can limit the number of UEs for which the procedure after Step S824, including an inquiry to the HSS 122, is to be performed.

Fourteenth Illustrative Embodiment

Figure 16:
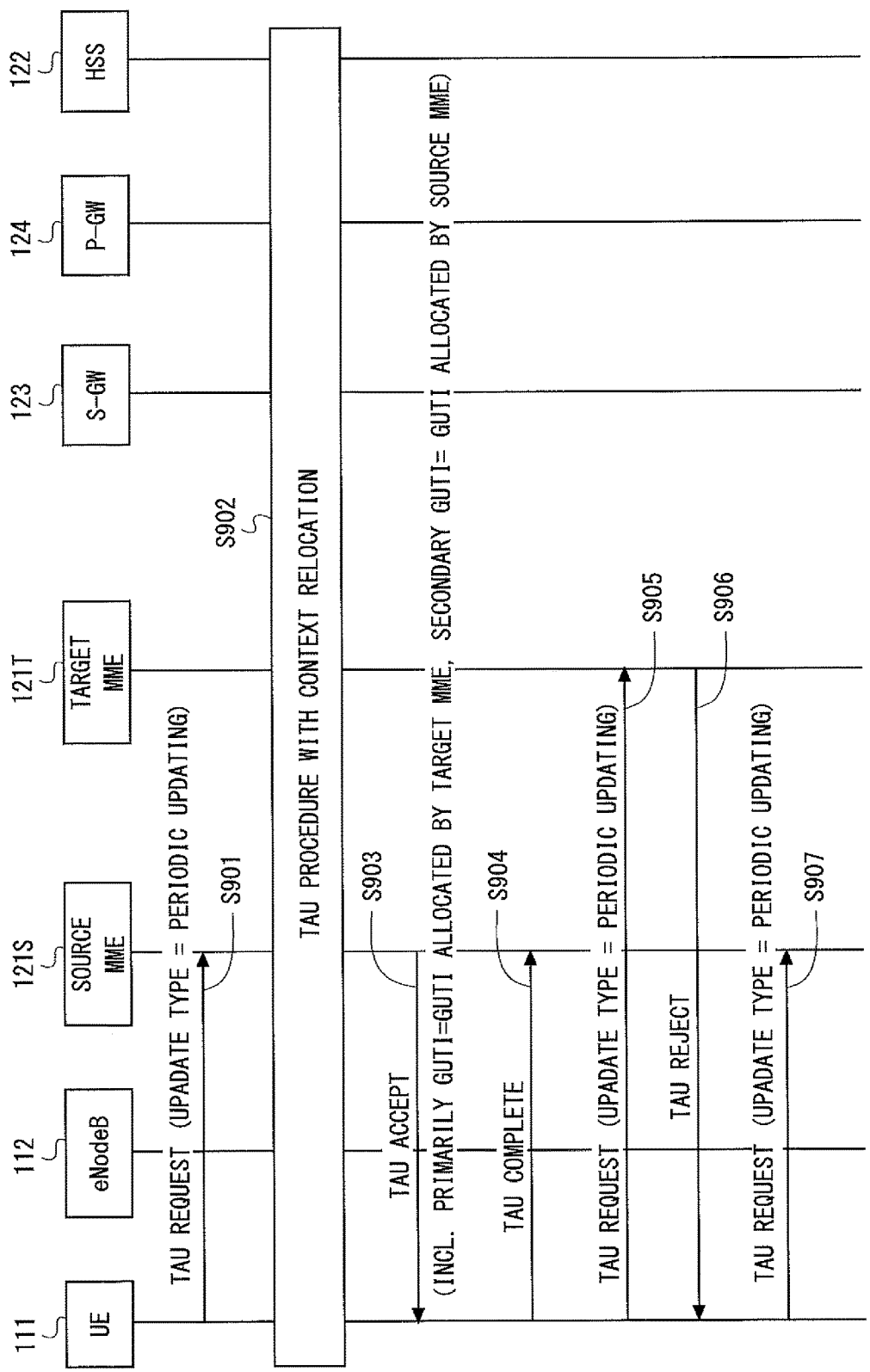
FIG. 16 is a sequence chart showing a specific example of a relocation procedure of a mobility management context and a bearer context according to an illustrative embodiment of the invention.

In this illustrative embodiment, a specific example of the relocation procedure of mobility management and bearer management that is described in the first illustrative embodiment is described. A configuration example of the mobile communication network according to this illustrative embodiment may be the same as that shown in FIG. 1, which is described in relation to the first illustrative embodiment. The sequence chart of FIG. 16 shows one example of the signaling procedure for the relocation. The procedure of FIG. 16 can be performed in Step S13 of FIG. 2. Specifically, the source MME 121S may initiate the signaling procedure shown in FIG. 16 in response to receiving the Context Relocation Command message from the control node 142.

In Steps S901 to S904, the source MME 121S performs relocation, and the UE temporary identifier (e.g., GUTI) allocated by the target MME 121T after relocation is sent to the UE 111. Steps S901 to S904 are the same as the procedure shown in FIGS. 10A and 10B to notify the UE 111 of the UE temporary identifier during the TAU procedure. However, Steps S901 to S904 may be replaced by another procedure (e.g., the procedure of FIG. 5, 6, 8 or 9).

The main point of interest of the procedure of FIG. 16 is that the UE 111 is notified of a primary GUTI and a secondary GUTI in Step S903. In this example, the primary GUTI indicates a GUTI allocated by the target MME 121T, and the secondary GUTI indicates a GUTI allocated by the source MME 121S. The UE 111 preferentially uses the primary GUTI, and when signaling (e.g., TAU procedure, Service Request procedure) using the primary GUTI has failed, it uses the secondary GUTI. On the other hand, the source MME 121S continues to hold the context of the UE 111 after relocation until a specific timer expires. Thus, even when the target MME 121T that serves as the primary MME rejects an access of the UE 111 due to some defect in relocation, the source MME 121S that serves as the secondary MME can accept an access of the UE 111.

For example, the UE 111 transmits a TAU Request message to the target MME 121T (Step S905). However, the target MME 121T does not store the context of the UE 111 due to some defect, and transmits a TAU Reject message back to the UE 111 (Step S906). Upon failing to communicate with the primary MME (target MME 121T), the UE 111 tries to communicate with the secondary MME (source MME 121S) (Step S907). When the source MME 121S still holds the context of the UE 111, the source MME 121S starts communication with the UE 111 and may perform relocation (e.g., Steps S901 to S904) again.

Fifteenth Illustrative Embodiment

Figure 17:
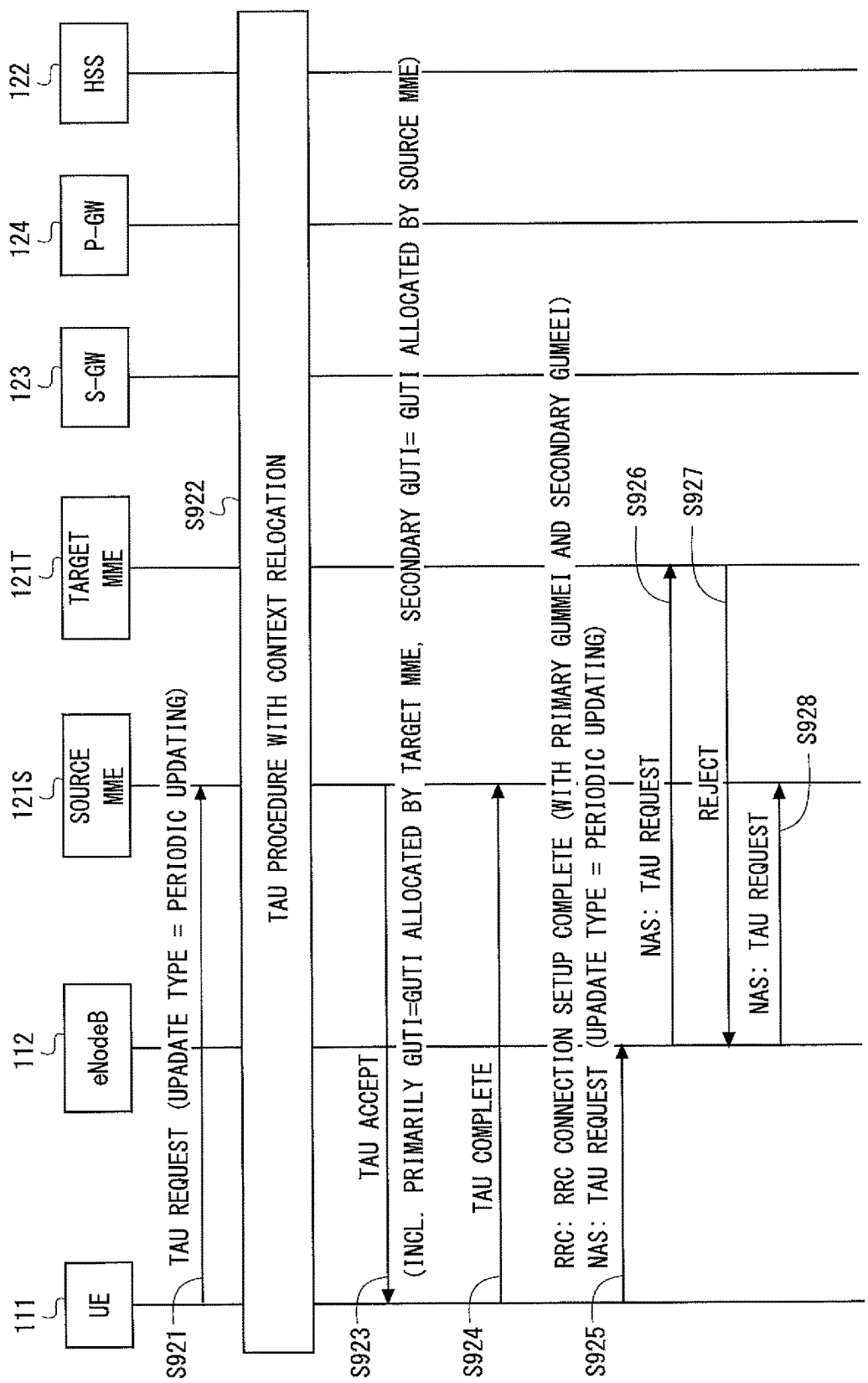
FIG. 17 is a sequence chart showing a specific example of a relocation procedure of a mobility management context and a bearer context according to an illustrative embodiment of the invention.

In this illustrative embodiment, a modified example of the fourteenth illustrative embodiment is described. FIG. 17 shows one example of the signaling procedure for the relocation according to this illustrative embodiment. In this illustrative embodiment, like the fourteenth illustrative embodiment, the relocation of mobility management and bearer management of the UE 111 is performed, and the UE 111 is notified of both the primary GUTI and the secondary GUTI (Steps S921 to S924). The source MME 121S continues to hold the context of the UE 111 after relocation until a specific timer expires.

In Step S925, the UE 111 transmits a TAU Request message. At this time, a Connection Setup Complete message that is used for delivering the TAU Request message indicates, as the Registered MME information, both the GUMMEI of the primary MME (i.e., target MME 121T) and the GUMMEI of the secondary MME (i.e., source MME 121S). In Step S926, the eNodeB 112 transfers the TAU Request message to the target MME 121T that is specified as the primary MME.

In Step S927, the target MME 121T does not hold the context of the UE 111 due to some defect, and transmits a reject message. This reject message is transmitted to the eNodeB 112, not to the UE 111. For the transmission of the reject message, an S1AP message may be used. When the eNodeB 112 receives the reject message, it transfers the TAU Request message to the source MME 121S that is specified as the secondary MME. When the source MME 121S still holds the context of the UE 111, the source MME 121S starts communication with the UE 111 and may perform relocation (e.g., Steps S901 to S904) again.

According to the procedure of FIG. 17, like the procedure of FIG. 16, even when the target MME 121T that serves as the primary MME rejects an access of the UE 111 due to some defect in relocation, the source MME 121S that serves as the secondary MME can accept an access of the UE 111.

Sixteenth Illustrative Embodiment

Figure 18A:
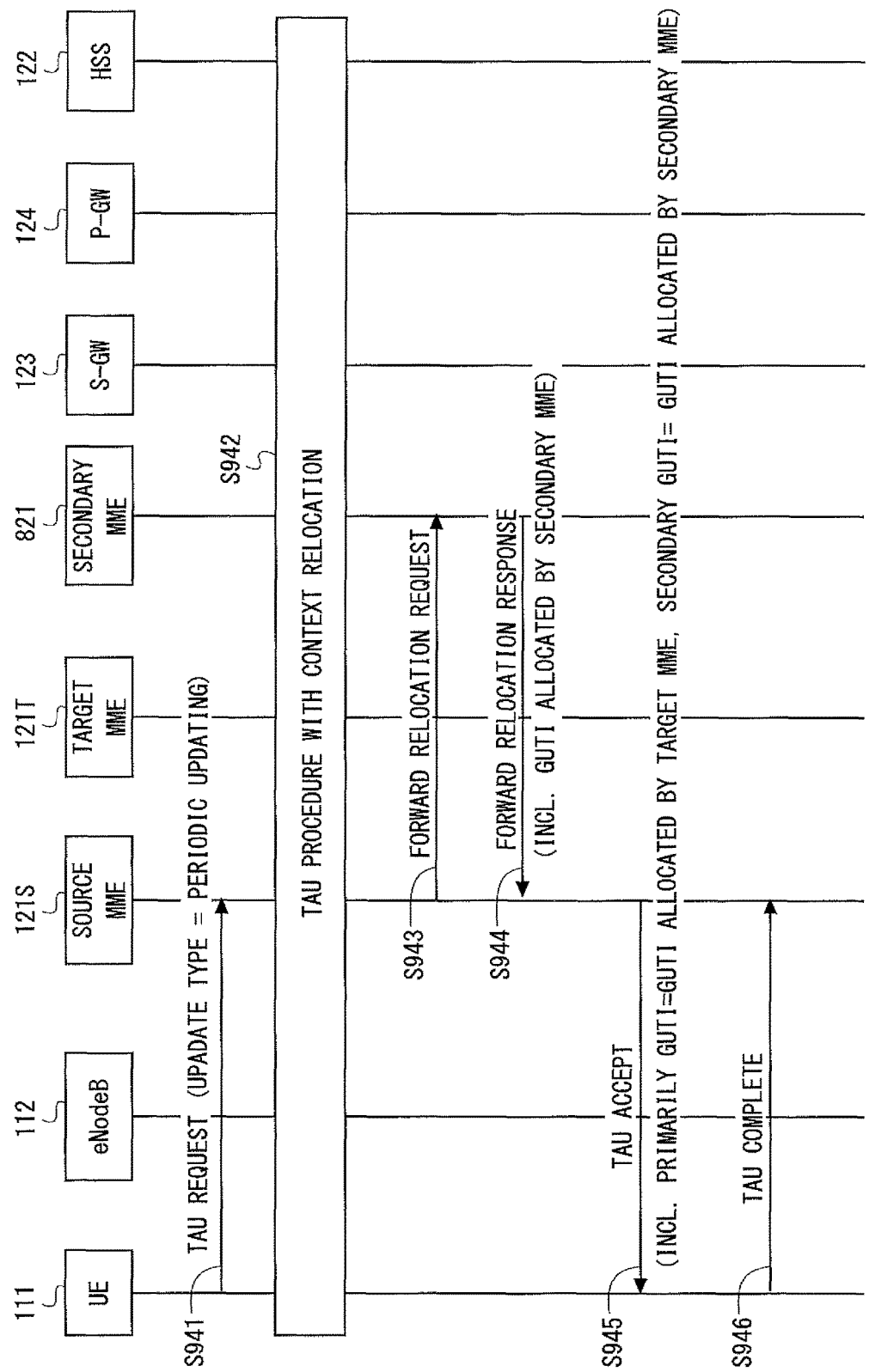
FIG. 18A is a sequence chart showing a specific example of a relocation procedure of a mobility management context and a bearer context according to an illustrative embodiment of the invention.
Figure 18B:
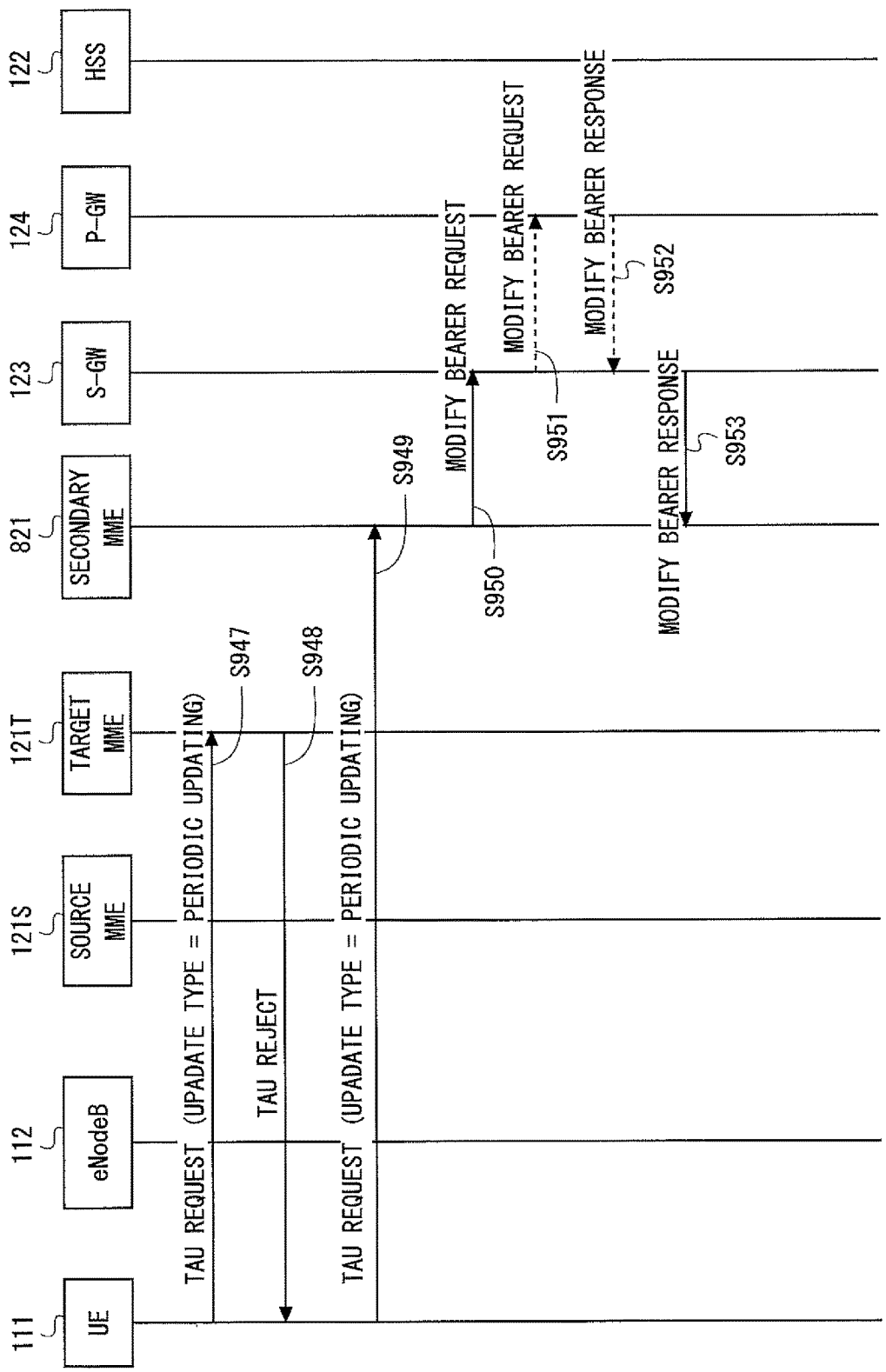
FIG. 18B is a sequence chart showing a specific example of a relocation procedure of a mobility management context and a bearer context according to an illustrative embodiment of the invention.
Figure 18C:
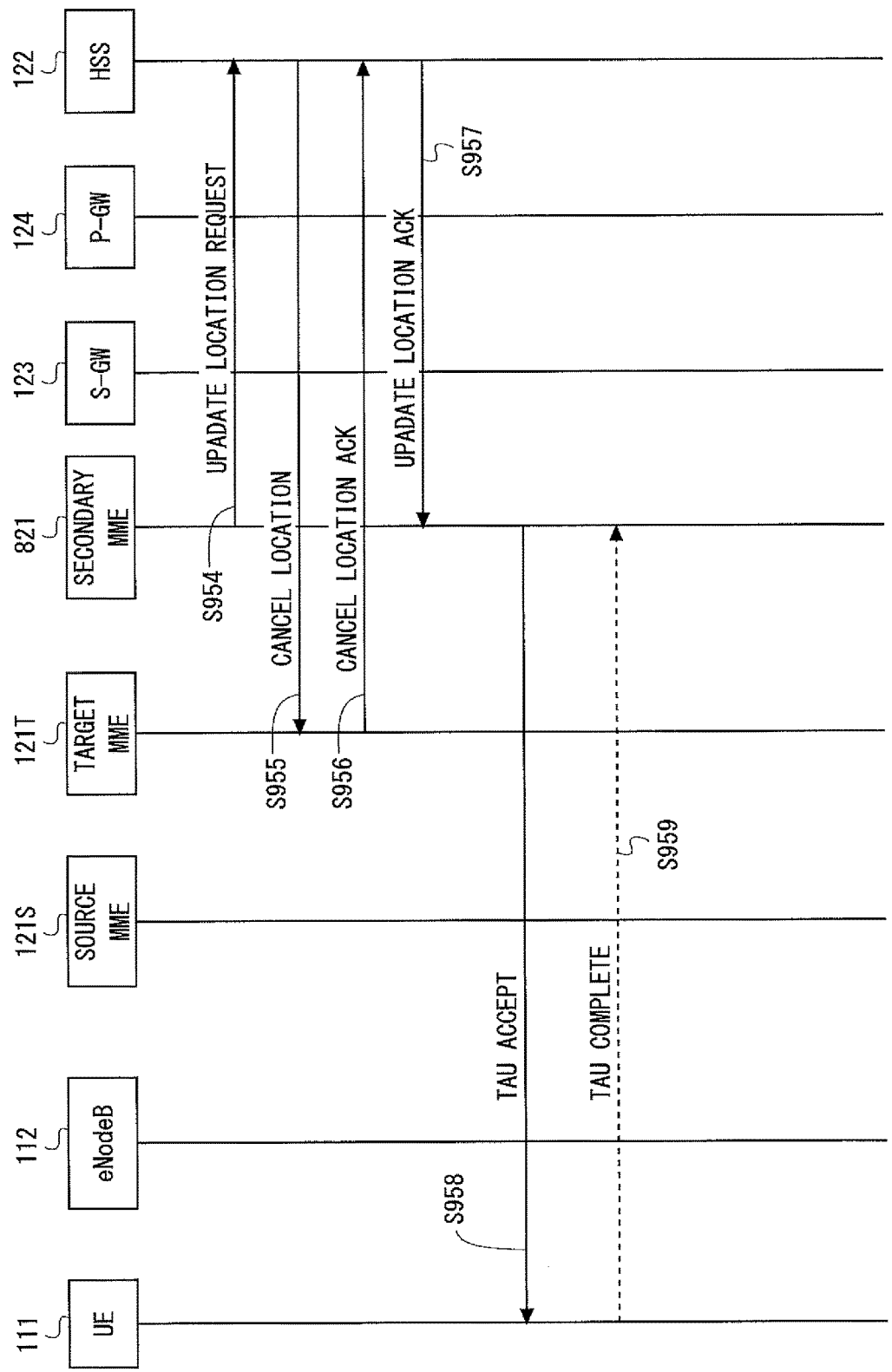
FIG. 18C is a sequence chart showing a specific example of a relocation procedure of a mobility management context and a bearer context according to an illustrative embodiment of the invention.

In this illustrative embodiment, a modified example of the fourteenth illustrative embodiment is described. FIGS. 18A to 18C show one example of the signaling procedure for the relocation according to this illustrative embodiment. In this illustrative embodiment, like the fourteenth and fifteenth illustrative embodiments, the UE 111 is notified of both the primary GUTI and the secondary GUTI. The primary GUTI is a GUTI allocated to the UE 111 by the target MME 121T. Note that, in this illustrative embodiment, the secondary GUTI is a GUTI allocated to the UE 111 by a secondary MME 821 which is different from both the source MME 121S and the target MME 121T. Specifically, in this illustrative embodiment, the source MME 121S transfers the context of the UE 111 to the target MME 121T and also to the secondary MME 821. Thus, the target MME 121T can be referred to as a primary target MME, and the secondary MME 821 can be referred to as a secondary target MME.

In Steps S941 and S942, relocation from the source MME 121S to the target MME 121T is performed. Note that, although FIG. 18A shows the case of performing relocation during the TAU procedure, it may be replaced by another procedure (e.g., the procedure of FIG. 5, 6, 8 or 9) as is obvious from various specific examples described above.

In Step S943, the source MME 121S transmits the context of the UE 111 also to the secondary MME 821. For this transmission, a GTP-C message (e.g., Forward Relocation Request message) that is transmitted on the S10 interface between MMEs may be used. In Step S944, the secondary MME 821 transmits a response message (e.g., Forward Relocation Response message) to the source MME 121S. This response message indicates a GUTI allocated to the UE 111 by the secondary MME 821.

In Step S945, the source MME 121S transmits a NAS message (e.g., TAU Accept message) indicating both the primary GUTI and the secondary GUTI to the UE 111. In this example, the primary GUTI indicates the GUTI allocated by the target MME 121T, and the secondary GUTI indicates the GUTI allocated by the secondary MME 821. In Step S946, the UE 111 transmits a TAU Complete message for notifying the receipt of the new GUTIs to the source MME 121S.

Steps S947 and S948 are the same as Steps S905 and S906 in FIG. 16. Specifically, the UE 111 transmits a TAU Request message to the target MME 121T (Step S947). However, the target MME 121T does not hold the context of the UE 111 due to some defect, and transmits a TAU Reject message back to the UE 111 (Step S948). Upon failing to communicate with the primary MME (target MME 121T), the UE 111 tries to communicate with the secondary MME 821 (Step S949).

In response to receiving the NAS message (e.g., TAU Request message) from the UE 111, the secondary MME 821 requests the S-GW 123 to update the EPS bearer context of the UE 111 stored in the S-GW 123 (Step S950). This request indicates the IP address and the MME TEID of the new MME that manages the EPS bearer of the UE 111, i.e., the secondary MME 821. Further, when the NAS message from the UE 111 is a TAU Request message, this request indicates current location information (i.e., E-UTRAN Cell Global Identifier (ECGI) and Tracking Area Identity (TAI)) of the UE 111. For the transmission of this request, a GTP-C message that is transmitted on the S11 interface between the MME 821 and the S-GW 123 may be used. For example, as shown in FIG. 18A, a Modify Bearer Request message or a modification thereof may be used.

The S-GW 123 receives the current location information (i.e., ECGI and TAI) of the UE 111 from the secondary MME 821 and checks whether the ECGI and TAI of the UE 111 have changed or not. If they have changed, the UE 111 transmits a Modify Bearer Request message to the P-GW 124 (Step S951). The P-GW 124 updates the current location information of the UE 111 contained in the EPS bearer context of the UE 111, and transmits a Modify Bearer Response message to the S-GW 123 (Step S952). In Step S953, the S-GW 123 transmits a response message (e.g., Modify Bearer Response message) to the secondary MME 821.

Steps S954 to S957 are performed to notify the HSS 122 of the MME change. The processing of S954 to S957 may be the same as the processing to notify an HSS of an MME change in a normal TAU procedure, and therefore it may be the same as the processing of Steps S106 to S109 in FIG. 3A.

In Step S958, the secondary MME 821 transmits a TAU Accept message to the UE 111. This TAU Accept message may indicate that the GUTI allocated by the secondary MME 821 is specified as the primary GUTI. The UE 111 can thereby perform the next NAS message transmission preferentially to the secondary MME 821, not to the target MME 121T. When the TAU Accept message in Step S958 indicates a change in the primary GUTI (or a change in the primary MME), the UE 111 transmits a TAU Complete message to the secondary MME 821 in order to notify that it has accepted the change of the primary GUTI (Step S959).

According to the procedure of FIGS. 18A to 18C, even when the relocation of mobility management and bearer management from the source MME 121S to the target MME 121T has failed due to some reason, it is possible to use the UE context stored in the secondary MME 821. It is thereby possible to effectively prevent a failure in the relocation.

Seventeenth Illustrative Embodiment

Figure 19A:
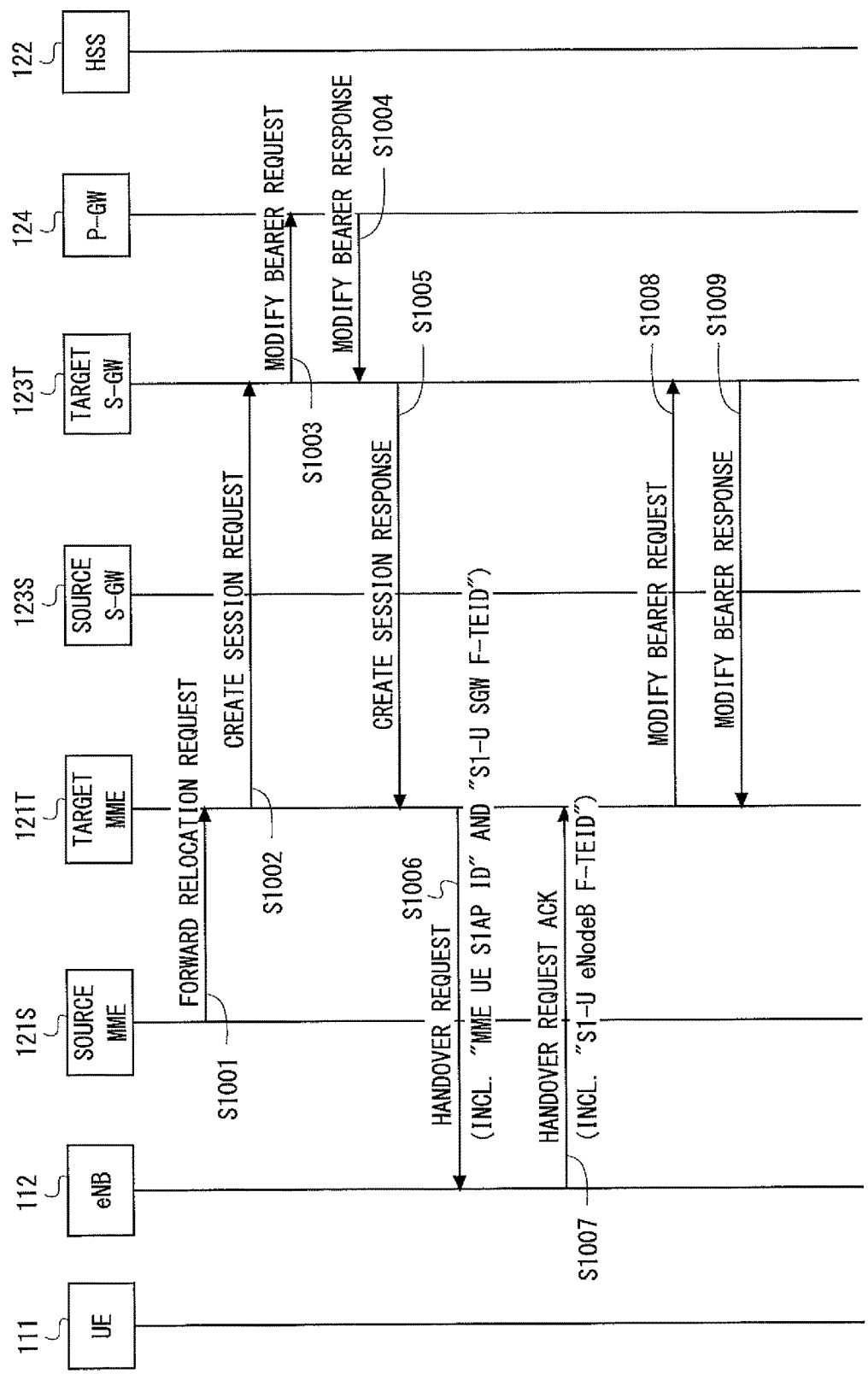
FIG. 19A is a sequence chart showing a specific example of a relocation procedure of a mobility management context and a bearer context according to an illustrative embodiment of the invention.
Figure 19B:
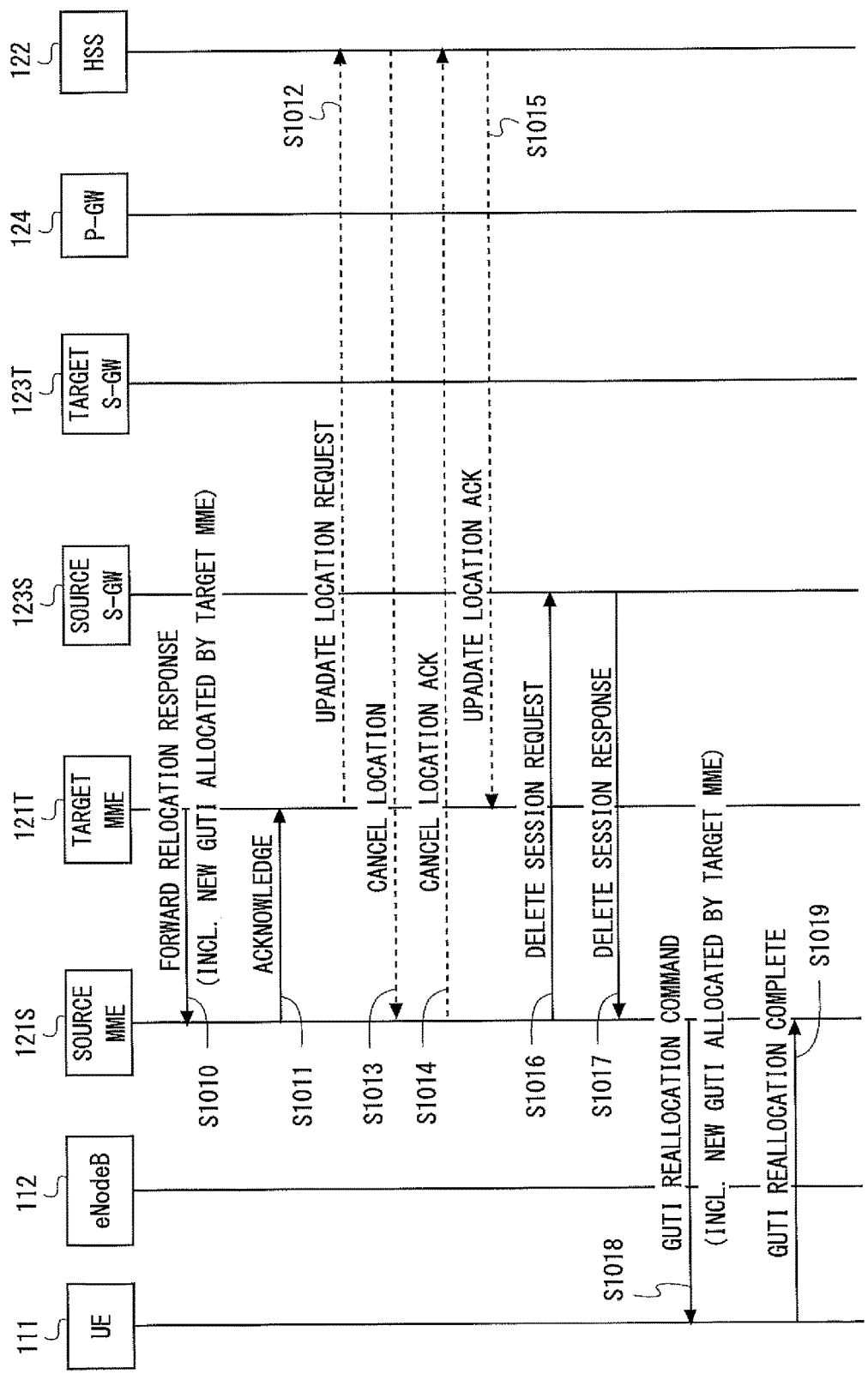
FIG. 19B is a sequence chart showing a specific example of a relocation procedure of a mobility management context and a bearer context according to an illustrative embodiment of the invention.

In this illustrative embodiment, an MME relocation procedure involving S-GW relocation is described. The sequence chart of FIGS. 19A and 19B show one example of the MME relocation procedure that involves S-GW relocation from a source S-GW 123S to a target S-GW 123T. The procedure shown in FIGS. 19A and 19B is a modification of the procedure shown in FIGS. 3A and 3B, and it is initiated when the UE 111 is in the connected state (i.e., ECM-CONNECTED state). S-GW relocation when the UE 111 is in the connected state may be performed in the same or similar procedure to the S-GW relocation in the S1-based handover procedure with S-GW relocation.

In Step S1001, like Step S101 in FIG. 3A, the source MME 121S transmits the MM context and EPS bearer context of the UE 111 to the target MME 121T. For this transmission, a GTP-C message may be used. For example, as shown in FIG. 19A, a Forward Relocation Request message or a modification thereof may be used. Further, the GTP-C message in Step S1001 may contain the designation of the target S-GW 123T.

In Step S1002, like Step S102 in FIG. 3A, the target MME 121T stores the MM context and EPS bearer context of the UE 111 received from the source MME 121S in its memory or storage (not shown). Further, the target MME 121T starts relocation from the source S-GW 123S to the target S-GW 123T. Note that the S-GW relocation when the UE 111 is in the connected state may be performed in the same or similar procedure to the S-GW relocation in the S1-based handover procedure with S-GW relocation. Specifically, the target MME 121T transmits a S5/S8 bearer setup request to the target S-GW 123T. The S5/S8 bearer setup request contains the bearer context, the address and TEID of the P-GW 124 for uplink traffic, and the address and TEID of the eNodeB 112 for downlink traffic. The S5/S8 bearer setup request may be a Create Session Request message, just like the message used in the S1-based handover procedure.

In Step S1003, the target S-GW 123T generates an S1 uplink (UL) TEID and an S5/S8 downlink (DL) TEID for the UE 111. The target S-GW 123T then informs the P-GW 124 about the address and S5/S8 DL TEID of the target S-GW 123T. The target S-GW 123T may transmit to the P-GW 124 a Modify Bearer Request message that contains the address and S5/S8 DL TEID of the target S-GW 123T.

In Step S1004, the P-GW 124 updates the context that is stored in the P-GW 124 itself and transmits a Modify Bearer Response message to the target S-GW 123T.

In Step S1005, the target S-GW 123T transmits a Create Session Response message to the target MME 121T. This Create Session Response message indicates the address and S1 UL TEID of the target S-GW 123T for the user plane.

In Step S1006, the target MME 121T notifies the eNodeB 112 of the MME UE S1AP ID allocated by the target MME 121T. Further, the target MME 121T notifies the eNodeB 112 of the address and S1 UL TEID (i.e., S1-U SGW F-TEID) of the target S-GW 123T for the user plane. Those notifications may be sent from the target MME 121T to the eNodeB 112 by using a modified Handover Request message, a modified Initial Context Setup Request message, a modified E-RAB Modify Request message, or a modified UE Context Modification Request message.

In Step S1007, the eNodeB 112 updates the context that is stored in the eNodeB 112 itself and transmits an Acknowledge message to the target S-GW 123T. This Acknowledge message may indicate the address and TEID (i.e., S1-U eNodeB F-TEID) of the eNodeB 112 for downlink traffic. This Acknowledge message may be a modified Handover Request Ack message, a modified Initial Context Setup Response message, a modified E-RAB Modify Response message, or a modified UE Context Modification Response message.

In the case where the S1-U eNodeB F-TEID for downlink traffic is updated, the target MME 121T transmits to the target S-GW 123T a Modify Bearer Request message that indicates the updated S1-U eNodeB F-TEID (Step S1008). In Step S1009, the target S-GW 123T updates the context and transmits a Modify Bearer Response message to the target MME 121T. When the S1-U eNodeB F-TEID is not updated, Steps S1008 and S1009 may be skipped.

In Step S1010, like in Step S104 of FIG. 3A, the target MME 121T notifies the source MME 121S that it has accepted the taking over of the mobility management and bearer management of the UE 111. The notification message in Step S1010 contains the temporary identifier allocated to the UE 111 by the target MME 121T, i.e., an M-TMSI, an S-TMSI or a GUTI. For the transmission of this notification, a Forward Relocation Response message or a modification thereof may be used. Alternatively, a Forward Relocation Complete Notification message or a modification thereof may be used.

In Step S1011, like in Step S105 of FIG. 3A, the source MME 121S transmits, to the target MME 121T, an Acknowledge message responsive to the message in Step S1010. This Acknowledge message may be a Forward Relocation Complete Acknowledge message or a modification thereof.

Steps S1012 to S1015 are performed to notify the HSS 122 of the MME change. The processing performed in Steps S1012 to S1015 is the same as the processing performed in Steps S106 to S109 in FIG. 3A. Steps S1012 to S1015 may be omitted.

In Step S1016, the source MME 121S transmits a Delete Session Request message to the source S-GW 123S to request the deletion of the bearer context regarding the UE 111. In Step S1017, the source S-GW 123S deletes the bearer context regarding the UE 111 and transmits a Delete Session Response message back to the source MME 121S.

The processing performed in Steps S1018 and S1019 is the same as the processing performed in Steps S112 and S113 in FIG. 3B.

According to the procedure of FIGS. 19A and 19B, it is possible to perform the MME relocation procedure involving S-GW relocation for the UE 111 in the connected state (i.e., ECM-CONNECTED state).

Eighteenth Illustrative Embodiment

Figure 20:
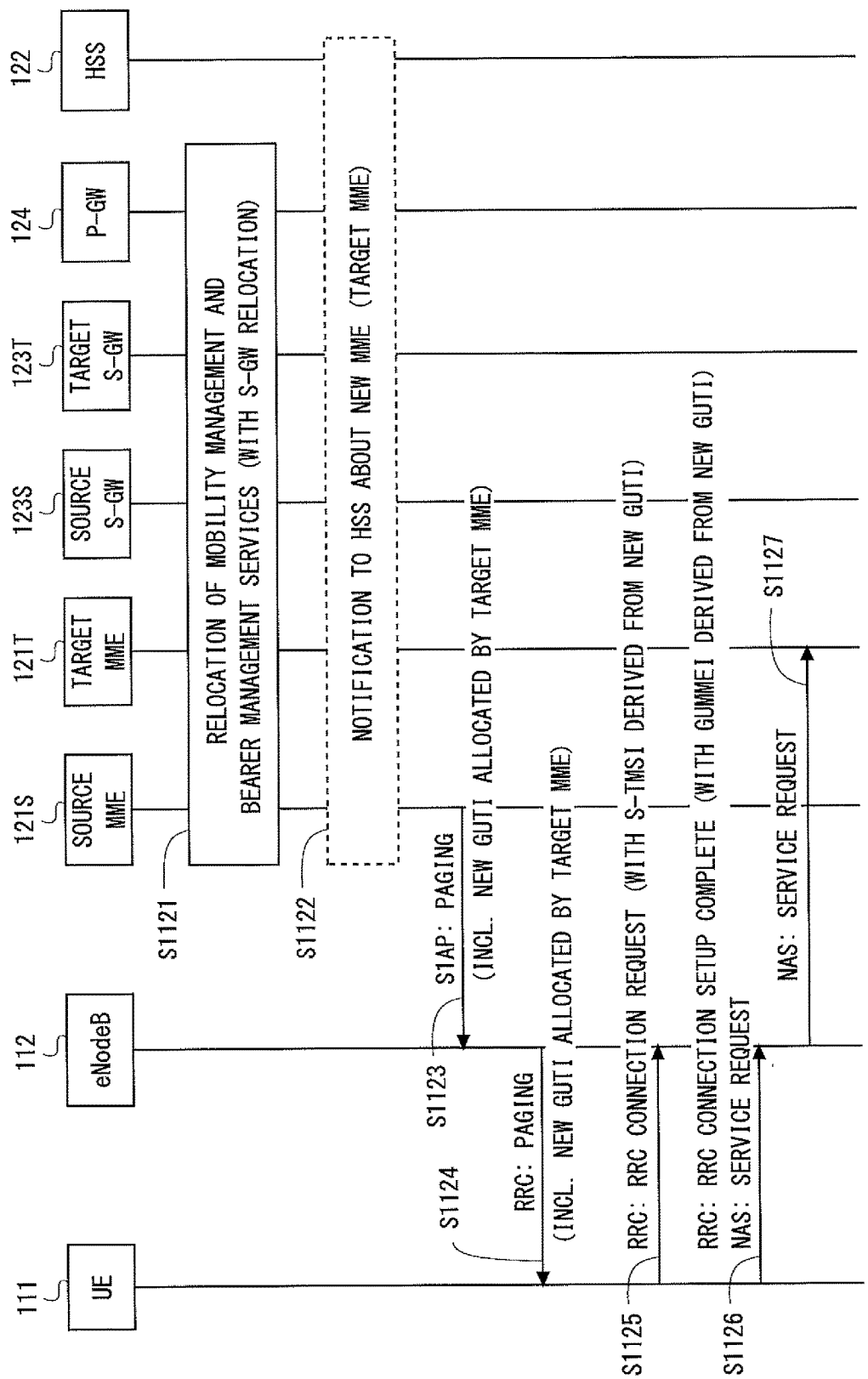
FIG. 20 is a sequence chart showing a specific example of a relocation procedure of a mobility management context and a bearer context according to an illustrative embodiment of the invention.

In this illustrative embodiment, an MME relocation procedure involving S-GW relocation is described. The sequence chart of FIG. 20 shows one example of the MME relocation procedure involving S-GW relocation (or S-GW change) from the source S-GW 123S to the target S-GW 123T. The procedure shown in FIG. 20 is a modification of the procedure shown in FIG. 5, and it is initiated when the UE 111 is in the idle state (i.e., ECM-IDLE state). S-GW relocation when the UE 111 is in the idle state may be performed in the same or similar procedure to the S-GW relocation in the TAU procedure with S-GW relocation (or S-GW change).

In Step S1121, the source MME 121S relocates the mobility management service and bearer management service of the UE 111 that has attached to the EPC 120 (i.e., in EMM-REGISTERED state) to the target MME 121T. The procedure performed in Step S1221 may be the same as that performed in Steps S1001 to S1005 and S1010 to S10011 in FIGS. 19A and 19B.

In Step S1122, the target MME 121T notifies the HSS 122 of the MME change. The procedure performed in Step S1122 may be the same as the procedure to notify an HSS of an MME change in a normal TAU procedure, and therefore it may be the same as the procedure performed in Steps S106 to S109 in FIG. 3A. Step S1122 may be omitted.

The processing performed in Steps S1123 to S1127 is the same as the processing performed in Steps S223 to S227 in FIG. 5.

According to the procedure of FIG. 20, it is possible to perform the MME relocation procedure involving S-GW relocation for the UE in the idle state (i.e., ECM-IDLE state).

Note that FIG. 20 shows a modification of the procedure shown in FIG. 5 using Paging in order to describe the MME relocation procedure involving S-GW relocation (or S-GW change) for the UE 111 in the idle state. The S-GW relocation (or S-GW change) described using FIG. 20 can be used in the same manner as FIG. 20 in other procedures described in the fourth to sixteenth illustrative embodiments.

Figure 24:
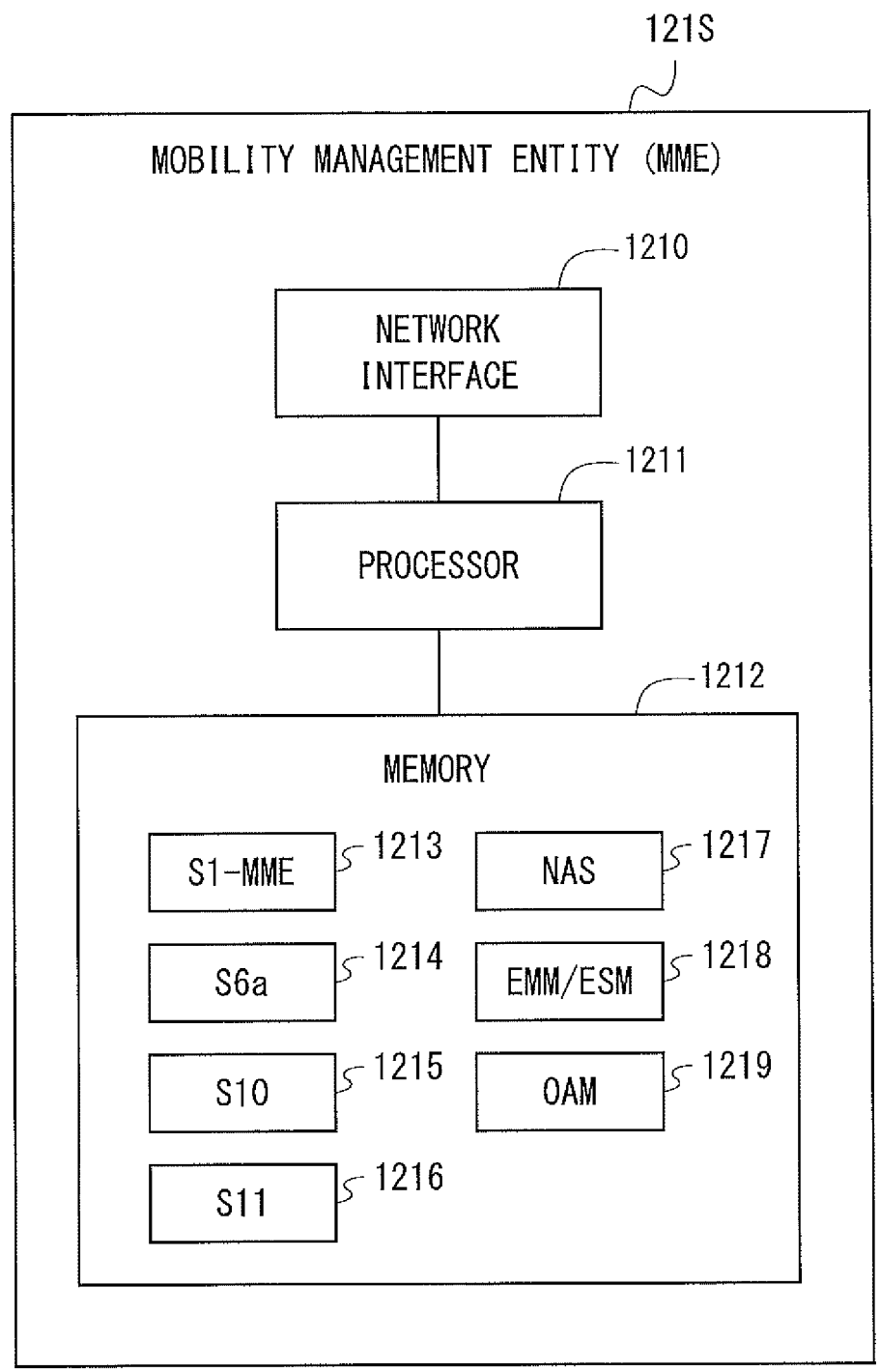
FIG. 24 is a block diagram showing a configuration example of an MME according to an illustrative embodiment of the invention.

Lastly, configuration examples of the source MME 121S, the target MME 121T, the secondary MME 821, the UE 111, and the eNodeB 112 according to the above-described first to eighteenth illustrative embodiments are described below. FIG. 24 shows a configuration example of the source MME 121S. The configurations of the target MME 121T and the secondary MME 821 may be the same as the configuration example shown in FIG. 24.

Referring to FIG. 24, the MME 121S includes a network interface 1210, a processor 1211, and a memory 1212. The network interface 1210 is used to communicate with other network nodes (e.g., the eNodeB 112, the target MME 121T, the HSS 122, the S-GW 123). The network interface 1210 may include, for example, a network interface card (NIC) conforming to the IEEE 802.3 series.

The processor 1211 loads software (computer program) from the memory 1212 and executes the loaded software, thereby performing communication control (e.g., mobility management and bearer management). The processor 1211 may be, for example, a microprocessor, a Micro Processing Unit (MPU), or a Central Processing Unit (CPU). The processor 1211 may include a plurality of processors.

The memory 1212 is composed of a combination of a volatile memory and a nonvolatile memory. The volatile memory is, for example, a Static Random Access Memory (SRAM), a Dynamic RAM (DRAM), or a combination thereof. The nonvolatile memory is, for example, a mask Read Only Memory (MROM), a Programmable ROM (PROM), a flash memory, a hard disk drive, or a combination thereof. The memory 1212 may include a storage that is physically separated from the processor 1211. In this case, the processor 1211 may access the memory 1212 through the network interface 1210 or another I/O interface (not shown).

In the example of FIG. 24, the memory 1212 is used to store software modules including an S1-MME module 1213, an S6a module 1214, an S10 module 1215, an S11 module 1216, a NAS module 1217, an EPS Mobility Management (EMM) and EPS Session Management (ESM) module 1218, and Operation and Maintenance (OAM) module 1219. The OAM module 1219 includes instructions and data for controlling the communication with the control node 142 and the relocation, which are described in the above illustrative embodiments. The processor 1211 loads the OAM module 1219 from the memory 1212 and executes the loaded module, thereby performing the operations of the source MME 121S regarding the relocation procedure of mobility management and bearer management described in the above illustrative embodiments.

Figure 25:
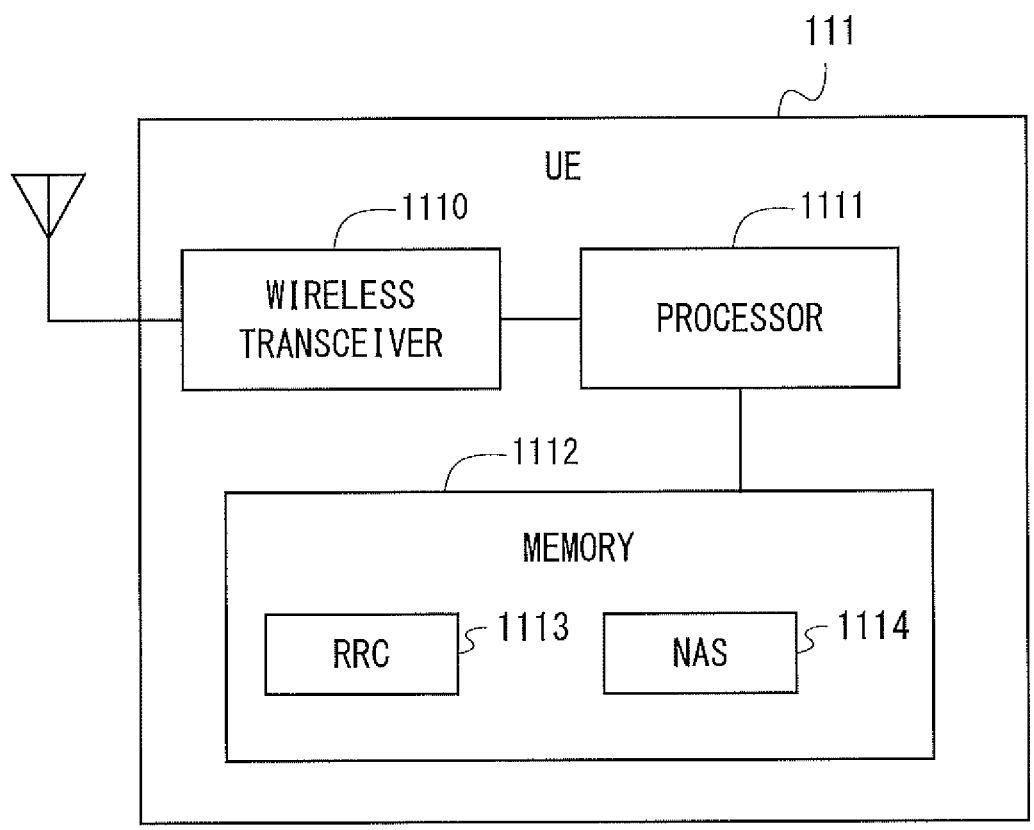
FIG. 25 is a block diagram showing a configuration example of a UE according to an illustrative embodiment of the invention.

FIG. 25 shows a configuration example of the UE 111. Referring to FIG. 25, the UE 111 includes a wireless transceiver 1110, a processor 1111, and a memory 1112. The wireless transceiver 1110 is configured to communicate with the eNodeB 112.

The processor 1111 loads software (computer program) from the memory 1112 and executes the loaded software, thereby performing communication control including transmission and reception of RRC and NAS messages. The processor 1111 may be, for example, a microprocessor, a MPU, or a CPU. The processor 1111 may include a plurality of processors.

The memory 1112 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination of thereof.

In the example of FIG. 25, the memory 1112 is used to store software modules including an RRC module 1113 and a NAS module 1114. The processor 1111 loads the RRC module 1113 and the NAS module 1114 from the memory 1112 and executes the loaded modules, thereby performing the operations of the UE 111 regarding the relocation procedure of mobility management and bearer management described in the above illustrative embodiments.

Figure 26:
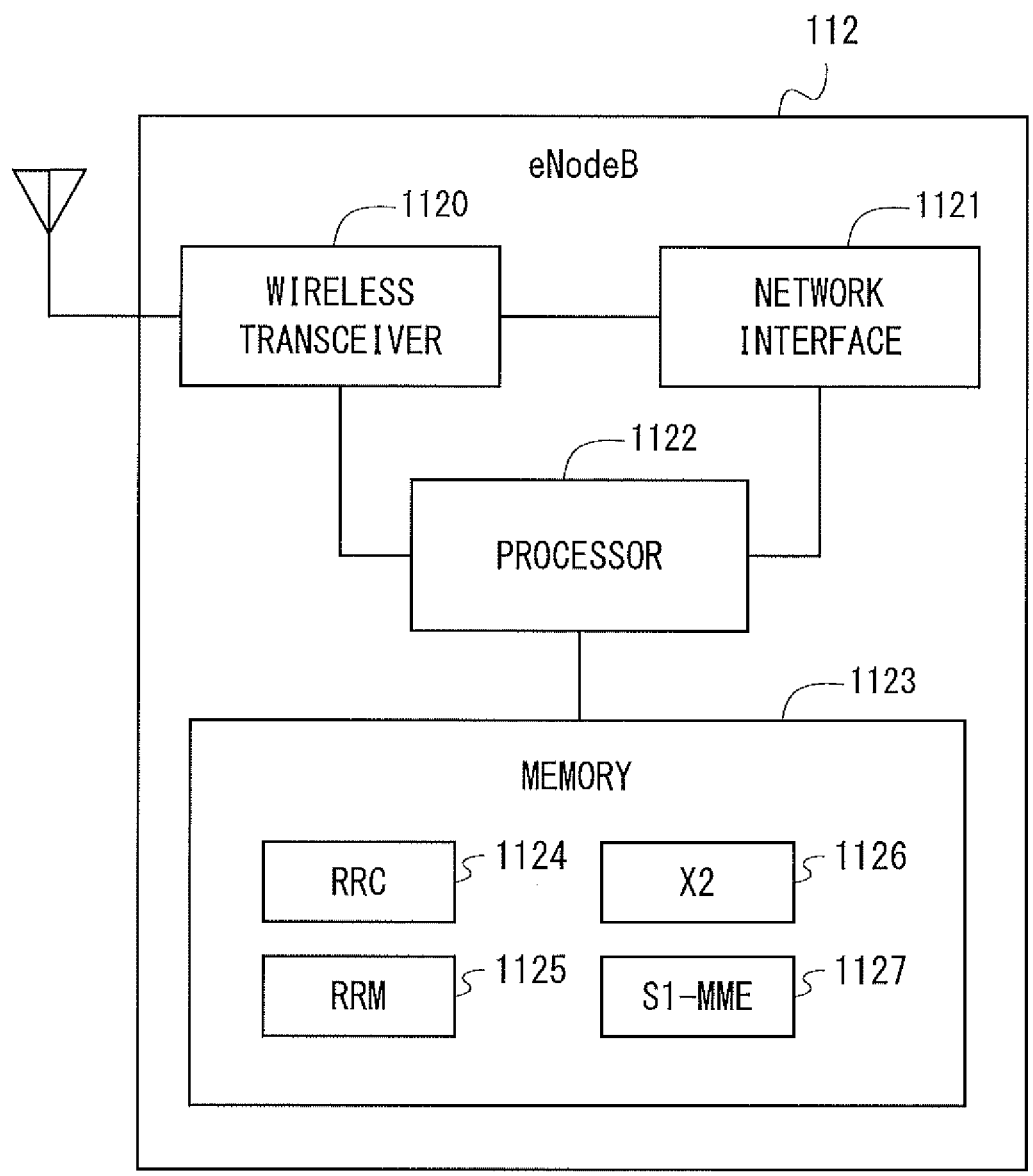
FIG. 26 is a block diagram showing a configuration example of an eNodeB according to an illustrative embodiment of the invention.

FIG. 26 shows a configuration example of the eNodeB 112. Referring to FIG. 26, the eNodeB 112 includes a wireless transceiver 1120, a network interface 1121, a processor 1122, and a memory 1123. The wireless transceiver 1120 is configured to communicate with the UE 111. The network interface 1121 is used to communicate with other eNodeBs in the E-UTRAN 110 and nodes (e.g., MME121S, MME121T, and S-GW123) in the EPC 120.

The processor 1122 loads software (computer program) from the memory 1123 and executes the loaded software, thereby executing communication control including RRC and Radio Resource Management (RRM) and the operations of the eNodeB 112 described in the above illustrative embodiments. The processor 1122 may be, for example, a microprocessor, a MPU, or a CPU. The processor 1122 may include a plurality of processors.

The memory 1123 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1123 may include a storage that is physically separated from the processor 1122. In this case, the processor 1122 may access the memory 1123 through the network interface 1121 or another I/O interface (not shown).

In the example of FIG. 26, the memory 1123 is used to store software modules including an RRC module 1124, an RRM module 1125, an X2 module 1126, and an S1-MME module 1127. The RRC module 1124 and the S1-MME module 1127 include instructions and data for performing transfer of the NAS message encapsulated in the received RRC message to the MME. The processor 1122 loads the RRC module 1124 and the S1-MME module 1127 from the memory 1123 and executes the loaded modules, thereby performing the operations of the eNodeB 112 regarding the relocation procedure of mobility management and bearer management described in the above illustrative embodiments.

As described with reference to FIGS. 24 to 26, each of processors included in the source MME 121S, the target MME 121T, the secondary MME 821, the UE 111, and the eNodeB 112 according to the above-described illustrative embodiments executes one or more programs including a set of instructions that causes a computer to perform algorithms described using the sequence charts and the like.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Illustrative Embodiments

The relocation procedures shown in FIGS. 2 to 20 may be modified as appropriate. For example, FIGS. 2 to 20 show examples where the source MME 121S receives the Relocation Command message from the control node 142. However, the target MME 121T, instead of the source MME 121S, may receive the Relocation Command message from the control node 142 and initiate the relocation procedure.

FIG. 3 (FIGS. 3A and 3B), FIG. 5 and the like show examples where the source MME 121S informs the UE 111 about the ID (e.g., GUMMEI) of the target MME 121T or the UE temporary identifier (e.g., GUTI) allocated by the target MME 121T. However, the target MME 121T, instead of the source MME 121S, may inform the UE 111 about the ID of the target MME 121T or the UE temporary identifier.

The above-described illustrative embodiments are described mainly using specific examples related to the EPS. However, these illustrative embodiments may be applied to other mobile communication systems, such as Universal Mobile Telecommunications System (UMTS), 3GPP2 CDMA2000 system (1×RTT, High Rate Packet Data (HRPD)), Global System for Mobile communications (GSM (registered trademark))/General packet radio service (GPRS) system, and mobile WiMAX system, for example.

Further, the above-described illustrative embodiments are merely examples of applications of the technical ideas obtained by the inventors. Therefore, the technical ideas are not limited to the above-described illustrative embodiments, and various changes and modifications may be made as a matter of course.

This application is based upon and claims the benefit of priority from Japanese Patent Application No. 2014-128823, filed on Jun. 24, 2014, the disclosure of which is incorporated herein in its entirety by reference.

REFERENCE SIGNS LIST

110 EVOLVED UNIVERSAL TERRESTRIAL RADIO ACCESS NETWORK (E-UTRAN)
111 USER EQUIPMENT (UE)
112 eNodeB
121S SOURCE MOBILITY MANAGEMENT ENTITY (MME)
121T TARGET MME
122 HOME SUBSCRIBER SERVER (HSS)
123 SERVING GATEWAY (S-GW)
124 PACKET DATA NETWORK GATEWAY (P-GW)
120 EVOLVED PACKET CORE (EPC)
130 PACKET DATA NETWORK (PDN)
141 CONTROL INTERFACE
142 CONTROL NODE
1111, 1122, 1211 PROCESSOR
1112, 1123, 1212 MEMORY

The invention claimed is:

1. A first network node located in a core network, the first network node comprising:

at least one memory that stores instructions; and
at least one processor configured to execute the instructions to:
perform mobility management and bearer management of a plurality of mobile terminals having attached to the core network, the mobility management including communicating with a subscriber server; and
perform a relocation procedure for relocating the mobility management and the bearer management of the plurality of mobile terminals to a second network node in the core network in accordance with a relocation command from a control node coupled to the core network,
wherein the relocation procedure includes notifying, by the first network node, each of the plurality of mobile terminals about an identifier of the second network node, and
wherein the notifying includes transmitting, by the first network node, a location registration area update accept message indicating the identifier during a location registration area update procedure initiated by each of the plurality of mobile terminals.

2. The first network node according to claim 1, wherein the notifying includes transmitting a Non-Access Stratum (NAS) message indicating the identifier from the first network node to each of the plurality of mobile terminals.

3. The first network node according to claim 2, wherein the NAS message is one of a Detach Request message, a Tracking Area Update Accept message, a Service Reject message, and a GUTI Reallocation Command message.

4. The first network node according to claim 1, wherein the notifying includes paging each of the plurality of mobile terminals in order to transmit the identifier by using a paging signal transmitted from a base station.

5. The first network node according to claim 1, wherein the notifying includes transmitting a detach request message indicating the identifier from the first network node during a detach procedure initiated by the core network.

6. The first network node according to claim 1, wherein the notifying includes sending, by the first network node to a base station, a request to release a context regarding each of the plurality of mobile terminals in order to transmit the identifier by using a Radio Resource Control (RRC) message transmitted from the base station for release of an RRC connection.

7. The first network node according to claim 1, wherein the relocation procedure includes transmitting, from the first network node to the second network node, a context for the mobility management and the bearer management.

8. A first network node located in a core network, the first network node comprising:
at least one memory that stores instructions; and
at least one processor configured to execute the instructions to:
perform mobility management and bearer management of a plurality of mobile terminals having attached to the core network, the mobility management including communicating with a subscriber server; and
perform a relocation procedure for relocating the mobility management and the bearer management of the plurality of mobile terminals to a second network node in the core network in accordance with a relocation command from a control node coupled to the core network,
wherein the relocation procedure includes acquiring an identifier of the second network node from a subscriber server and notifying, by the first network node, each of the plurality of mobile terminals about the identifier of the second network node, and
wherein the acquiring is selectively performed on condition that a specific flag is set in a Non-Access Stratum (NAS) message arrived at the first network node from each of the plurality of mobile terminals.

9. A first network node located in a core network, the first network node comprising:
at least one memory that stores instructions; and
at least one processor configured to execute the instructions to:
perform mobility management and bearer management of a plurality of mobile terminals having attached to the core network, the mobility management including communicating with a subscriber server, and
perform a relocation procedure for relocating the mobility management and the bearer management of the plurality of mobile terminals to a second network node in the core network in accordance with a relocation command from a control node coupled to the core network,
wherein the relocation procedure includes notifying each of the plurality of mobile terminals about both a second identifier indicating the second network node and a third identifier indicating a third mobility management node, and
wherein the third identifier is used by each of the plurality of mobile terminals for initiating a signaling procedure using the third identifier when a signaling procedure using the second identifier has failed.

10. A method performed by a first network node located in a core network, the method comprising:
performing mobility management and bearer management of a plurality of mobile terminals having attached to the core network, the mobility management including communicating with a subscriber server; and
performing a relocation procedure for relocating the mobility management and the bearer management of the plurality of mobile terminals to a second network node in the core network in accordance with a relocation command from a control node coupled to the core network,
wherein the relocation procedure includes notifying, by the first network node, each of the plurality of mobile terminals about an identifier of the second network node, and
wherein the notifying includes transmitting, by the first network node, a location registration area update accept message indicating the identifier during a location registration area update procedure initiated by each of the plurality of mobile terminals.

* * * * *